(12) United States Patent
Yang et al.

(10) Patent No.: US 12,180,118 B2
(45) Date of Patent: Dec. 31, 2024

(54) CARBONATION OF REACTIVE MAGNESIA CEMENT (RMC)-BASED SYSTEMS

(71) Applicant: Nanyang Technological University, Singapore (SG)

(72) Inventors: En-Hua Yang, Singapore (SG); Xi Xiao, Singapore (SG); Cise Unluer, Singapore (SG); Tien Dung Nguyen, Singapore (SG)

(73) Assignee: Nanyang Technological University, Singapore (SG)

( * ) Notice: Subject to any disclaimer, the term of this patent is extended or adjusted under 35 U.S.C. 154(b) by 630 days.

(21) Appl. No.: 17/455,203

(22) Filed: Nov. 16, 2021

(65) Prior Publication Data

US 2022/0153647 A1 May 19, 2022

(30) Foreign Application Priority Data

Nov. 16, 2020 (SG) .......................... 10202011391X

(51) Int. Cl.
*C04B 28/10* (2006.01)
*C01F 5/02* (2006.01)

(52) U.S. Cl.
CPC .............. *C04B 28/105* (2013.01); *C01F 5/02* (2013.01); *C01P 2002/72* (2013.01); *C01P 2002/88* (2013.01); *C01P 2004/03* (2013.01)

(58) Field of Classification Search
CPC ... C04B 28/105; C04B 20/12; C04B 40/0231; C04B 28/32; C04B 2111/00663; C04B 2111/00724; C04B 2111/00732; C01F 5/02; C01P 2002/72; C01P 2002/88; C01P 2004/03; Y02P 40/18

See application file for complete search history.

(56) References Cited

FOREIGN PATENT DOCUMENTS

WO 2010/130712 A1 11/2010

OTHER PUBLICATIONS

ASTM C109/C109M-21, "Standard Test Method for Compressive Strength of Hydraulic Cement Mortars (Using 2-in. or [50-mm] Cube Specimens)," American Society for Testing and Materials, West Conshohocken, PA, 2013. (12 pages).
ASTM C1437-07, "Standard Test Method for Flow of Hydraulic Cement Mortar," American Society for Testing and Materials, West Conshohocken, PA, 2007. (2 pages).
ASTM C191-21, "Standard Test Methods for Time of Setting of Hydraulic Cement by Vicat Needle," American Society for Testing and Materials, West Conshohocken, PA, 2004. (8 pages).
Birchal et al., "Technical Note—The Effect of Magnesite Calcination Conditions on Magnesia Hydration," *Minerals Engineering* 13(14-15):1629-1633, 2000.
Chahal et al., "Permeation properties of concrete made with fly ash and silica fume: Influence of ureolytic bacteria," *Construction and Building Materials* 49:161-174, 2013. (Published Online Sep. 6, 2013).
Climate of Singapore, URL=http://www.weather.gov.sg/climate-climate-of-singapore, 2010. (download date Dec. 28, 2021) (11 pages).
Dong et al., "Synthesis of reactive MgO from reject brine via the addition of $NH_4OH$," *Hydrometallurgy* 169:165-172, 2017. (Published Online Feb. 1, 2017).
Dung et al., "Development of MgO concrete with enhanced hydration and carbonation mechanisms," *Cement and Concrete Research* 103:160-169, 2018. (Published Online Oct. 27, 2017).
Dung et al., "Influence of nucleation seeding on the performance of carbonated MgO formulations," *Cement and Concrete Composites* 83:1-9, 2017. (Published Online Jul. 6, 2017).
Dung et al., "Sequestration of $CO_2$ in reactive MgO cement-based mixes with enhanced hydration mechanisms," *Construction and Building Materials* 143:71-82, 2017. (Published Online Mar. 22, 2017).
Gartner et al., "Alternative cement clinkers," *Cement and Concrete Research* 114:27-39, 2018. (Published Online Feb. 21, 2017).
Geinzer, "Inactivation of the urease enzyme by heat and alkaline pH treatment: Retaining urea-nitrogen in urine for fertilizer use," Master's Thesis, Swedish University of Agricultural Sciences, May 30, 2017, (51 pages).
Gibson, "An Investigation of the Bacillus Pasteuri Group: II. Special Physiology of the Organisms," *Journal of Bacteriology* 28(3):313-322, Apr. 2, 1934.
Gibson, "An Investigation of the Bacillus Pasteuri Group: III. Systematic Relationships of the Group," *Journal of Bacteriology* 29(5):491-502, Oct. 26, 1934.
Glückauf, "Carbon Dioxide Content of Atmospheric Air," *Nature* 153(3890):620-621, May 20, 1944.
Hay et al., "Hydration, carbonation, strength development and corrosion resistance of reactive MgO cement-based composites," *Cement and Concrete Research* 128(105941), 2020, (14 pages). (Published Online Jan. 3, 2020).
Juenger et al., "Advances in alternative cementitious binders," *Cement and Concrete Research* 41(12):1232-1243, 2011.
Kim et al., "Effect of Temperature, pH, and Reaction Duration on Microbially Induced Calcite Precipitation," *Applied Sciences* 8(8):1277, Aug. 1, 2018. (10 pages).
Kim, "Urea additives for reduction of hydration heat in cement composites," *Construction and Building Materials* 156:790-798, 2017. (Published Online Sep. 26, 2017).

(Continued)

*Primary Examiner* — Anthony J Green
(74) *Attorney, Agent, or Firm* — Seed IP Law Group LLP

(57) ABSTRACT

Herein discloses a method of carbonating reactive magnesia cement, which includes: (i) providing an aqueous suspension including a carbon dioxide-producing bacteria; (ii) mixing the aqueous suspension with a precursor which the carbon dioxide-producing bacteria generates carbon dioxide from for a duration to form an aqueous mixture sufficient for substantially carbonating the reactive magnesia cement; (iii) mixing the aqueous mixture with the reactive magnesia cement to form a blend; wherein a nutrient is provided in the aqueous suspension of step (i) or in the reactive magnesia cement of step (iii) to sustain the carbon dioxide-producing bacteria in the reactive magnesia cement; and (iv) curing the blend to carbonate the reactive magnesia cement. A reactive magnesia cement composite formed by the method is also disclosed.

20 Claims, 51 Drawing Sheets

(56) References Cited

OTHER PUBLICATIONS

Konieczna et al., "Bacterial Urease and its Role in Long-Lasting Human Diseases," *Current Protein and Peptide Science* 13(8):789-806, 2012.

Lee et al., "Chemical Structure of Urea in Water," *The Journal of Physical Chemistry* 99(50):17737-17741, 1995.

Liska et al., "Performance of magnesia cements in porous blocks in acid and magnesium environments," *Advances in Cement Research* 24(4):221-232, 2012.

Liska, et al., "Ultra-green construction: reactive MgO masonry products," *Waste and Resource Management* 162(WR4):185-196, Nov. 2009.

Mo et al., "Accelerated carbonation—A potential approach to sequester $CO_2$ in cement paste containing slag and reactive MgO," *Cement and Concrete Composites* 43:69-77, 2013. (Published Online Jul. 20, 2013).

Mwaluwinga et al., "Influence of Urea in Concrete," *Cement and Concrete Research* 27(5):733-745, 1997.

Olivier et al., *Trends in Global $CO_2$ Emissions: 2015 Report*, PBL Netherlands Environmental Assessment Agency, The Netherlands, Nov. 2015. (80 pages).

Pickering, "The Entropy of Dissolution of Urea," *Journal of Chemical Education* 64(8):723-724, Aug. 1987.

Pilehvar et al., "Utilization of urea as an accessible superplasticizer on the moon for lunar geopolymer mixtures," *Journal of Cleaner Production* 247:119177, 2020. (9 pages). (Published Online Nov. 5, 2019).

Ramachandran et al., "Remediation of Concrete Using Micro-Organisms," *ACI Materials Journal* 98(1):3-9, Jan.-Feb. 2001.

Rezus et al., "Effect of urea on the structural dynamics of water," *Proceedings of the National Academy of Sciences* 103(49):18417-18420, Dec. 5, 2006.

Ruan et al., "The use of microbial induced carbonate precipitation in healing cracks within reactive magnesia cement-based blends," *Cement and Concrete Research* 115:176-188, 2019. (Oct. 27, 2018).

Sanders, "Aseptic Laboratory Techniques: Plating Methods," *Journal of Visualized Experiments* 63:e3064, Nov. 5, 2012. (18 pages).

Unluer et al., "Effect of Aggregate Size Distribution on the Carbonation of Reactive Magnesia Based Porous Blocks," 8th International Conference: Concrete in the Low Carbon Era, Dundee, UK, Jul. 9-11, 2012. (16 pages).

Unluer, "Carbon dioxide sequestration in magnesium-based binders," *Carbon Dioxide Sequestration in Cementitious Construction Materials*, Elsevier 2018 Duxford, UK, 2018, Chap. VII, pp. 129-173.

Verma et al., "Bio-Mineralization and Bacterial Carbonate Precipitation in Mortar and Concrete," *Bioscience and Bioengineering* 1(1):5-11, 2015. (Published Online Apr. 6, 2015).

Whiffin, "Microbial $CaCO_3$ Precipitation for the production of Biocement," Thesis presented for the degree of Doctor of Philosophy in Biotechnology, Murdoch University, Sep. 2004, (162 pages).

Wiktor et al., "Quantification of crack-healing in novel bacteria-based self-healing concrete," *Cement & Concrete Composites* 33:763-770, 2011. (Published Online Apr. 7, 2011).

FIG. 10

| | Chemical composition (%) | | | | | | Physical properties | |
|---|---|---|---|---|---|---|---|---|
| | MgO | SiO$_2$ | CaO | R$_2$O$_3$ | K$_2$O | Na$_2$O | LOI | Specific gravity (g/cm$^3$) | Specific surface area (m$^2$/g) |
| RMC | >91.5 | 2.0 | 1.6 | 1.0 | - | - | 4.0 | 3.0 | 16.3 |

FIG. 11

| Mix | W/B* | Mixture proportion (kg/m$^3$) | | | | | | | |
|---|---|---|---|---|---|---|---|---|---|
| | | RMC | Water | Bacteria | Urea 0.5 M | Urea 1 M | Urea 1.5 M | Urea 2 M | HA |
| CS | 0.65 | 1000 | 650 | - | - | - | - | - | - |
| U0.5M | 0.7 | | 650 | 355 | 355 | - | - | - | - |
| U1M | 0.7 | | 650 | 355 | - | 355 | - | - | - |
| U1.5M | 0.7 | | 650 | 355 | - | - | 355 | - | - |
| U2M | 0.7 | | 650 | 355 | - | - | - | 355 | - |
| HA.CS | 0.65 | | 645 | - | - | - | - | - | 7.0 |
| HA.U0.5M | 0.7 | | 645 | 351.2 | 351.2 | - | - | - | 7.6 |
| HA.U1M | 0.7 | | 645 | 351.2 | - | 351.2 | - | - | 7.6 |
| HA.U1.5M | 0.7 | | 645 | 351.2 | - | - | 351.2 | - | 7.6 |
| HA.U2M | 0.7 | | 645 | 351.2 | - | - | - | 351.2 | 7.6 |

| Mix | pH | Flow (%) | Setting times (h) | |
|---|---|---|---|---|
| | | | Initial | Final |
| CS | 11.74 | 181 | 26.5 | 33.3 |
| U0.5M | 10.23 | 168 | 22.5 | 30.0 |
| U1M | 9.96 | 172 | 22.8 | 28.0 |
| U1.5M | 10.23 | 161 | 15.8 | 21.0 |
| U2M | 10.24 | 162 | 4.7 | 6.6 |
| HA.CS | 9.32 | 196 | 22.3 | 26.5 |
| HA.U0.5M | 10.02 | 172 | 18.3 | 23.3 |
| HA.U1M | 9.97 | 169 | 10.0 | 19.5 |
| HA.U1.5M | 10.04 | 167 | 7.8 | 17.0 |
| HA.U2M | 10.02 | 166 | 7.5 | 11.5 |

FIG. 22
| Mix | Mass loss (%) | | | |
|---|---|---|---|---|
| | Dehydration | Dehydroxylation | Decarbonation | Total |
| CS | 1.3 | 12.7 | 11.1 | 25.1 |
| U1M | 3.2 | 6.9 | 18.5 | 28.5 |
| U2M | 3.4 | 16.8 | 13.4 | 33.6 |
| HA.CS | 1.5 | 12.3 | 13.7 | 27.5 |
| HA.U1M | 5.0 | 5.1 | 19.1 | 29.2 |
| HA.U2M | 6.8 | 6.7 | 17.4 | 30.9 |
FIG. 23A
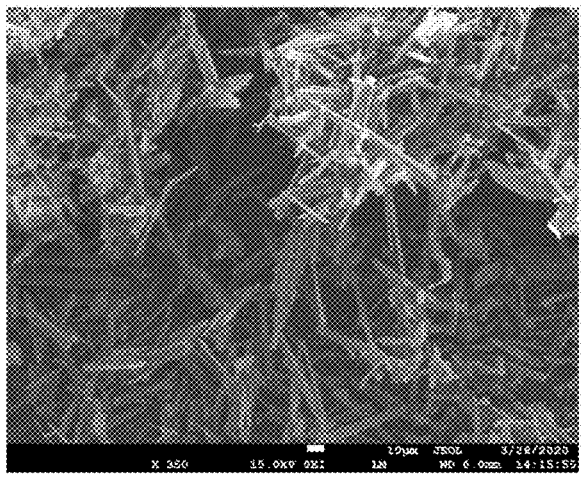
FIG. 23B
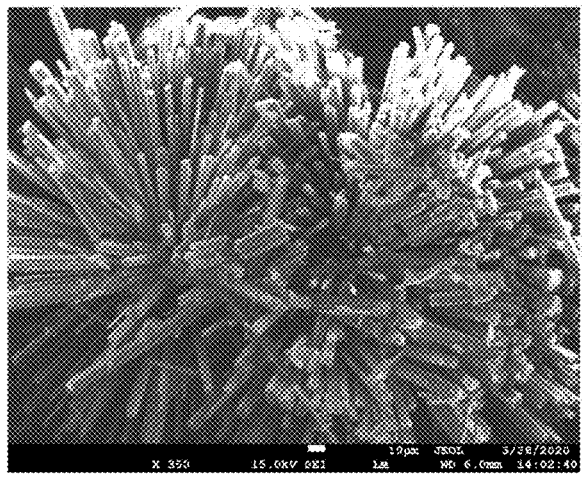
FIG. 24
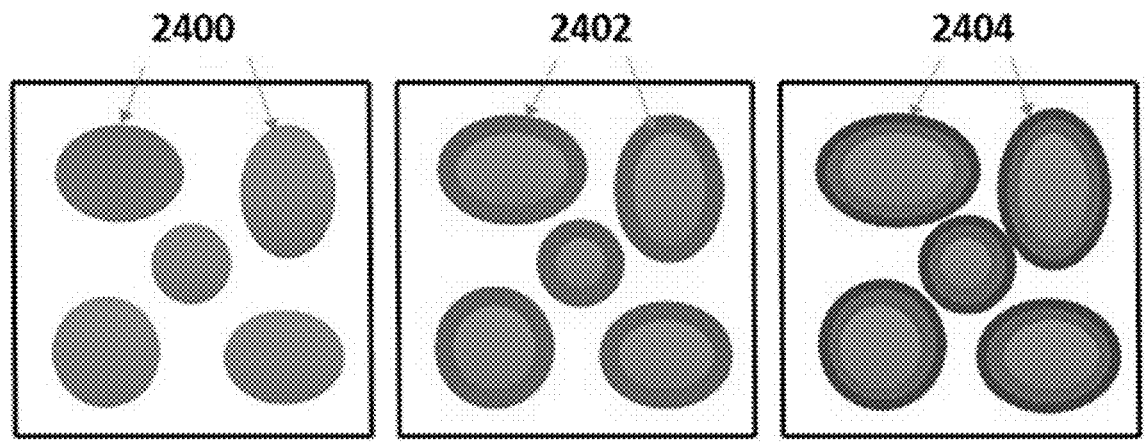

CARBONATION OF REACTIVE MAGNESIA CEMENT (RMC)-BASED SYSTEMS

CROSS-REFERENCE TO RELATED APPLICATION

This application claims the benefit of priority of Singapore Patent Application No. 10202011391X, filed Nov. 16, 2020, the content of it being hereby incorporated by reference in its entirety for all purposes.

TECHNICAL FIELD

The present disclosure relates to a method of carbonating reactive magnesia cement. The present disclosure also relates to a reactive magnesia cement composite formed by the method.

BACKGROUND

Portland cement (PC), being the most widely used man-made material, is globally produced at an amount exceeding 4 billion tonnes a year. The production of PC leads to the release of large quantities of $CO_2$, taking up roughly 8% of global anthropogenic $CO_2$ emissions. To reduce the emissions from cement production, the use of alternative binding materials has been proposed. Reactive magnesia cement (RMC), which has lower calcination temperatures than PC, i.e. 700-900° C. vs. 1450° C., is a potential alternative. Apart from the typical dry route, i.e. calcination of magnesite, RMC can also be synthesized from seawater or reject brine. Moreover, the strength gain of RMC involves hydration and carbonation reactions, presenting a route for the permanent sequestration of $CO_2$ within the cement matrix.

The strength gain process of RMC-based systems involves hydration and carbonation. MgO firstly hydrates to form brucite ($Mg(OH)_2$), which may be porous and may not significantly contribute to strength development. Subsequently, brucite reacts with $CO_2$ to form a range of hydrated magnesium carbonates (HMCs), such as nesquehonite ($MgCO_3 \cdot 3H_2O$), hydromagnesite ($4MgCO_3 \cdot Mg(OH)_2 \cdot 4H_2O$), and dypingite ($4MgCO_3 \cdot Mg(OH)_2 \cdot 5H_2O$). Carbonation may be the most crucial step for the strength gain of RMC formulations as HMCs serve as the primary source of strength within these compositional mixes.

However, the carbonation of RMC under ambient conditions may be very limited due to low atmospheric $CO_2$ concentration, i.e. 0.04%. Therefore, accelerated carbonation may be required and may generally be realized by providing $CO_2$ at elevated concentrations, i.e. 10% or higher. While accelerated carbonation allows RMC to gain initial strength, the high concentration of $CO_2$ may render adverse effects on longer term strength development due to the formation of a dense impermeable layer on the sample surface, preventing further diffusion of $CO_2$ into the inner sections towards the sample core. Due to this uneven carbonation pattern, a majority of hydrated phases, e.g. brucite, remains uncarbonated within the sample, thereby limiting the overall strength gain of RMC. This also explains for the low conversion of MgO and brucite into hydrated magnesium hydroxy carbonates (HMHCs). Also, the high amounts of unhydrated MgO and uncarbonated brucite not only hinder the strength development of RMC samples, but could also potentially cause further hydration and carbonation at later ages, which may result in changes in the sample volume and potential cracking. To alleviate this issue, methods developed to enhance $CO_2$ diffusion into the RMC matrix traditionally introduces porosity via varying the particle size distribution of aggregates.

Furthermore, the requirements of accelerated carbonation curing limits the applications of RMC to precast elements only, as accelerated carbonation tends to require the use of enclosed chamber or incubator with controlled $CO_2$ concentration, relative humidity (RH) and temperature. It is also a challenge to carry out accelerated carbonation curing for large precast elements, such as bridge girders, due to space constraint, low production efficiency and high cost. All of the above greatly hinder the wider applications of RMC. For example, the curing chamber method, which involves the placing of samples in their original molds into a chamber, not only reduces the productivity of the sample preparation procedure, but also limits the initial strength development due to the inhibited $CO_2$ diffusion into samples caused by the physical barrier presented by the molds. These limitations translate into high contents of unreacted MgO/brucite, in spite of the continuous use of accelerated carbonation after demolding.

There is thus a need to provide for a solution that addresses one or more of the limitations mentioned above. The solution should at least provide for a method of carbonating reactive magnesia cement. The solution may provide a reactive magnesia cement composite formed by such method.

BRIEF SUMMARY

In a first aspect, there is provided for a method of carbonating reactive magnesia cement, the method includes:
  (i) providing an aqueous suspension including a carbon dioxide-producing bacteria;
  (ii) mixing the aqueous suspension with a precursor which the carbon dioxide-producing bacteria generates carbon dioxide from for a duration to form an aqueous mixture sufficient for substantially carbonating the reactive magnesia cement;
  (iii) mixing the aqueous mixture with the reactive magnesia cement to form a blend;
  wherein a nutrient is provided in the aqueous suspension of step (i) or in the reactive magnesia cement of step (iii) to sustain the carbon dioxide-producing bacteria in the reactive magnesia cement; and
  (iv) curing the blend to carbonate the reactive magnesia cement.

In another aspect, there is provided a reactive magnesia cement composite formed by the method described in various embodiments of the first aspect, the reactive magnesia cement composite includes:
  a carbon dioxide-producing bacteria; and
  a X-ray diffraction pattern including:
  one peak having a two theta value between 30° and 35° which corresponds to magnesite;
  one peak having a two theta value between 35° and 40° which corresponds to brucite;
  one peak having a two theta value between 40° and 45° which corresponds to periclase; and
  wherein the intensity of the one peak which correspond to brucite is lower in the presence of the carbon dioxide-producing bacteria as compared to another reactive magnesia cement composite absent of the carbon dioxide-producing bacteria.

BRIEF DESCRIPTION OF THE DRAWINGS

The drawings are not necessarily to scale, emphasis instead generally being placed upon illustrating the principles of the present disclosure. In the following description, various embodiments of the present disclosure are described with reference to the following drawings, in which:

FIG. 10 is a table showing a non-limiting example of the chemical composition and physical properties of RMC.

FIG. 11 shows non-limiting examples of mixture compositions of the paste samples prepared in one study. WB denotes for the ratio of liquid solution to RMC.

FIG. 22 is a table showing mass loss values of samples after 2 days of curing.

FIG. 23A shows a SEM image of precipitation of UPB-urea and hydration agent, wherein urea is at a concentration of 1 M. Scale bar denotes for 10 μm.

FIG. 23B shows a SEM image of precipitation of UPB-urea and hydration agent, wherein urea is at a concentration of 2 M. Scale bar denotes for 10 μm.

FIG. 24 is a schematic representation of the formation of hydration and carbonation products in UPB-urea without hydration agent, showing (left image) RMC grains before hydration, (center image) brucite precipitates on RMC grains and (right image) hydrated magnesium hydroxy carbonates (HMHCs) precipitate on brucite's surfaces and limit further carbonation. 2400 denotes for RMC grains, 2402 denotes for brucite, and 2404 denotes for HMHCs.

DETAILED DESCRIPTION

Figure 1:
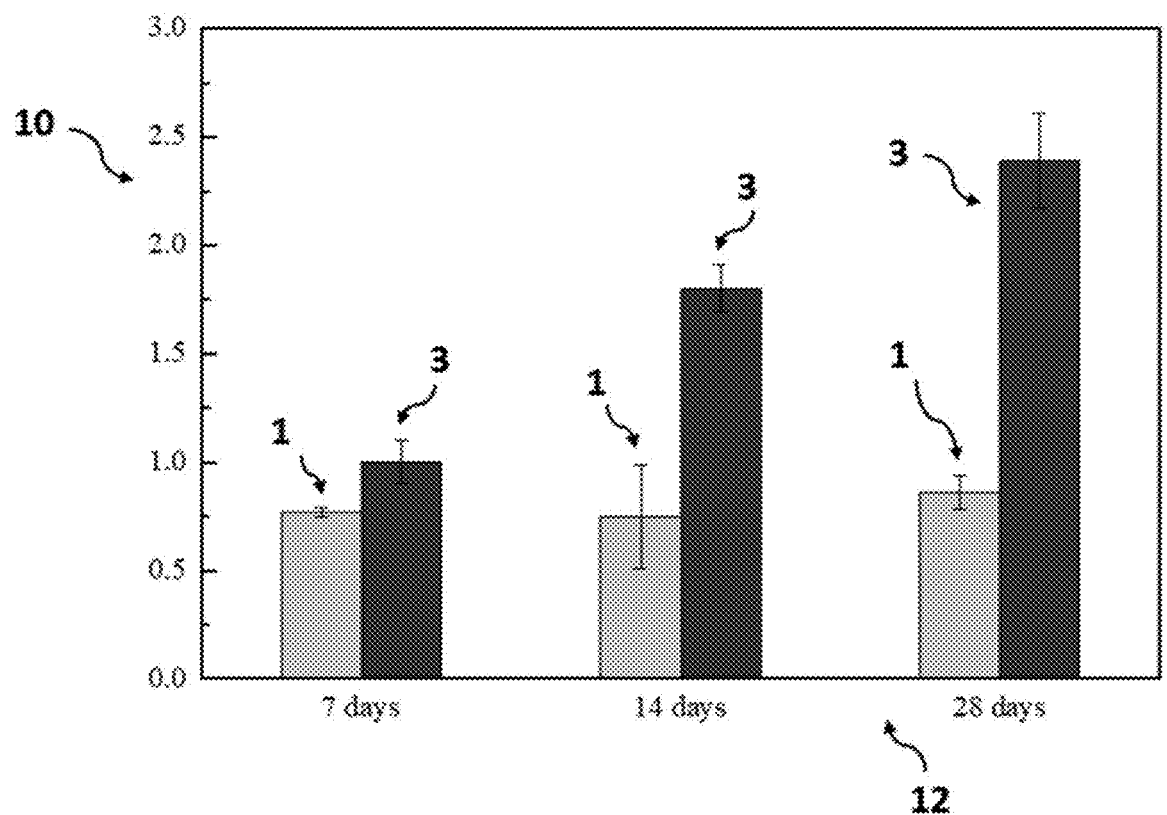
FIG. 1 shows a plot of compressive strength of RMC pastes with and without carbonation agents at 7, 14 and 28 days. 1 denotes for sample W0.5, 3 denotes for sample W0.5-U5%-Y-B, 10 denotes for compressive strength (MPa), and 12 denotes for time (day).

The following detailed description refers to the accompanying drawings that show, by way of illustration, specific details and embodiments in which the present disclosure may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a method of carbonating reactive magnesia cement (RMC). Details of various embodiments of the method are now described below and in the examples section further below. Where advantages associated with the various embodiments are already described in the examples section, such advantages shall not be reiterated below for brevity.

The method of carbonating reactive magnesia cement may include (i) providing an aqueous suspension including a carbon dioxide-producing bacteria, (ii) mixing the aqueous suspension with a precursor which the carbon dioxide-producing bacteria generates carbon dioxide from for a duration to form an aqueous mixture sufficient for substantially carbonating the reactive magnesia cement, (iii) mixing the aqueous mixture with the reactive magnesia cement to form a blend, wherein a nutrient may be provided in the aqueous suspension of step (i) or in the reactive magnesia cement of step (iii) to sustain the carbon dioxide-producing bacteria in the reactive magnesia cement, and (iv) curing the blend to carbonate the reactive magnesia cement. In the present disclosure, the carbon dioxide-producing bacteria, the nutrient and the precursor may be referred herein as "carbonation agents", as these components internally provide $CO_2$ for carbonation of reactive magnesia cement.

As mentioned above, in the present method, there may be two ways to include the nutrient. In one way, the nutrient, which may start in a form of powder, may be added directly to the RMC in a mixer to form a dry mixture (e.g. the mixing may be carried out for a few minutes, such as but not limited to 10 mins, 5 mins, 2 mins, etc. For instance, the mixing may be carried out for 2 to 5 mins). The carbon-dioxide producing bacteria, which may be in the form of an aqueous suspension, may then be added to the dry mixture. In the other way, the nutrient may be first dissolved in water, followed by addition of the carbon-dioxide producing bacteria therein. The carbon-dioxide producing bacteria suspension containing the dissolved nutrient may then be mixed into the RMC. In various embodiments, the nutrient may include yeast extract, soy broth, lysogeny broth, meat extract, and/or peptone.

In various embodiments, providing the aqueous suspension may include dissolving the nutrient in water prior to dispersing the carbon dioxide-producing bacteria in the water.

In various embodiments, the carbon dioxide-producing bacteria includes an alkaliphilic bacteria or ureolytic bacteria. For brevity, the carbon dioxide-producing bacteria is termed herein "$CO_2$-producing bacteria" or simply "bacteria". The carbon dioxide-producing bacteria may also be termed herein "urease-producing bacteria", as the carbon dioxide-producing bacteria may be responsible for releasing urease to catalyse hydrolysis of urea to provide the $CO_2$ for the internal carbonation. Urea is a non-limiting example of the precursor. In various embodiments, the carbon dioxide-producing bacteria may include *Sporosarcina pasteurii, Bacillus sphaericus, Bacillus subtilis*, and/or *Bacillus cohnii*.

In various embodiments, the precursor may include urea or magnesium lactate. The precursor may be based on the carbon dioxide-producing bacteria used. For instance, *Sporosarcina pasteurii, Bacillus sphaericus*, and *Bacillus subtilis*, may hydrolyse specifically urea. In another example, *Bacillus cohnii* may hydrolyse specifically magnesium lactate. Other suitable precursor may be used depending on the bacteria. As a precursor may depend on a specific bacteria used, the precursor may be termed herein a "corresponding $CO_2$ precursor".

In various embodiments, mixing the aqueous suspension with the precursor may include dissolving the precursor in water prior to mixing the aqueous suspension with the precursor.

In the present method, mixing the aqueous suspension with the precursor may be for a duration of 30 seconds or less, 25 seconds or less, 20 seconds or less, 15 seconds or less, 10 seconds or less, 5 seconds or less, etc. Advantageously, this prevents over-consumption of the precursor prior to mixing with the reactive magnesia cement.

In various embodiments, mixing the aqueous mixture with the reactive magnesia cement may be carried out with the water of the aqueous mixture and the reactive magnesia cement present in a weight ratio of 0.43 to 0.7, 0.43 to 0.5. Advantageously, these ratios help provide a sufficient amount of carbonation agents for internal carbonation of the reactive magnesia cement, which in turn improves compressive strength of the reactive magnesia cement.

The present method may further include mixing the reactive magnesia cement with a hydration agent prior to mixing the reactive magnesia cement with the aqueous mixture. In certain non-limiting instances, the hydration agent may be first added to the reactive magnesia cement and mixed for a few minutes, such as but not limited to 10 mins, 5 mins, 2 mins, 2 to 5 mins, etc., followed by addition of carbon dioxide-producing bacteria. In various embodiments, the hydration agent may include hydrochloric acid, magnesium acetate, or magnesium chloride.

The present method may further include mixing the aqueous suspension with seed particles. The seed particles may include hydromagnesite, carbon nanotubes, nano-sized silicon dioxide, nano-sized titanium dioxide, or carbon nanofibers. In various embodiments, mixing the aqueous suspension with the seed particles may include dispersing the seed particles in water.

The present method may further include mixing coarse aggregates with the blend prior to curing the blend. The inclusion of coarse aggregates helps introduce voids to promote carbonation of the RMC through an external source, such as atmospheric $CO_2$. The coarse aggregates may have a size ranging from 4 mm to 10 mm, 5 mm to 10 mm, 6 mm to 10 mm, 7 mm to 10 mm, 8 mm to 10 mm, 9 mm to 10 mm, etc. Non-limiting examples of the coarse aggregates may be basalt, granite, limestone, sandstone, marble, and quartz. The coarse aggregates may include silicon dioxide.

The present method may further include curing the blend at atmospheric pressure, a temperature ranging from −10° C. to 50° C., 25° C. to 35° C., 25° C. to 30° C., 30° C. to 35° C., etc., and a humidity ranging from 75% to 85%, 75% to 80%, 80% to 85%, 75% to 100%, etc.

The present disclosure also provides for a reactive magnesia cement composite formed by the method described in various embodiments of the first aspect. Embodiments and advantages described for the present method of the first aspect can be analogously valid for the present reactive magnesia cement composite subsequently described herein, and vice versa. As the various embodiments and advantages have already been described above and in the examples section, they shall not be iterated for brevity.

In various embodiments, the reactive magnesia cement composite may include a carbon dioxide-producing bacteria, and a X-ray diffraction pattern that includes one peak having a two theta value between 30° and 35° which corresponds to magnesite, one peak having a two theta value between 35° and 40° which corresponds to brucite, one peak having a two theta value between 40° and 45° which corresponds to periclase, and wherein the intensity of the one peak which correspond to brucite is lower in the presence of the carbon dioxide-producing bacteria as compared to another reactive magnesia cement composite which has water present (e.g. water to RMC ratio of 0.5:1) and/or is absent of the carbon dioxide-producing bacteria (i.e. a reactive magnesia composite absent of the carbon dioxide-producing bacteria).

In various embodiments, the X-ray diffraction pattern may further include one peak having a two theta value between 5° and 10° which corresponds to dypingite, and/or one peak having a two theta value between 15° and 20° which corresponds to hydromagnesite.

In various embodiments, the X-ray diffraction pattern may further include one peak having a two theta value between 30° and 35° which corresponds to artinite.

In various embodiments, the carbon dioxide-producing bacteria may include *Sporosarcina pasteurii, Bacillus sphaericus, Bacillus subtilis*, and/or *Bacillus cohnii*.

In summary, the present method provides a bacteria-based method to accelerate and increase the carbonation degree of RMC. In order to provide $CO_2$ internally, *Sporosarcina pasteurii* cells, urea and yeast extract (YE) were mixed directly into RMC pastes together as a non-limiting example of a three-component carbonation agents system. The RMC paste with this bacteria-based carbonation agent may be herein referred to as the bio-RMC paste. Among the carbonation agents, urea is the $CO_2$ precursor and YE serves as the nutrient for the bacteria responsible for releasing the enzyme (urease). With all the components for the carbonation process incorporated in the matrix, the enzyme released from the bacteria catalyses the hydrolysis of urea to generate $CO_2$, which is then used to accelerate the carbonation reaction. The present method provides two main advantages. First, changing the source of $CO_2$ from external to internal fully eliminates limitations associated with the diffusion of $CO_2$ within the depth of a reactive magnesia cement. Second, the present method eliminates the need for any special curing environment such as those provided by incubators/carbonation chambers. This allows the RMC concrete to be cast in-situ and cured on site which greatly increase the potential applications of RMC.

The word "substantially" does not exclude "completely" e.g. a composition which is "substantially free" from Y may be completely free from Y. Where necessary, the word "substantially" may be omitted from the definition of the present disclosure.

In the context of various embodiments, the articles "a", "an" and "the" as used with regard to a feature or element include a reference to one or more of the features or elements.

In the context of various embodiments, the symbol "~", and the terms "about" and "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to a bacteria-based method for internal carbonation of RMC-based systems. In a non-limiting example, ureolytic bacteria, urea, and nutrients for the bacteria are incorporated into RMC-based systems as a carbonation agent to internally provide $CO_2$ for the carbonation. Other $CO_2$-producing bacteria, corresponding $CO_2$ precursor(s) and/or nutrient(s) may be used. Ureolytic bacteria is a type of bacteria with urease-producing ability. Urease is an enzyme that catalyses the hydrolysis of urea into $CO_2$ and $NH_3$, as shown in the equation below.

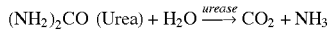

$$(NH_2)_2CO \text{ (Urea)} + H_2O \xrightarrow{urease} CO_2 + NH_3$$

*Sporosarcina pasteurii* (a moderately alkaliphilic bacteria), which is one of the urease-producing bacteria, and urea can both be applied to repair cracks of RMC blends, where the formation of HMCs was observed in the cracks. This reveals a feasibility of utilizing bacteria to provide $CO_2$ for the formation of HMCs. The application of such a method for internal carbonation of RMC-based systems that purely relies on the carbonation process for strength gain is demonstrated herein.

In the present disclosure, influence of the bacteria-based carbonation agent inclusion on the fresh properties (such as strength gain) of RMC was assessed. The hardened properties and microstructure of the resulting bio-RMC pastes were examined. To further evaluate the performance of the bio-RMC pastes, the role of urea was discussed and the potential of using urea as a superplasticizer to reduce water demand was evaluated. For instance, with lower calcination temperature, reactive magnesia cement (RMC) can be a potential alternative to the Portland cement. However, RMC concrete requires accelerated carbonation curing from external sources which greatly hinder the wider applications of RMC. The present examples describe a bacteria-based method for the strength gain of RMC through internal carbonation as mentioned above. *Sporosarcina pasteurii*, urea, and yeast extract were used as non-limiting examples of carbonation agent for internal carbonation of RMC pastes. Results showed that the flowability of the fresh bio-RMC paste increased by 20% while the initial setting time remained unchanged. Besides serving as the $CO_2$ provider, urea can also function as superplasticizer to reduce the water demand of the bio-RMC pastes. The resulting bio-RMC pastes showed a continuous strength gain with time, demonstrating the feasibility of bacteria-induced internal carbonation of RMC. Microstructure analysis revealed abundant formation of hydrated magnesium carbonates in the bio-RMC pastes, which is responsible for the strength gain of the bio-RMC pastes.

The method and reactive magnesia cement composite of the present disclosure also deals with the low hydration and carbonation of reactive MgO cement (RMC) under ambient conditions that may cause prolonged setting and low compressive strengths (~4 MPa). Certain non-limiting examples herein demonstrate a unique technique which led to the enhancement of the hydration and carbonation processes via the synergistic combination of microbial carbonation process (MCP) with a hydration agent (HA) that enabled the self-carbonation of RMC-based mixes without using of any special curing environments. Through hydrolysing urea (CO($NH_2$)$_2$) using ureolytic bacteria, $CO_3^{2-}$ ions were produced to facilitate the carbonation of dissolved $Mg^{2+}$ ions to form hydrated magnesium hydroxy carbonates (HMHCs). The self-carbonation of RMC enabled by the MCP resulted in formation of brucite with a crystallinity that can be improved (if needed) and its rapid conversion into HMHCs, which improved the setting time and compressive strength of RMC-based samples. The simultaneous use of MCP with 2 M urea and HA revealed HMHCs with improved morphologies, resulting in a very high compressive strength (~15 MPa).

The present disclosure also relates to a technique for enhancing hydration and carbonation at both the exterior and core sections of RMC concrete via a synergistic combination of microbial carbonation process (MCP) with nucleation seeding (S). The production of $CO_3^{2-}$ ions via the introduction of urease-producing bacteria to catalyse the hydrolysis of urea enabled self-carbonation of RMC, leading to the formation of HMHCs under ambient conditions. Improvements in $CO_2$ dissolution and formation of brucite with a low crystallinity further stimulated HMHC formation under accelerated carbonation conditions. The simultaneous use of MCP and S resulted in dense microstructures composed of HMHCs with improved morphologies, translating into strengths that were >3 times of the control (62 vs. 20 MPa).

The present method and reactive magnesia cement composite formed by the present method are described in further details, by way of non-limiting examples, as set forth below.

Example 1A: General Discussion of Present Method for Internal Carbonation of RMC-Based Systems The present example demonstrates for an environment-friendly method to accelerate the internal carbonation of RMC-based systems. The present method may be referred herein to as a bacteria-based method, and provides two advantages. First, the present method changes the source of $CO_2$ from external to internal. Therefore, limitations associated with the diffusion of $CO_2$ within the sample depth are entirely eliminated. Second, the present method eliminates the need for any special curing environment such as those provided by incubators/carbonation chambers. Without these restrictions, the manufacture of large-scale RMC components and mass production of related products for commercial use becomes a possibility.

The present bacteria-based method internally provides $CO_2$ for the carbonation of RMC-based systems. Carbonation agents involving $CO_2$-producing bacteria, a $CO_2$ precursor(s) and/or nutrient(s) are incorporated in the RMC-based systems to internally provide $CO_2$ for carbonation. In one example, ureolytic bacteria, urea and nutrients for the ureolytic bacteria are incorporated into a RMC matrix as carbonation agents. Among these carbonation agents, bacteria are responsible for releasing urease to catalyse the hydrolysis of urea to provide $CO_2$. Besides, nutrient that can sustain the bacteria is also applied in order to extend the life of bacteria in the matrix. There are many ureolytic bacteria and nutrients available that can be used in the present method. Table 1 below lists some examples of the bacteria and nutrients.

TABLE 1

Ureolytic bacteria and nutrients

| Ureolytic bacteria | Nutrients |
|---|---|
| Sporosarcina pasteurii | Yeast extract |
| Bacillus sphaericus | Soy broth |
| Bacillus subtilis | Lysogeny broth |
|  | Meat extract |
|  | Peptone |

The method may include the preparation of carbonation agents and the preparation of bio-RMC blends. To prepare the carbonation agents, organic compounds can be simply weighted to form a suitable mixture and bacteria can be incubated and counted according to protocols described hereinbelow. After preparing the bacteria culture, the bacteria cell has to be harvested, for example, by centrifugation or filtration. This procedure is to separate bacteria cell and spent medium. After centrifugation, supernatant should be removed to have only the cell pellet remain. This procedure avoids bringing any substance from the spent medium into the RMC matrix. The compositions of spent medium can be different for different type of bacteria, nutrients and incubating time adopted. Therefore, the potential influence of spent medium on the matrix properties may be difficult to determine. Without the separation procedure, it is possible that a negative effect of spent medium overwhelms the positive effect of bacteria, and lead to strength decrease of the resulting matrix.

As an example, to prepare the fresh bio-RMC blends, the water needed for casting may be divided into two parts and used to dissolve urea and nutrient separately. Then, bacteria cells are resuspended with nutrient solution to avoid the pre-consumption of urea. After separately prepared, the two solutions were mixed and quickly stirred within 20 seconds, and finally blended with cement.

Carbonation agents can be dissolved in water before mixing with the RMC. The reasons include: (1) dissolving in water before mixing with cement can help with the uniform dispersion of the carbonation agents (e.g. bacteria, urea and nutrients) in the cement matrix, (2) the decomposition of the $CO_2$ precursor (e.g. urea) under the action of bacteria is aqueous-based. Hence, if dry $CO_2$ precursor (e.g. urea powder) and dry bacteria cell are added together, the reaction may not occur.

Generally, there may be no requirement to separate the carbonation agents or to add the carbonation agents in certain sequence for carbonation to occur. Nonetheless, to reduce the $CO_2$ precursor (e.g. urea) consumption, the contact time of bacteria and $CO_2$ precursor may be reduced/minimized prior to their addition into a cement blend (e.g. RMC). Therefore, steps may be taken to reduce the contact time of bacteria and $CO_2$ precursor. For example, the water needed for casting can be divided into 3 parts, one part used for dissolving nutrients, one part used for dissolving $CO_2$ precursor and one part used for suspending bacteria. Thereafter, the 3 parts can be quickly mixed together and then added into cement. Similarly, to avoid the pre-consumption of $CO_2$ precursor, the sequence of mixing the carbonation agents may be varied such that the bacteria contact with the $CO_2$ precursor last.

Example 1B: Experimental Description and Characterization Results of Present Method In order to demonstrate the working principle of the present method and reactive magnesia composite, the preparation of carbonation agents and its application in RMC paste are presented here as an example. In this example, the carbonation agents include Sporosarcina pasteurii, urea and yeast extract (YE), where Sporosarcina pasteurii is one of the ureolytic bacteria and YE serves as the nutrient for the bacteria.

Sporosarcina pasteurii (DSM33) was purchased from Leibniz Institute DSMZ. The liquid growth medium for the bacteria contained 1 L 0.13 M tris buffer, 20 g yeast extract, and 8.1 g $NH_4Cl$. Before use, all the ingredients were autoclaved separately. The bacteria culture was aerobically incubated at 30° C. on an orbital shaker with rotation speed 200 rpm. After 20-24 hours, the culture obviously turned turbid, indicating the growth of cells. Serial dilutions and spread plate technique were used to carry out colony-forming unit (CFU) counting, and the culture was stored in 4° C. fridge until use. Before using the culture for casting samples, the volume of the culture needed was calculated according to the equation below.

$$V_{need} = (C_{need} \times W_{RMC})/C_{bc}$$

$V_{need}$ is the volume of the culture needed for casting, $C_{need}$ is the bacteria needed for 1 g RMC, $W_{RMC}$ is the weight of RMC, and $C_{bc}$ is the concentration of the batch culture. Then the bacteria cells were harvested by centrifuging the culture at 5000 rpm for 10 minutes. The supernatant was removed, and the cell pellets were kept and used for casting bio-paste.

The RMC was from International Scientific Pte. Ltd. The chemical compositions and physical properties of RMC, as provided by the supplier, are shown in Table 2. The reactivity of the RMC is 12 seconds, which is obtained by the time needed for the neutralization of 100 ml 0.13 M citric acid monohydrate by 5 g of RMC.

TABLE 2

Chemical composition and physical properties of RMC

| Chemical composition (%) | | | | | | Physical properties | |
|---|---|---|---|---|---|---|---|
| | | | | | | Bulk density | Surface area |
| MgO | CaO | $SiO_2$ | $Fe_2O_3$ | $Al_2O_3$ | LOI | (kg/m$^3$) | (m$^2$/g) |
| 97.75 | 0.85 | 1.13 | 0.12 | 0.16 | 3.8 | 650 | 45 |

The compositional design of RMC pastes with and without carbonation agent is shown in Table 3. In the compositional design, the percentage of urea and yeast extract were calculated based on the weight of RMC, the unit of bacteria CFU/g represents the number of bacteria for 1 g cement, and w/c ratio is the weight ratio of water over RMC.

TABLE 3

Compositional design of each testing group

| | w/c ratio | Urea | YE | Bacteria |
|---|---|---|---|---|
| W0.5 | 0.5 | 0 | 0 | 0 |
| W0.5-U5%-Y-B | 0.5 | 5% | 1.5% | $1.5 \times 10^8$ CFU/g |

Before casting, cement and water were prepared according to the various w/c ratio while YE and urea were weighted separately according to the dosage. Then half of the water was used to dissolve urea, and another half was used to dissolve YE and bacteria cell. Suspending bacteria with YE instead of urea prevents the consumption of urea before casting. After separate preparation, the two solutions were mixed and quickly stirred within 20 seconds, and finally blended with cement. The fresh paste was cast into 50 mm cube moulds and cured at laboratory ambient condition (28±2° C., 80±5% Relative Humidity). After initial hardening for two days, samples were demoulded and cured in the same condition until further tests.

Compression test was carried out on cube samples at ages of 7, 14 and 28 days according to ASTM C109/C109M-13 under a constant loading rate of 55 kN/min. XRD scan was conducted on Panalytical Xpert Pro using Cu Ka radiation (40 kV, 30 mA) with a scanning rate of 0.017° 2θ/step from 5° to 80° 2θ. SEM was conducted on JEOL JSM-7600 F equipment under SEI mode at 5.0 kV voltage.

FIG. 1 shows the compressive strength development of RMC (W0.5) and bio-RMC (W0.5-U5%-Y-B) pastes under constant w/c ratios and curing conditions. RMC pastes demonstrated low strengths that remained stable at around 0.8 MPa throughout the entire 28 days of curing. An alternative scenario was observed in bio-RMC samples, whose strength went up from 1 MPa at 7 days to 2.4 MPa at 28 days. The steady strength development of these samples was an indication of the role of carbonation agent in the carbonation process and associated mechanical performance, resulting in strengths that were three times those of RMC samples.

Figure 2:
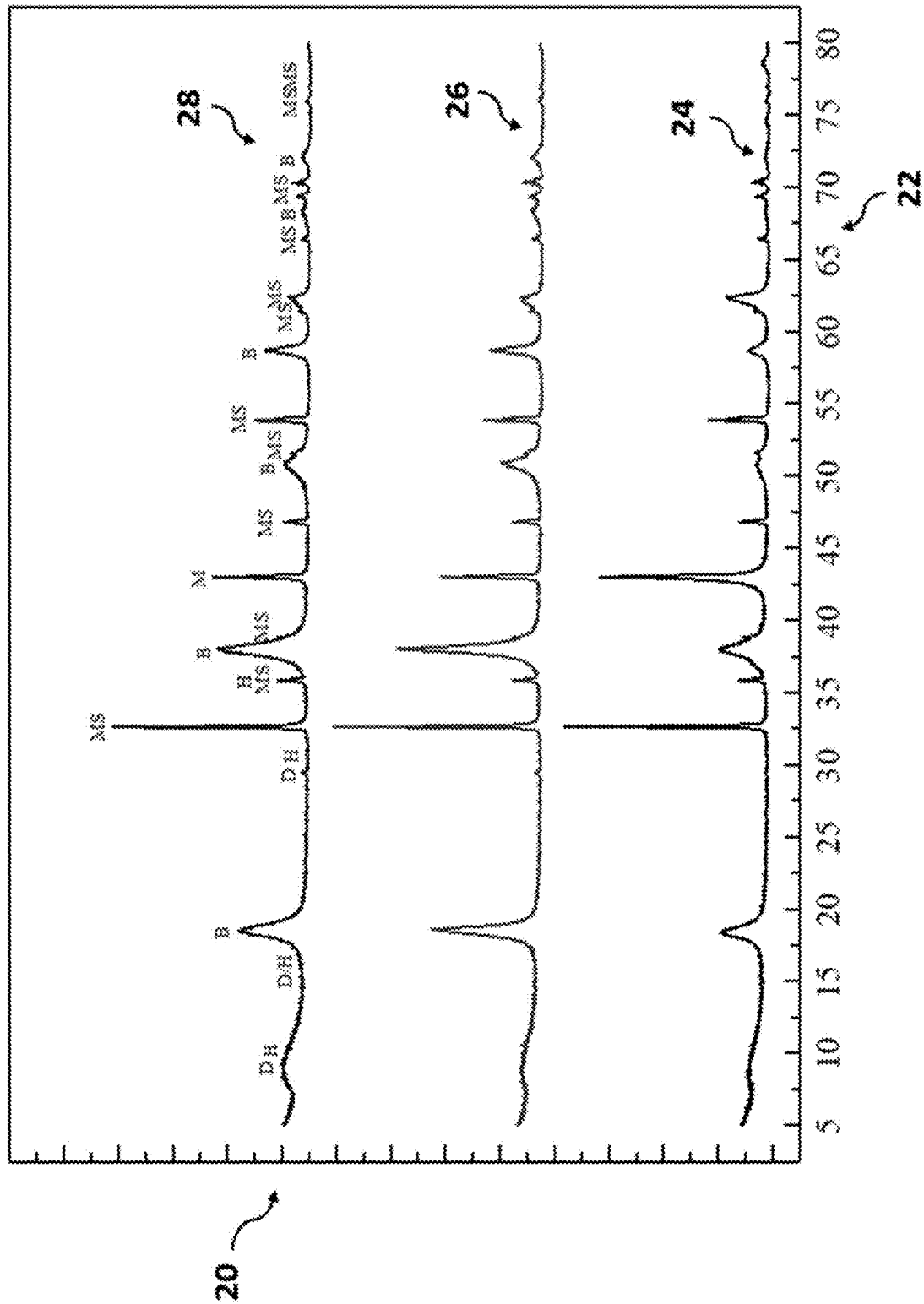
FIG. 2 shows X-ray diffraction (XRD) patterns of RMC powder and RMC pastes with and without carbonation agent at 28 days. 20 denotes for intensity, 22 denotes for 2θ°, 24 denotes for sample RMC, 26 denotes for sample W0.5, and 28 denotes W0.5-U5%-Y-B. In the XRD diagram, B denotes for brucite, D denotes for dypingite, H denotes for hydromagnesite, M denotes for MgO, and MS denotes for magnesite.

FIG. 2 indicates the XRD patterns of RMC powder, RMC (W0.5) and bio-RMC (W0.5-U5%-Y-B) pastes at 28 days. Along with the main peaks of periclase (at 43.0° 2θ), peaks of undecomposed magnesite (at 32.6° 2θ) and brucite (at 38.0° 2θ) were observed in the original RMC powder. The existence of magnesite was associated with the incomplete decomposition of the original material during the decomposition process, whereas brucite could be due to the partial hydration of RMC during storage since Singapore has an average daily humidity of ~81%.

Accordingly, these peaks were also reflected in RMC (W0.5) and bio-RMC (W0.5-U5%-Y-B) pastes. The main carbonate phases observed within these samples were dypingite and hydromagnesite, with main peaks at 8.3° and 15.5° 2θ, respectively. While the intensities of the magnesite and periclase peaks present within each sample were comparable, bio-RMC sample revealed a brucite peak with a lower intensity than that observed in RMC sample. This lower brucite peak could be an indication of the higher utilization of brucite in the carbonation process of bio-RMC sample, in which the carbonation agent was introduced to enable internal carbonation.

Figure 3A:
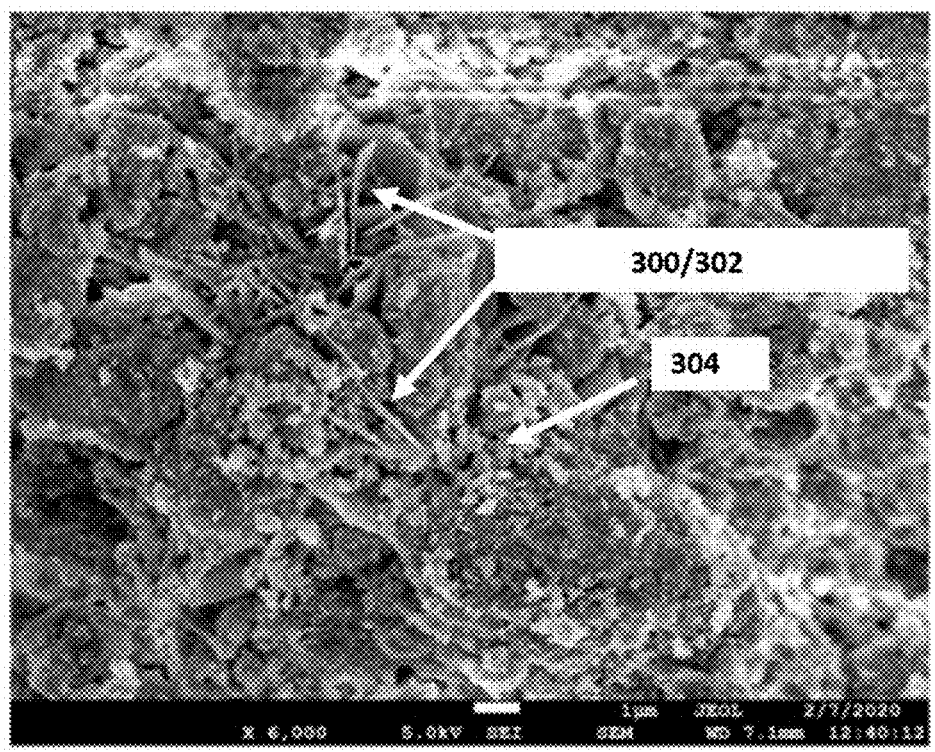
FIG. 3A shows a scanning electron microscopy (SEM) image of RMC paste at 28 days. Scale bar denotes for 1 μm. 300 denotes for dypingite, 302 denotes for hydromagnesite, and 304 denotes for brucite.
Figure 3B:
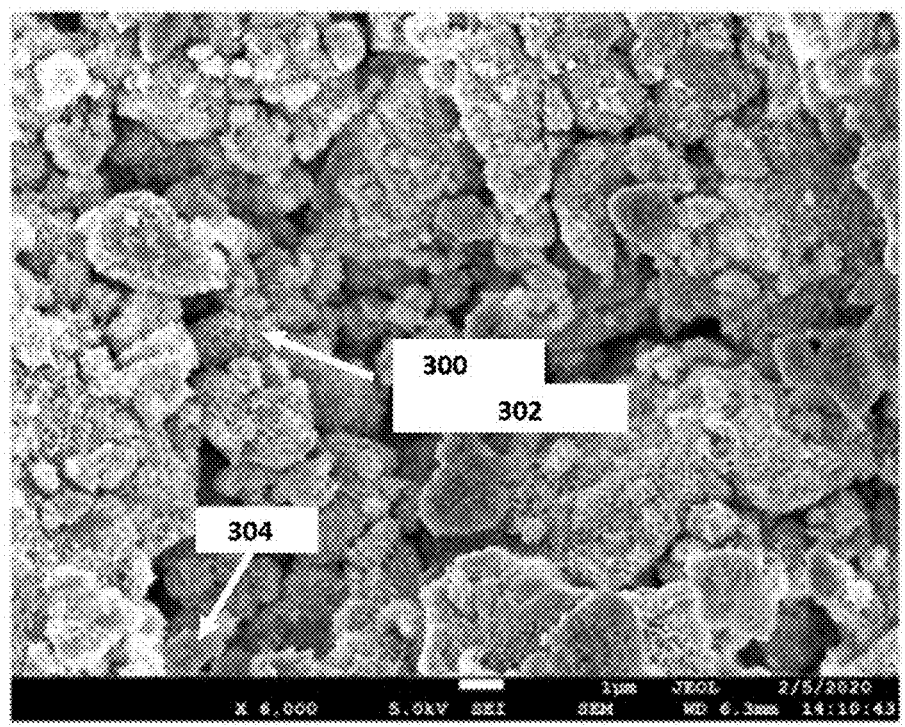
FIG. 3B shows a SEM image of bio-RMC paste at 28 days. Scale bar denotes for 1 μm. 300 denotes for dypingite, 302 denotes for hydromagnesite, and 304 denotes for brucite.
Figure 3C:
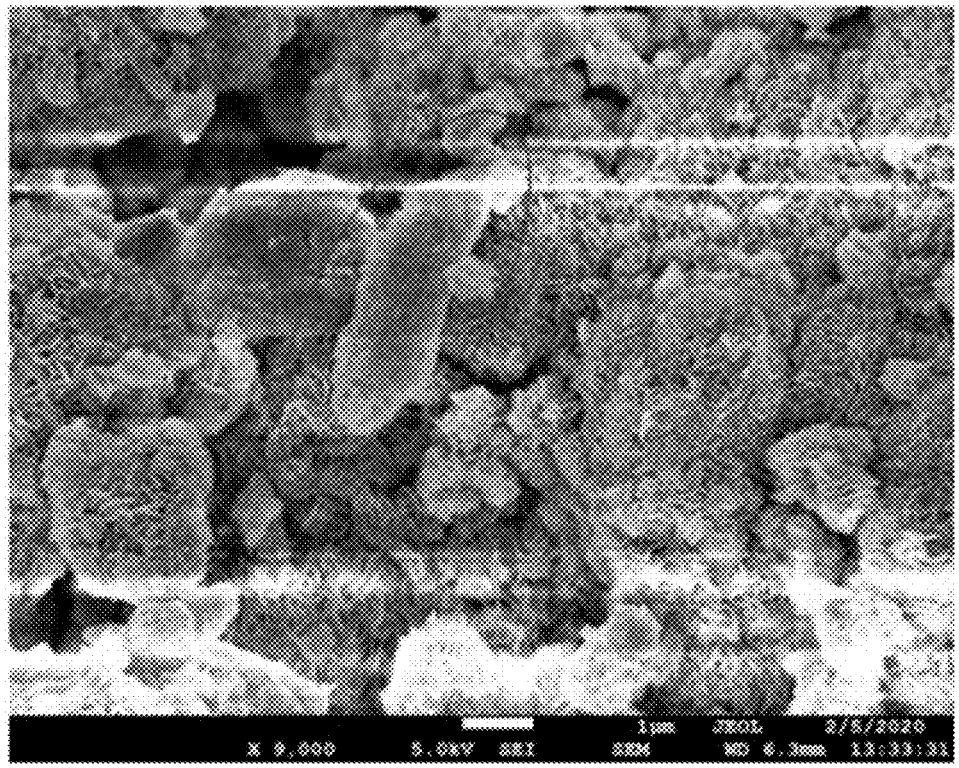
FIG. 3C shows a SEM image of a bacteria-like phase in bio-RMC paste. Scale bar denotes for 1 μm.
Figure 3D:
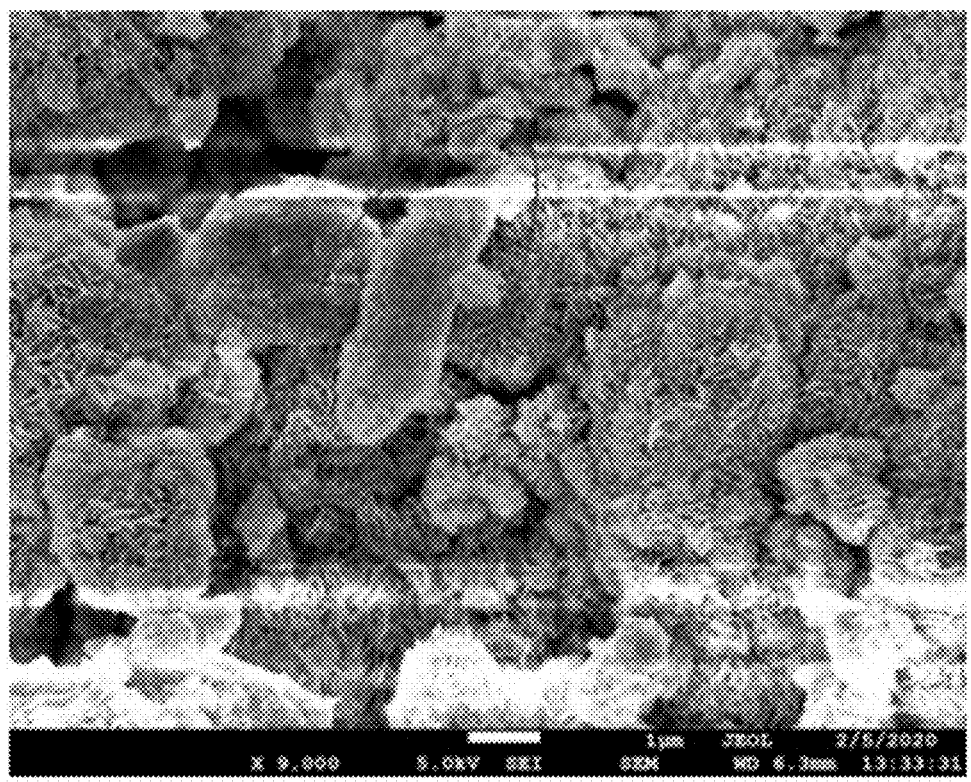
FIG. 3D shows a SEM image of the morphology of the bacteria used in a non-limiting example. Scale bar denotes for 1 μm.

FIGS. 3A and 3B show the microstructures of RMC (W0.5) and bio-RMC (W0.5-U5%-Y-B) pastes at 28 days. In line with the XRD results, both samples revealed the presence of carbonation products resembling the rosette-like morphology of dypingite/hydromagnesite. The main difference observed amongst the two samples was the widespread and dense formation of carbonate phases within the bio-RMC sample, in comparison to the sparse distribution of a few crystals of carbonates in the RMC sample. The higher degree of formation of dypingite/hydromagnesite within the bio-RMC sample was in line with the strength and XRD results, indicating the active role the carbonation agent played in the internal carbonation of RMC samples. Furthermore, the presence of bacteria-like particles could also be observed in the bio-paste, as shown in FIG. 3C. The validity of this observation could be verified via a comparison of this particle with the actual morphology of the bacteria shown in FIG. 3D.

Example 1C: Compositional Design and Sample Preparation

The compositional design in the current example is shown in Table 4 below.

TABLE 4

RMC compositional designs in the current example

| S/N | Name | RMC | Water | Urea | YE | Bacteria (CFU/g RMC) |
|---|---|---|---|---|---|---|
| 1 | W0.5 (control) | 1 | 0.5 | — | — | — |
| 2 | W0.5-B | 1 | 0.5 | — | — | $1.5 \times 10^8$ |
| 3 | W0.5-Y | 1 | 0.5 | — | 0.015 | — |
| 4 | W0.5-U5 | 1 | 0.5 | 0.05 | — | — |
| 5 | W0.5-U10 | 1 | 0.5 | 0.10 | — | — |
| 6 | W0.5-U15 | 1 | 0.5 | 0.15 | — | — |
| 7 | W0.5-U5-Y-B | 1 | 0.5 | 0.05 | 0.015 | $1.5 \times 10^8$ |
| 8 | W0.45-U10-Y-B | 1 | 0.45 | 0.10 | 0.015 | $1.5 \times 10^8$ |
| 9 | W0.43-U15-Y-B | 1 | 0.43 | 0.15 | 0.015 | $1.5 \times 10^8$ |

To study the influences of carbonation agent on the fresh properties of RMC paste, individual component (i.e. bacteria, YE, urea) or their combination was added into the RMC paste (samples 1-7). To reveal the effects of bacteria-based carbonation agent on the hardened properties of the resulting bio-RMC pastes, samples 7-9 were prepared together with the control (sample 1). The name code for each sample strictly follows their compositional design. In the code, the number behinds W denotes the water-to-RMC ratio, the number behinds U denotes the weight percentage of urea with respect to RMC, Y denotes the addition of 1.5 wt. % YE with respect to RMC, and B denotes the use of $1.5 \times 10^8$ CFU bacteria per gram of RMC.

To prepare the fresh samples, half of the water was used to dissolve urea, and another half was used to dissolve YE and bacteria cell. Suspending bacteria with YE instead of urea was to prevent the consumption of urea before casting. To prepare the bio-RMC pastes, the two solutions were mixed and quickly stirred first for 20 seconds. After which, the solution was added into the RMC powder and mixed in a Kenwood KVL6100B mixer for 5-10 minutes until a homogenous state was achieved.

Flowability and setting time of pastes 1-7 were evaluated first to study the influence of urea, YE, and B and their combination on the fresh properties of the resulting pastes. Fresh pastes 1, 7-9 were cast into 50 mm cube moulds and cured at laboratory air (28±2° C., 80±5% RH) to study the hardened properties of the resulting pastes. After initial hardening for two days, samples were demoulded and cured in the same condition until further tests.

Example 1D: Characterization Test for Flowability

Flow table model 63-L0040/A from Controls Group was used for the flowability test in accordance with ASTM C1437. Accordingly, flowability is defined as the increased percentage of the diameter of the paste, as shown in the equation below.

$$\text{Flowability} = (D_{after} - D_{before})/D_{before} \times 100\%$$

where $D_{before}$ is the original inside base diameter and $D_{after}$ is the diameter of the paste after the test, which takes the average of four readings along the four lines scribed in the tabletop.

An automatic Vicat apparatus was used for the measurement of setting time in accordance with ASTM 191. After mixing, the fresh paste was placed on the apparatus for 7 hours before the penetration test. The penetrating interval was 30 minutes over a duration of 18.5 hours. The penetration depth was automatically recorded to monitor the setting process of the sample.

The compression test was carried out on cube samples at ages of 7, 14 and 28 days according to ASTM C109/C109M-13. A Toni Technik Baustoffprüfsysteme machine was used to determine the maximum load capacity of the sample under a constant loading rate of 55 kN/min. Each set of test contains at least three cubes and the average of the three tests were reported.

Fractured samples from the compression test were collected and stored in isopropanol for 7 days to stop hydration, followed by vacuum drying for 1 day. After the treatment, fragments were collected and coated with platinum using an auto fine coater (JEOL JFC1600) under 20 mA current for 40 seconds. Then the coated sample were studied through JEOL JSM-7600 F equipment under SEI mode at 5.0 kV voltage. For the XRD scan, fragments were first crushed using a mortar and then sieved through a 75 μm mesh. The XRD scan was conducted on Panalytical Xpert Pro using Cu Kα radiation (40 kV, 30 mA) with a scanning rate of 0.017° 2θ/step from 5° to 80° 2θ.

Example 1E: Results and Discussion on Flowability

Figure 4:
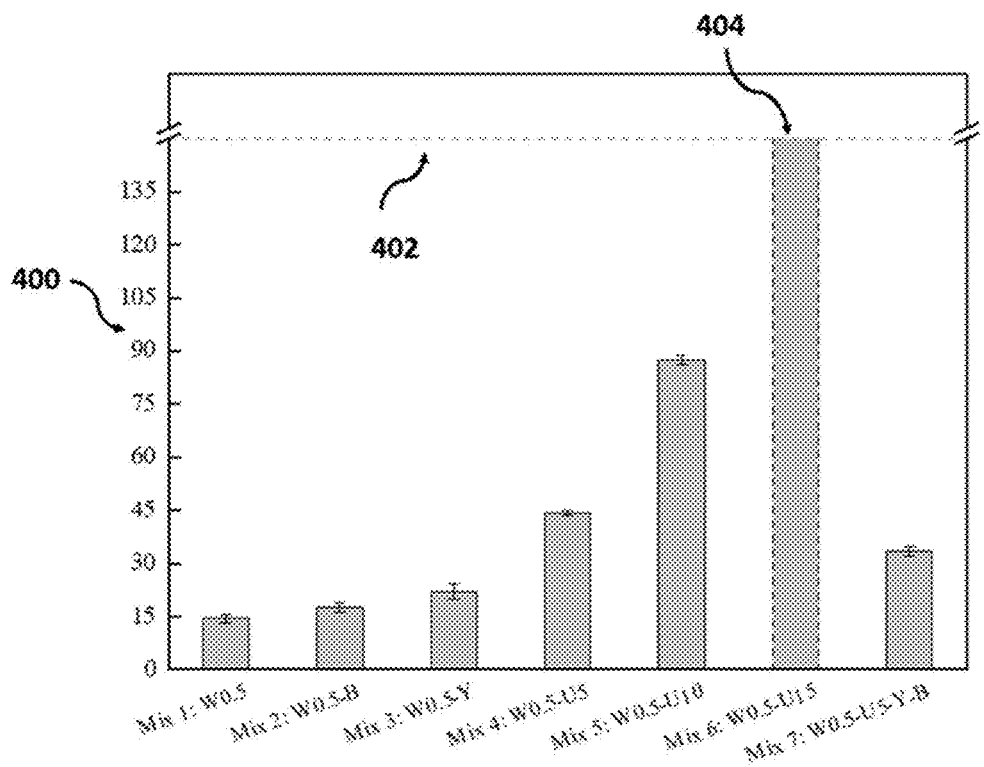
FIG. 4 is a plot of flowability of various RMC pastes. 400 denotes for flowability (%), 402 denotes for the measurable limit at 150%, and 404 denotes for the bar exceeding 150%.

FIG. 4 compares the flowability of RMC pastes with the inclusion of individual component of carbonation agent (i.e., bacteria, YE, urea) and their combination. The diameter of the flow table is 254 mm and the inner diameter of the flow mould is 101.6 mm. According to the equation above for calculating flowability, the maximum measurable flowability is 150%. As can be seen, the inclusion of individual component of carbonation agent results in increased flowability of RMC paste. Among the three components, urea addition leads to the most significant improvement of the flowability. For example, the addition of 5% urea results in a triply increase on the flowability of RMC paste from 14.4% to 44.2%. At 10% urea inclusion, the flowability can reach 87.5%. With 15% urea addition, the flowability of the RMC paste was beyond the measurable limit of the flow table (i.e., 150%). With the inclusion of the complete carbonation agent set (W0.5-U5-Y-B), the flowability increased by 19% when compared to the control (W0.5). This shows the inclusion of bacteria-based carbonation agent in RMC paste is beneficial in terms of flowability. It is worth noting that the flowability enhancement by adding the complete set of carbonation agent is lower than that by including only the urea. This may be attributed to the metabolic activity of bacteria which catalyses the hydrolysis of urea during sample preparation and testing.

Example 1F: Results and Discussion on Initial Setting Time

Figure 5:
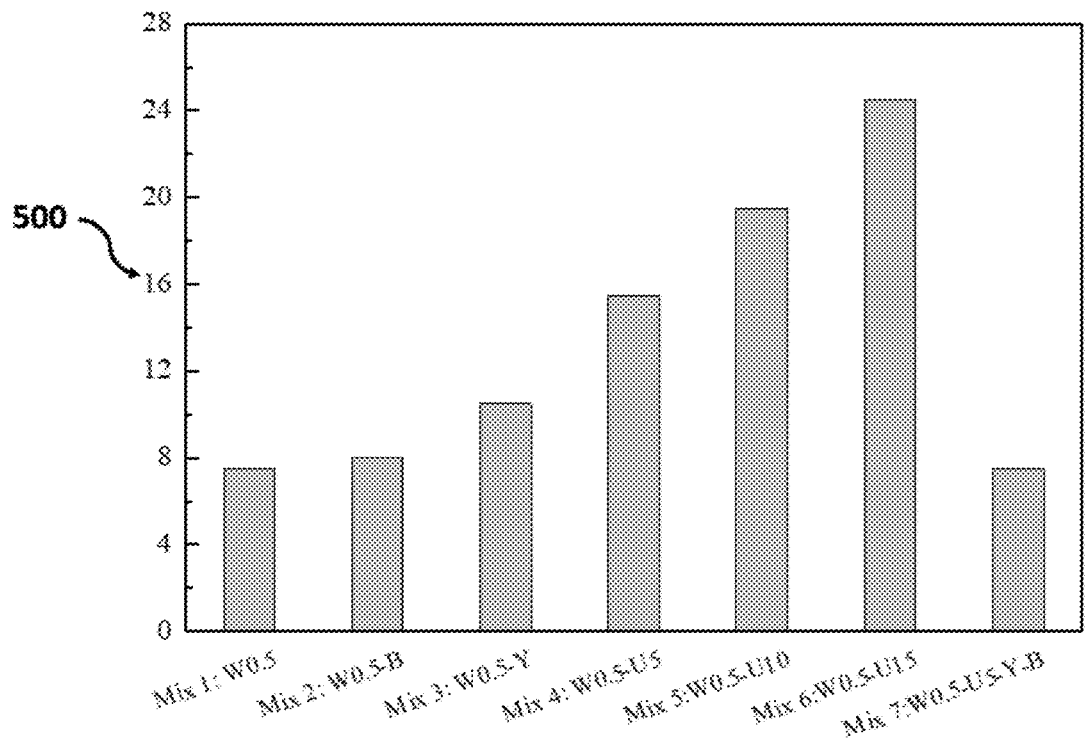
FIG. 5 is a plot of the initial setting time of various RMC pastes. 500 denotes for initial setting time (hrs).

The initial setting time of RMC pastes 1-7 is shown in FIG. 5. As can be seen, the inclusion of individual component of carbonation agent results in increased initial setting time of fresh RMC paste. Among the three components, urea addition leads to the most significant delay of the initial setting time. With 5% of urea added into the RMC paste, the initial setting time is delayed from 7.5 hours to 15.5 hours. When the addition of urea increased to 15%, the initial setting is further delayed to 24.5 hours. The significant delay of setting may be attributed to the abrupt and drastic temperature reduction when urea dissolves in water. The dissolution of urea in water is an endothermic process. Therefore, the inclusion of urea during mixing and setting reduced the temperature of the pastes, prolonging the setting time. While the addition of urea and YE delays the initial setting, the addition of the complete set of carbonation agent (W0.5-U5-Y-B) results in comparable initial setting time around 7.5 hours to the control RMC (W0.5). This is again believed to be attributed to the metabolic activity of bacteria which catalyses the hydrolysis of urea during setting where urea and water were continuously consumed through the hydrolysis of urea. Furthermore, $CO_2$ generated from the hydrolysis of urea leads to carbonation of brucite and formation of HMCs resulting in comparable setting time to the control. This highlights the inclusion of bacteria-based carbonation agent in RMC paste does not delay the initial setting time of the RMC samples.

Example 1G: Results and Discussion on Compressive Strength

Figure 6:
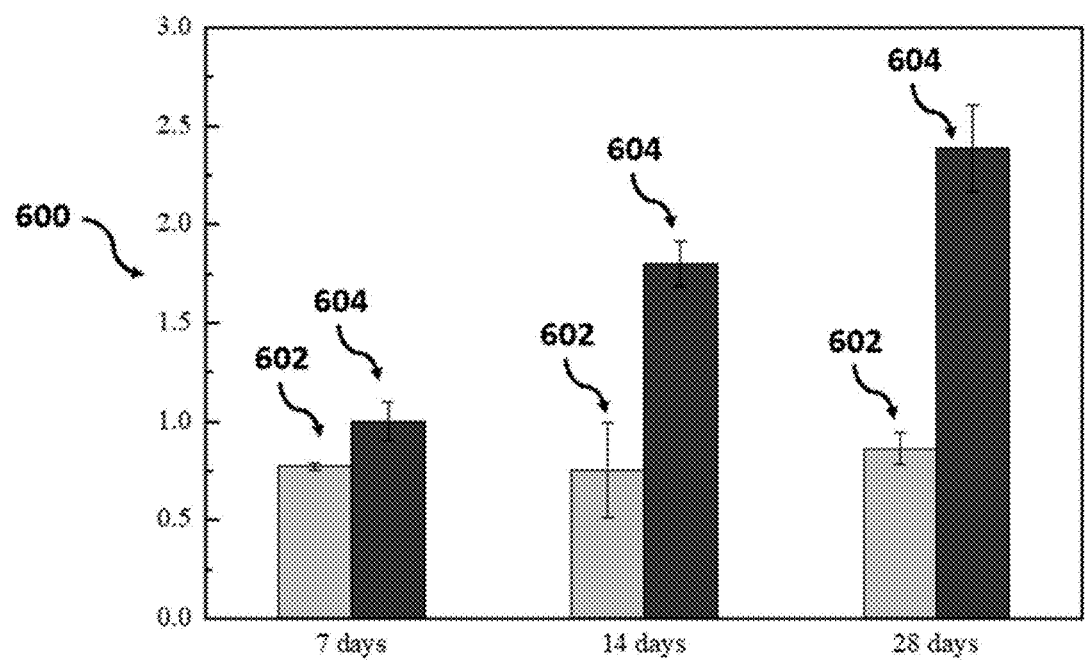
FIG. 6 is a plot of compressive strength of RMC pastes with and without carbonation agent at different ages. 600 denotes for compressive strength (MPa), 602 denotes for sample W0.5 (sample 1), and 604 denotes for sample W0.5-U5-Y-B (sample 7).

The compressive strength development of the control RMC (W0.5) and the bio-RMC (W0.5-U5-Y-B) pastes is shown in FIG. 6. RMC pastes demonstrated low strengths that remained stable at around 0.8 MPa throughout the entire 28 days of curing. These constantly low strengths were due to the low $CO_2$ content, i.e. 0.04%, in air. An alternative scenario was observed in bio-RMC samples, whose strength went up from 1 MPa at 7 days to 2.4 MPa at 28 days. The steady strength development of these samples was an indication of the role of bacteria-based carbonation agent in the carbonation process and associated mechanical performance, resulting in strength that were three times that of the control RMC sample.

Although PC pastes present a relatively harsh environment for bacteria due to their high alkalinity that can inactivate bacteria, the lower pH of RMC pastes than those of PC pastes could present an advantage for bacterial activity. The pH of the pore solution of RMC pastes without carbonation may range between 10.2 and 10.5. Accordingly, *Sporosarcina pasteurii* was found to retain around 40% of its precipitation ability at a pH of 10. Therefore, the lower pH environment presented by RMC could explain the higher strengths of bio-RMC samples in line with the survival of some bacteria, for which the presence of YE in the same environment acted as a nutrient. The urease released by bacteria was also reported to retain ~80% of its activity at a pH of 10. Therefore, even if the bacteria were not active, the enzyme still functioned in the system. However, the effectiveness of the bacteria-based carbonation agent decreased over time, as revealed by the lower increasing rate in strength from 14 to 28 days (0.04 MPa/day), when compared to the initial increase from 7 to 14 days (0.11 MPa/day). This reduction in strength development might be associated with the number of viable bacteria cells, which decreased with time, leading to a reduction in the urea decomposition rate. Another reason for the decline of carbonation efficiency was linked with the consumption of urea and water over time, limiting their further access by bacteria.

Example 1H: Results and Discussion on Microstructure

The XRD patterns of RMC powder, control RMC (W0.5) and bio-RMC (W0.5-U5-Y-B) pastes at 28 days are shown in FIG. 2. Along with the main peaks of periclase (at 43.0° 2θ), peaks of undecomposed magnesite (at 32.6° 2θ) and brucite (at 38.0° 2θ) were observed in the original RMC powder. The existence of magnesite was associated with the incomplete decomposition of the original material during the decomposition process, whereas the presence of brucite could be due to the partial hydration of RMC during storage since Singapore has an average daily humidity of ~81%.

Accordingly, these peaks were also reflected in the control RMC (W0.5) and the bio-RMC (W0.5-U5-Y-B) pastes. The main carbonate phases observed within these samples were dypingite and hydromagnesite, with main peaks at 8.3° and 15.5° 2θ, respectively. While the intensities of the magnesite and periclase peaks present within each sample were comparable, the bio-RMC sample revealed a brucite peak with a lower intensity than that observed in the control RMC sample. This lower brucite peak could be an indication that more brucite in the bio-RMC sample has been carbonated due to the introduction of carbonation agent for internal carbonation.

The microstructures of the control RMC (W0.5) and bio-RMC (W0.5-U5-Y-B) pastes at 28 days are shown in FIGS. 3A and 3B, respectively. In line with the XRD results, both samples revealed the presence of carbonation products resembling the rosette-like morphology of dypingite/hydromagnesite. These phases were surrounded by brucite and unreacted MgO particles, explaining the relatively low strength performance demonstrated by both samples, compared to typical structure materials.

The main difference observed amongst the two samples was the more widespread and denser formation of carbonate phases within the bio-RMC sample, in comparison to the sparse distribution of a few crystals of carbonates in the RMC sample. The higher degree of formation of dypingite/hydromagnesite within the bio-RMC sample was in line with the strength and XRD results, indicating the active role the carbonate agent played in the internal carbonation of RMC samples. Furthermore, the presence of bacteria-like particles could also be observed in the bio-paste, as shown in FIG. 5C. The validity of this observation could be verified via a comparison of this particle with the actual morphology of the bacteria shown in FIG. 5D.

Example 1I: Summarized Discussion of Experimental Results

Figure 7:
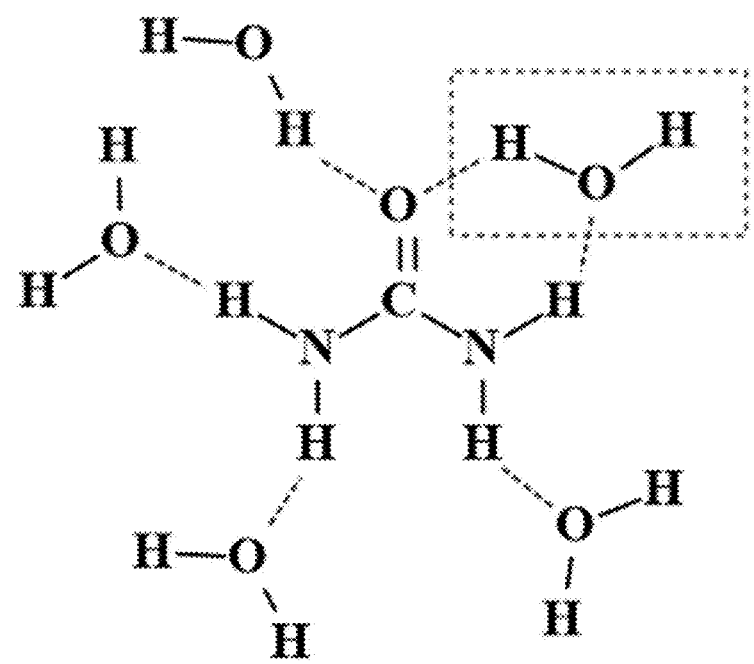
FIG. 7 shows solvation structure of urea molecules in water.

As the direct source of $CO_2$, urea plays an important role in this example. However, above results have revealed that urea significantly brought up the flowability and prolonged the initial setting of the paste. This may be attributed to the interaction between urea and water molecules in the solution. Both water and urea molecules are polar molecules, between which hydrogen bonds are easily formed. Rezus and Bakker proposed the solvation structure of urea in water as shown in FIG. 7. Two types of water molecules, i.e., bulk-like water molecules and strongly immobilized water molecules, were found in urea solution. According to quantum chemical calculations, a water molecule has the fitting size to simultaneously form two hydrogen bonds with urea (dashed area in FIG. 7), where one hydrogen bond donates electrons to the carbonyl oxygen of urea and another hydrogen bond accepts electrons from urea. This doubly hydrogen-bonded water molecule is considered as strongly immobilized by urea molecule. Besides, they also found that some water molecules are even part of two hydration shells, indicating one water molecule is possible to be shared by two urea molecules.

Figure 8:
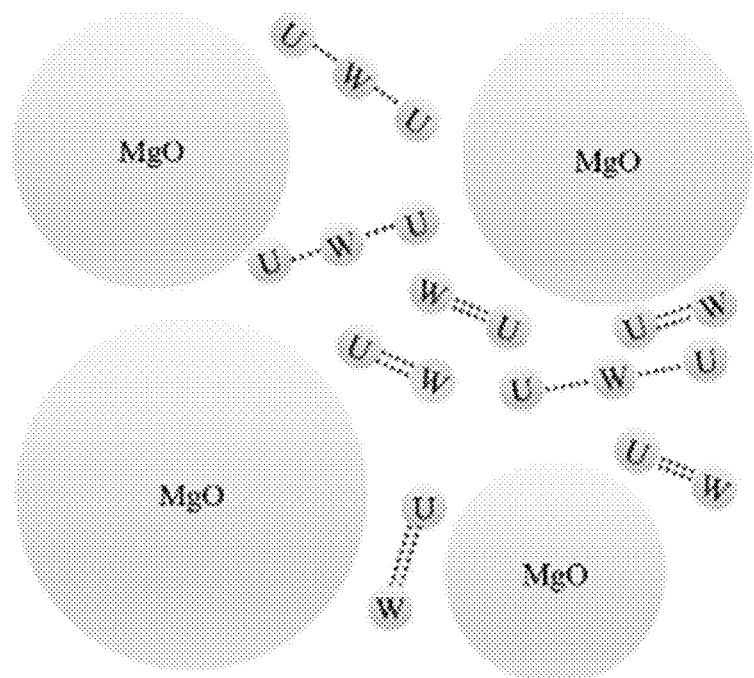
FIG. 8 is a schematic illustration of strongly immobilized water molecules with urea in the paste. W denotes for water molecules, U denotes for urea molecule, and dotted lines denote for hydrogen bond.

When the urea contained solution was applied to cement, the bulk-like water can directly contact with cement particles. However, water molecules that were strongly immobilized or shared by two urea molecules were not immediately accessible by cement as they were 'protected' by urea. These protected water molecules by urea was able to flow freely in the fresh paste and act as "lubricant" to enhance the flowability of MgO paste as illustrated in FIG. 8. In fact, similar results have also been observed in PC and geopolymer samples.

Figure 9:
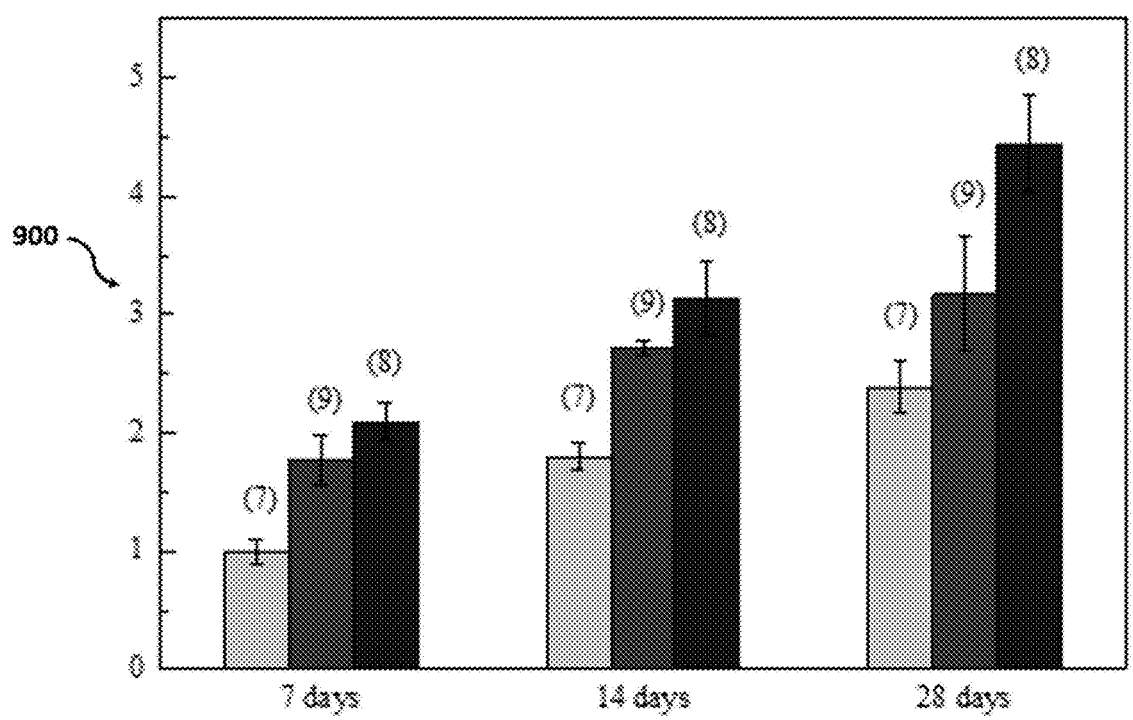
FIG. 9 is a plot of compressive strength of bio-RMC pastes (samples 7-9) at different ages. 900 denotes for compressive strength (MPa).
Figure 12:
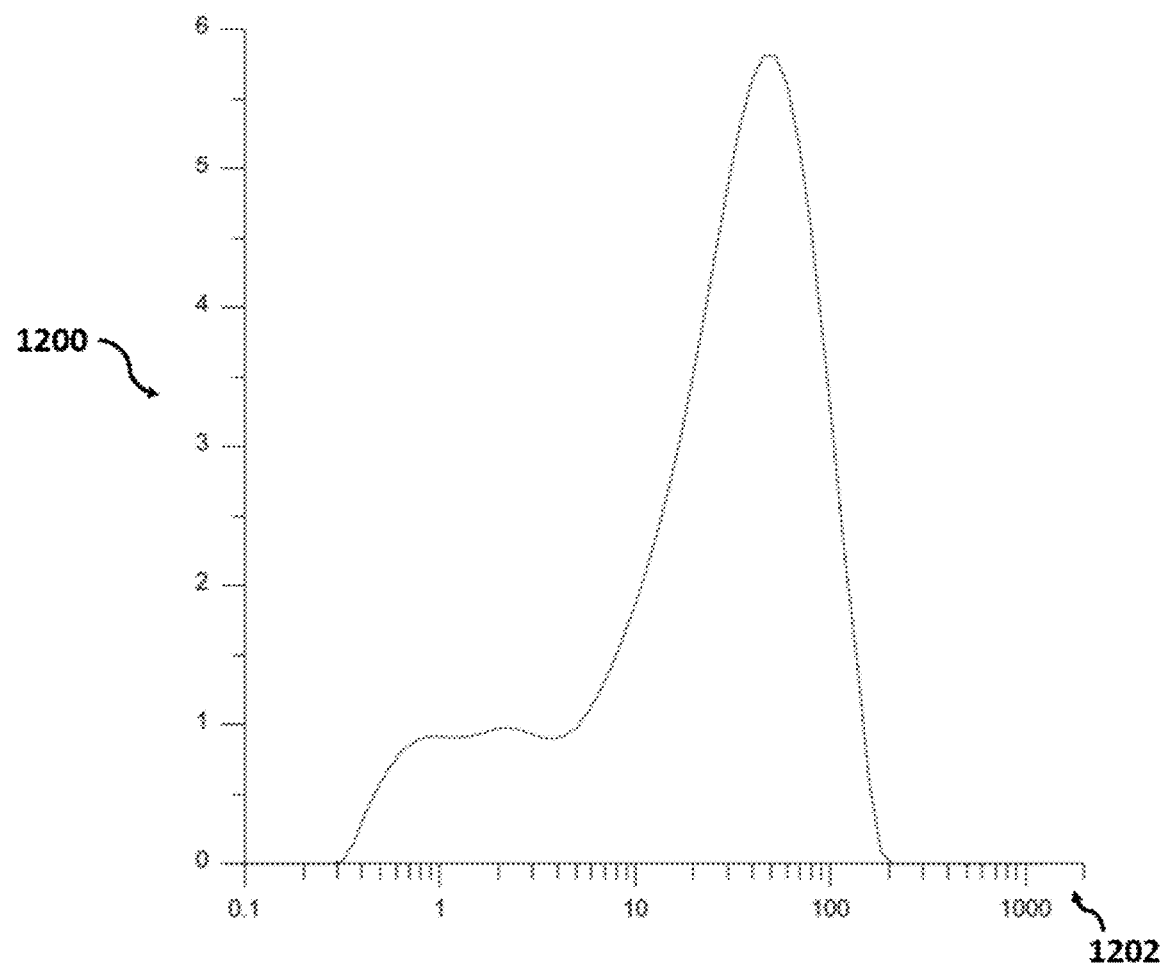
FIG. 12 shows the particle size distribution of RMC. 1200 denotes for volume (%) and 1202 denotes for particle size (μm).
Figure 13:
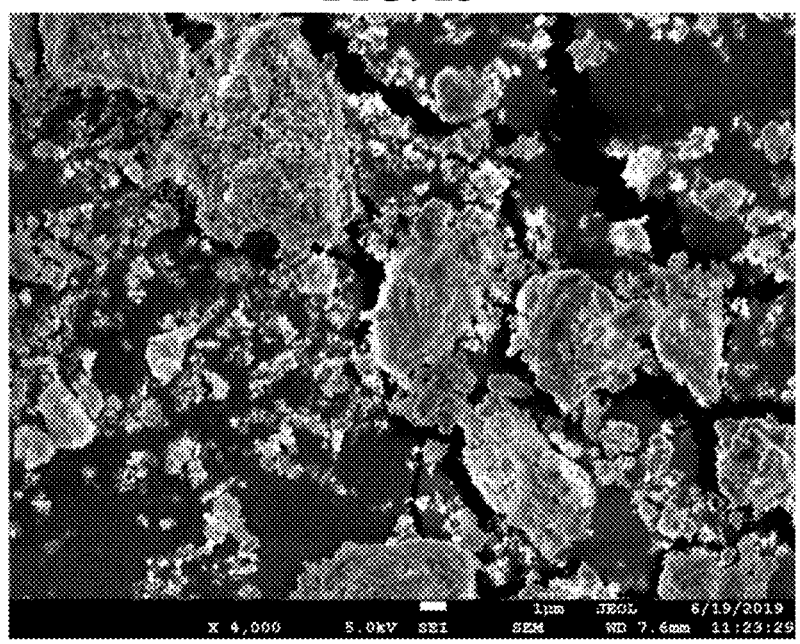
FIG. 13 shows a SEM image of RMC. Scale bar denotes 1 μm.

Thus, urea has the potential to function as a superplasticizer in MgO paste. One way to improve the strength of the bio-RMC paste is to reduce the water-to-RMC ratio (w/RMC) while using urea as a superplasticizer to maintain required workability. Sample 8 (W0.45-U10-Y-B) with w/RMC=0.45 and 10% urea, and sample 9 (W0.43-U15-Y-B) with w/RMC=0.43 and 15% urea were prepared to evaluate the performance of the resulting bio-RMC pastes. FIG. 9 compares the compressive strength of the three bio-RMC pastes (compositional mixes 7-9) at different ages. As can be seen, both samples 8 and 9 have shown higher strength than sample 7 with w/RMC=0.5 and 5% urea. The results indicate urea not only can serve as $CO_2$ provider for internal carbonation of brucite but also can function as water reducer to lower water demand. Both help to reduce porosity and to enhance strength of RMC pastes.

Specifically, sample 8 (W0.45-U10-Y-B) presented the highest compressive strength in the current example while the w/RMC ratio of sample 8 is higher than that of sample 9. This may be understood by the role and function of water in the bio-RMC paste system. Water is necessary for the hydration of MgO and the hydrolysis of urea. It is plausible sample 9 with the lowest w/RMC ratio and the highest amount of urea did not have sufficient water for MgO hydration and urea hydrolysis. While lower w/RMC ratio in sample 9 reduced the initial porosity in the system, insufficient water led to low degree of hydration and carbonation resulting in lower strength when compared to a more balanced system of sample 8. Further studies may be necessary to further improve the performance of the bio-RMC pastes.

From the above examples and present results, it is demonstrated that the present method is bacteria-based method advantageous for the strength gain of RMC through internal carbonation. *Sporosarcina pasteurii*, urea, and YE were used as a bacteria-based carbonation agent and mixed directly into RMC pastes. The inclusion of bacteria-based carbonation agent resulted in a 20% improvement in the paste flowability while no noticeable change in the initial setting time. Urea not only can serve as the $CO_2$ provider but also can potentially function as a superplasticizer to reduce the water demand in the bio-RMC pastes. The resulting bio-RMC pastes showed a continuous strength gain with time which demonstrated the feasibility of bacteria-induced internal carbonation of RMC. Microstructure analysis revealed abundant formation of dypingite/hydromagnesite with less brucite in the bio-RMC pastes, which is responsible for the strength gain of the bio-RMC pastes due to bacteria-induced internal carbonation.

Example 1J: Summary of Various Embodiments of the Present Method

The method discussed in examples 1A and 1B may involve a composition for carbonating reactive magnesia cement. The composition may include a suspension of $CO_2$ producing bacteria, a $CO_2$ precursor and/or nutrient(s) to be mixed with a reactive magnesia cement. These components may be collectively termed herein as a "carbonation agent" or "three-component carbonation agent".

The present method may include (a) mixing a suspension of $CO_2$-producing bacteria, a corresponding $CO_2$ precursor and/or nutrient(s) with a reactive magnesia cement, and (b) curing the mixture at ambient temperature and ambient pressure with a relative humidity of 75 to 85% for more than 7 days.

The composition and/or method of carbonating reactive magnesia cement may be used for internal carbonation of reactive magnesia cement. For example, further introduction of carbon dioxide from environment may not be necessary when the present composition and/or method is used. The composition and/or method of carbonating reactive magnesia may also be used for accelerated carbonation curing of reactive magnesia cement.

Any suitable $CO_2$-producing bacteria (e.g., bacteria that are harmless to human being and/or environment) and the corresponding $CO_2$ precursor may be used as long as the $CO_2$-producing bacteria allow the corresponding $CO_2$ precursor form $CO_2$. For example, the $CO_2$-producing bacteria may be ureolytic bacteria and the corresponding $CO_2$ precursor may be urea. Ureolytic bacteria produces urease, an enzyme that catalyses the hydrolysis of urea into $CO_2$ and $NH_3$. The ureolytic bacteria may comprise *Sporosarcina pasteurii*, *Bacillus sphaericus* and/or *Bacillus subtilis*.

The $CO_2$-producing bacteria may be $CO_2$-producing bacteria without spent medium. That is, the $CO_2$-producing bacteria is separated from the spent medium used to grow the bacteria. Hence, the method may further comprise separating the $CO_2$-producing bacteria from the spent medium prior to mixing in step (a) of the method mentioned above. The separation may be carried out via centrifugation at from about 5000 rpm to about 6000 rpm. For example, the centrifugation may be carried out at 5000 pm for 10 minutes.

The suspension of $CO_2$-producing bacteria and the corresponding $CO_2$ precursor and/or nutrient(s) may include a solvent. The solvent may be an aqueous solvent, e.g., water. The solvent-to-reactive magnesia cement ratio may be from about 0.43 to about 0.5.

The weight percentage of the corresponding $CO_2$ precursor with respect to the reactive magnesia cement may be from about 5 wt % to about 15 wt %.

The weight percentage of nutrient with respect to the reactive magnesia cement may be from about 1 wt % to about 2 wt %. The nutrients may include yeast extract, soy broth, lysogeny broth, meat extract and/or peptone.

The amount of $CO_2$-producing bacteria may be from about $1\times10^8$ to $1\times10^9$ CFU bacteria per gram of reactive magnesia cement.

The mixture of the reactive magnesia cement with the suspension of $CO_2$-producing bacteria, the corresponding $CO_2$ precursor and/or nutrient(s) may have a flowability of from about 40% to about 100% measured in accordance with ASTM C1437, facilitating the casting of the resulting cement paste without causing any bleeding.

The mixture of the reactive magnesia cement with the suspension of $CO_2$-producing bacteria, the corresponding $CO_2$ precursor and/or nutrient(s) may have an initial setting time of from about 8 hours to about 20 hours measured in accordance with ASTM 191.

The cured mixture of the reactive magnesia cement with the suspension of $CO_2$-producing bacteria, the corresponding $CO_2$ precursor and/or nutrient(s) may have a compressive strength (at day 28 of curing) that is from about 3 to about 5 times the compressive strength of cured reactive magnesia cement only measured in accordance with ASTM C109/C109M-13.

The suspension of $CO_2$-producing bacteria, the corresponding $CO_2$ precursor and/or nutrient(s) may be present in one or more suspensions. Preferably, the $CO_2$-producing bacteria and the corresponding $CO_2$ precursor are in separate suspensions. In this regard, the method may further comprise dividing the required amount of solvent into at least two portions and suspending at least the $CO_2$-producing bacteria and the corresponding $CO_2$ precursor separately in the at least two portions of the solvent. Thereafter, the at least two portions are mixed, e.g., for about 20 seconds to 30 seconds, prior to adding to the reactive magnesia cement powder. The final mixture was then mixed until a homogeneous state was achieved.

The ambient temperature of curing step (b) of the method may be room temperature, e.g., 28±2° C. The ambient pressure of curing step (b) may be atmospheric pressure, e.g., about 1 atm, 0.99 atm to 1 atm.

Example 2A: Discussion of Microbial Carbonation Process to Enable Self-Carbonation of Reactive MgO Cement Mixes Using Hydration Agents Reactive MgO cement (RMC) has many advantages over Portland cement (PC) such as its lower calcination temperature (700-900° C. vs. 1450° C.), ability to gain strength by permanently sequestrating $CO_2$ and be fully recycled at the end of its lifetime. Carbonated RMC-based samples can obtain higher strengths than the corresponding PC-based samples. When RMC is mixed with water, its hydration leads to the formation of $Mg(OH)_2$ (aq,s) (Eq. (1)), which then reacts with $CO_2$ (g,aq) during carbonation to form hydrated magnesium hydroxy carbonates (HMHCs) (Eqs. (2)-(4)). The formation of HMHCs is associated with the provision of bonding strength and the reduction in porosity through the volume expansion of HMHCs, which enable RMC-based samples to harden and gain strength. Nesquehonite, hydromagnesite, and dypingite are the most common HMHCs in RMC-based samples. The formation of HMHCs highly depends on the hydration and carbonation processes, which determine the performance of RMC-based samples. Strength gains as high as 70 MPa within RMC samples that were subjected to accelerated hydration and carbonation processes were achieved. The hydration of RMC:

$$MgO + H_2O \rightarrow Mg(OH)_2 \ (aq, s) \quad (1)$$

The carbonation of $Mg(OH)_2$ (aq,s) to form HMHCs:

$$Mg(OH)_2\ (aq, s) + CO_2 + 2H_2O \rightarrow MgCO_3 \cdot 3H_2O\ \text{(nesquehonite)} \quad (2)$$

$$5Mg(OH)_2\ (aq, s) + 4CO_2 \rightarrow \quad (3)$$
$$4MgCO_3 \cdot Mg(OH)_2 \cdot 4H_2O\ \text{(hydromagnesite)}$$

$$5Mg(OH)_2\ (aq, s) + 4CO_2 + H_2O \rightarrow \quad (4)$$
$$4MgCO_3 \cdot Mg(OH)_2 \cdot 5H_2O\ \text{(dypingite)}$$

Despite their satisfactory performance, high contents of unhydrated MgO and uncarbonated brucite were observed in the carbonated RMC-based samples even after 28 days of curing. The low conversion of MgO to HMHCs was attributed to the formation of impervious brucite and HMHC layers during the initial hydration and carbonation reactions, which inhibited the diffusion of $CO_2$ from the outer surface towards the sample core. The limitation in the carbonation of RMC-based samples was revealed by low carbonation depths, which were reported to be less than ~2 mm and 20 mm for 1- and 3-dimensional carbonation diffusion, respectively. This inhibited diffusion of $CO_2$ into the sample core reduced the utility of RMC and the effectiveness of the carbonation process. In line with this limited use of RMC as a binder necessitated the use of accelerated carbonation curing immediately after casting to enable the proper demolding of samples without any damage. However, the reliance on the use of special curing chambers for sufficient strength gain is not only costly but also reduces the productivity and effectiveness of using RMC as a binder in different building applications. Furthermore, the supply of highly concentrated $CO_2$ gas may not always be available due to the reduction in the demand for coal power (i.e. especially in western countries), as well as the continuously increasing costs of $CO_2$ capture and storage processes. In line with these critical issues hindering the effective use of RMC as a binder, this example aims to provide a more practical approach that can enable the internal carbonation of RMC-based formulations without the need for any special curing environment. This was enabled via the use of microbial carbonation process (MCP), which is a method that can facilitate the accelerated self-carbonation for RMC under ambient conditions. The proposed technique could provide a high concentration of carbonate ions ($CO_3^{2-}$) within RMC samples, thereby enabling the accelerated transformation of the unhydrated MgO and uncarbonated brucite into HMHCs within RMC-based mixes, without necessitating the use of a carbonation chamber. Recently, the MCP has been employed to form a new construction binder. The mechanism of MCP involves the hydrolysis of urea ($CO(NH_2)_2$) to produce $CO_3^{2-}$ ions, initiated by an introduction of ureolytic bacteria (Eqs. (5)-(9)). This is followed by the reaction between $CO_3^{2-}$ ions and supplied alkali cations (e.g. $Ca^{2+}$, $Mg^{2+}$), resulting in the formation of various carbonates (e.g. $CaCO_3$, HMHCs). This method has successfully been applied for sealing cracks in concrete samples, solidifying sandy soil, and improving performance of soil samples. Urease-producing bacteria (UPB) catalyse the hydrolysis of urea to generate carbonic acid ($H_2CO_3$) and ammonia ($NH_3$):

$$CO(NH_2)_2 + H_2O \rightarrow NH_2COOH + NH_3 \quad (5)$$

$$NH_2COOH + H_2O \rightarrow NH_3 + H_2CO_3 \quad (6)$$

The dissolution of $NH_3$ into water releases ammonium ($NH_4^+$) and hydroxide ($OH^-$) ions.

$$NH_3 + H_2O \leftrightarrow NH_4^+ + OH^- \quad (7)$$

The release of $OH^-$ ions is associated with the increase in pH value, and thus stimulate the producing of bicarbonate ($HCO_3^-$) and carbonate ($CO_3^{2-}$) ions:

$$H_2CO_3 \leftrightarrow HCO_3^- + H^+ \quad (8)$$

$$HCO_3^- + H^+ + 2NH_4 + +2OH^- \leftrightarrow CO_3^{2-} + NH_4^+ + 2H_2O \quad (9)$$

The carbonate ($CO_3^{2-}$) ions, which are released from urea hydrolysis (Eq. (9)), could react with dissolved $Mg^{2+}$ ions to enable the self-carbonation process of RMC mixes. The self-carbonation process facilitates the formation of HMHCs, which not only improve the strength but also densify the microstructure of RMC mixes, thereby leading to improved durability in the long term. The use of self-carbonation can also reduce the required curing duration of RMC mixes by resulting in strengths that are much higher than those observed in ambient curing conditions. Combining all these benefits, the unique technique demonstrated in this example presents a paradigm shift towards overcoming limitations of RMC as a binder (e.g. limited dissolution, low strength, long curing times under ambient conditions or continuous supply of elevated CO2 levels via special curing arrangements).

To achieve this, the feasibility of accelerated self-carbonation in RMC-based mixes was investigated by the synergistic combination of the MCP with a hydration agent (HA). Four levels of urea concentrations (0.5, 1, 1.5, and 2 M) were used in UPB-urea mixtures to accelerate the carbonation of RMC. Further enhancement of the reaction mechanism was enabled via the simultaneous use of magnesium acetate tetrahydrate ($Mg(CH_3COO)_2 \cdot 4H_2O$), a hydration agent (HA), which accelerated the hydration of RMC and stimulated the carbonate precipitation in the prepared samples. The influence of UPB-urea solution on the hydration kinetics and hardening of RMC-based mixes with and without HA were evaluated through isothermal calorimetry, pH, and setting time tests. The effectiveness of accelerated self-carbonation induced by the MCP was assessed by compressive strength results measured over a period of 2, 7, 14, and 28 days. Furthermore, the properties of HMHCs and the microstructural development of RMC-based mixes with the MCP were investigated by scanning electron microscopy (SEM), x-ray diffraction (XRD), thermogravimetric-infrared spectroscopy (TG-IR) and derived thermogravimetry (DTG) analysis. The formulations developed not only led to improvements in the reaction mechanisms and performance of RMC samples, but also paved the way for the effective use of RMC as a binder without relying on external carbonation conditions.

Example 2B: Materials for Example 2A

A commercial RMC (Richard Baker Harrison-UK) was used in this example. The particle size distribution and morphology of RMC are shown in FIGS. 10 and 11. FIG. 10 gives the chemical and physical properties of RMC. HA ($(CH_3COO)_2Mg \cdot 4H_2O$, from VWR-Singapore) was used at a concentration of 0.05 M to promote the hydration and subsequent carbonation of RMC.

The urease active strain of *Sporosarcina pasteurii* (DSM 33) obtained from the DSMZ (German Collection of Microorganisms and Cell Cultures), Germany was used as the UPB. The isolated strain culture was cultivated into pre-sterilized yeast extracted-based medium (adjusted pH ~9.0) under an aerobic condition using an orbital shaker (350 rpm shaking, 48-hour incubation, and 25±1° C.). The harvested UPB that was stored at 4° C. achieved an average optical density (OD600) of 1.7 and approximate 15 U/ml (1 U=1 µM of urea hydrolyzed/min) for a measurement of urease activity. The urea solutions with four levels of concentrations (0.5, 1, 1.5, and 2 M) were produced by mixing urea powder with distilled water.

Example 2C: Sample Preparation and Methodology for Example 2A

Ten mixtures with two sets of paste samples were prepared to investigate the feasibility of accelerated self-carbonation for RMC-based materials by using the MCP. The details of the prepared paste mixtures are given in FIG. 11. The first set of paste samples included four paste samples with different concentrations of urea (U0.5M, U1M, U1.5M, and U2M) and the corresponding control sample (CS). The second set of paste samples involved the use of HA to accelerate the hydration and carbonation of RMC. Four pastes involving the simultaneous inclusion of HA and UPB-urea (HA.U0.5M, HA.U1M, HA.U1.5M, and HA.U2M) and another control sample involving HA only (HA.CS) were prepared for the second set of samples. The use of UPB-urea in RMC mixes led to a higher solution/RMC ratio to obtain equivalent workability with the CS and HA samples. The pH values of UBP-urea solutions after mixing were ~8.80.

After mixing UBP and urea, the solution was immediately mixed with RMC in varying proportions to prepare paste samples (FIG. 11). All samples were cast into cubic molds (5×5×5 cm), consolidated, and hardened under the ambient conditions (~30° C., ~80% relative humidity (RH) and ~0.04% $CO_2$ concentration). No additional source of $CO_2$ was introduced to the ambient so any accelerated carbonation was enabled by the MCP. Samples were demolded after 2 days of casting and continuously cured under these ambient conditions for up to 28 days.

Example 2D: Characterization for Example 2A pH Measurement—To determine the pH of mixed pastes, the fresh paste after 30 mins mixing was mixed with distilled water at a ratio of 20:3, and the liquid phase of slurry then was extracted by a vacuum filtration system. The pH value of obtained solution was measured by a pH meter (Mettler Toledo) with an accuracy of ±0.01.

Flow and setting time—The flow of paste samples was measured by the increase in average base diameter of the paste according to ASTM C 1437-15. The average of four measurements was reported for each result. The setting time test was conducted in accordance with ASTM C191-13, by measuring the depth of penetration of the Vicat needle into paste samples.

Reaction heat evolution—The influence of UPB-urea on the kinetics reactions of RMC was evaluated by the heat evolution of prepared pastes at 30° C. using an I-Cal 8000 High Precision calorimeter. The raw materials were pre-heated to reach 30° C., in order to produce a similar temperature for all mixtures as the measurement temperature. After sample preparation steps, the paste samples immediately were placed into the calorimeter to record the heat evolution for 48 hrs. The time between the start of mixing and the first reported data was ~6 mins.

Compressive strength—The paste samples were tested for their compressive strength at 2, 7, 14, and 28 days by a Toni Technik Baustoffprüfsysteme machine with a constant loading rate of 55 kN/min.

Microstructural analysis—The paste segments collected from cubic samples after strength tests were stored in isopropyl to stop hydration and dried in preparation for microstructural analysis. The dried samples were ground down to pass through a 75 µm sieve for XRD and TG-IR analyses. XRD was performed on a Philips PW 1800 spectrometer using Cu Kα radiation (40 kV, 30 mA) with a scanning rate of 0.04° 2θ/step from 5 to 70° 2θ. TG-DTG was carried out with a Perkin Elmer TGA 4000 under nitrogen flow at a flow rate of 20 ml/min. Each sample was heated from 30 to 920° C. with a heating rate of 10° C./min. The outlet of the Perkin Elmer TGA 4000 equipment was coupled with a Perkin Elmer FT-IR spectrometer via a Perkin Elmer TG-IR TL 8000 interface. This interface transferred the evolved gases from the TGA equipment to the FT-IR spectrometer to provide information regarding the gases released from the thermal decomposition. The transfer line was maintained at 150° C., and the IR cell was also held at 150° C. to prevent condensation on the windows. The IR spectra were recorded in the spectral range of 4000-400 $cm^{-1}$ with a 8 $cm^{-1}$ resolution and 16 scans. The IR absorbances of $H_2O$ and $CO_2$ released during the thermal decomposition were identified in the ranges of ~3400-4000 $cm^{-1}$ and 2250-2450 $cm^{-1}$, respectively. To quantify the amount of $H_2O$ and $CO_2$ at each step of the thermal decomposition, DTG curves were deconvoluted based on the IR absorbances of $H_2O$ and $CO_2$ by using Gaussian area deconvolution method and Origin 2017 software. SEM was carried out with a Zeiss Evo 50 microscope to investigate the influence of UPB-urea on the morphologies of the hydration-carbonation products. The vacuum dried samples were mounted onto aluminum stubs using double-sided adhesive carbon disks and coated with gold before SEM analysis.

Example 2E: Characterization Results for Example 2A pH—The pH values of fresh paste samples are presented in FIG. 14. The impurities present in RMC (e.g. CaO) resulted in a high pH value in CS (11.74). The higher initial pH values of UPB-urea solutions than water (8.8-9.1 vs. 7.8) could inhibit the dissolution of RMC. In addition to the lower hydration of MgO and impurities present in RMC, the release of $CO_3^{2-}$ ions from UPB-urea solutions led to relatively low pH values in samples U0.5M, U1M, U1.5M, and U2M (9.96-10.24) when compared to CS. Incorporating HA, the pH value of the HA.CS sample was much lower than the pH of CS (9.32 vs. 11.74). This reduction in pH was due to the use of HA that provided $CH_3COO^-$ ions, thereby creating a weak alkaline condition. The introduction of HA also released $Mg^{2+}$ ions, which accelerated the precipitation of $OH^-$ ions and caused a lower pH value in the HA.CS sample than CS. The simultaneous use of HA and UPB-urea in samples HA.U0.5M, HA.U1M, HA.U1.5M, and HA.U2M resulted in pH values ranging from 9.97 to 10.04, which were slightly lower than the corresponding samples without any HA (U0.5M, U1M, U1.5M, and U2M).

Figures 14, 15A:
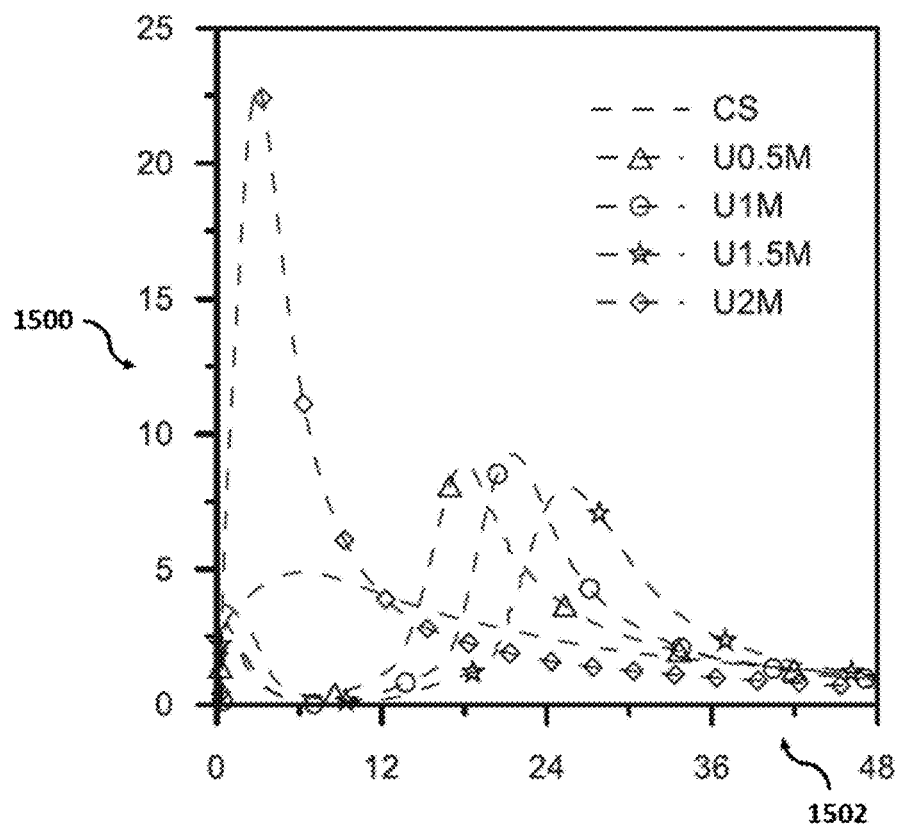
FIG. 14 is table showing properties of the paste samples.
FIG. 15A shows isothermal calorimetry results for the heat flow of samples without hydration agent (HA). 1500 denotes for heat flow (mW/g) and 1502 denotes for time (hr).

Flow and setting times—The results of flow and setting time tests of all paste samples are presented in FIG. 14. The flow of the CS and HA.CS pastes reached 181% and 196%, respectively. Although the ratio of solution/RMC increased from 0.65 (CS and HA.CS samples) to 0.7 (UPB-urea samples), the flow values of the UPB-urea paste mixtures (161-172%) were lower than those of CS (181%) and HA.CS (196%) samples. The lower flow values of the former group indicated that the use of UPB-urea could lead to a reduction in the workability of RMC mixes, thereby necessitating the use of higher water contents to compensate for this change in fresh properties. The slow hydration of RMC resulted in long setting times in CS (26.5 hrs and 33.25 hrs for initial and final settings, respectively). The use of HA shortened the setting times of the HA.CS sample (22.25 hrs and 26.5 hrs for initial and final settings, respectively). On the other hand, the UPB-urea solution significantly reduced the setting times of samples. Compared to the initial and final setting times of CS, the setting time reduced to 22.5 hrs (initial) and 30 hrs (final) in the sample U0.5M; and further decreased to 4.7 hrs (initial) and 6.6 hrs (final) in the sample U2M. Similarly, the combination of UPB-urea solution with HA shortened the setting times of paste mixtures. Accordingly, samples HA.U0.5M, HA.U1M, HA.U1.5M, and HA.U2M showed a considerably short setting time data when compared with the corresponding HA.CS sample (initial setting reduced from 22.3 hrs to 7.5-18.3 hrs; and final setting reduced from 26.5 hrs to 11.5-23.3 hrs). A comparison of the setting times of samples HA.U0.5M, HA.U1M, and HA.U1.5M with those of samples U0.5M, U1M, and U1.5M revealed the much lower setting times of the former group, highlighting the role HA played in reducing the setting times. One exception to this was the sample HA.U2M, which presented longer setting times than the sample U2M, whose setting times were the shortest among the prepared samples. Although the influence of urea concentration on the pH and flow of paste samples may not be clear, its influence on the setting times was evident.

Figure 15B:
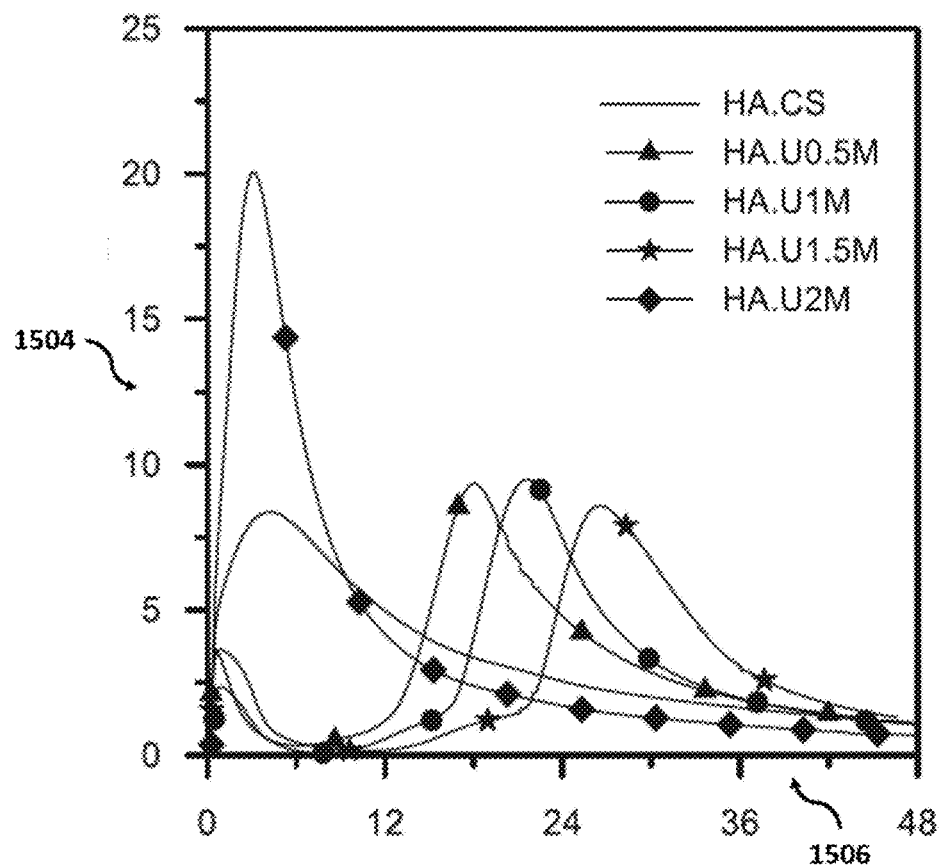
FIG. 15B shows isothermal calorimetry results for the heat flow of samples with HA. 1504 denotes for heat flow (mW/g) and 1506 denotes for time (hr).

Reaction heat evolution—The heat flow and cumulative heat of paste samples during the first 48 hrs of hydration are shown in FIGS. 15A to 15B and 16A to 16B, respectively. The dissolution of RMC and the subsequent precipitation of brucite in the CS and HA.CS samples was revealed by the heat flow patterns around 6 hrs after mixing (FIGS. 15A and 15B). Alternatively, the use of UPB-urea led to three stages of hydration in samples with 0.5-1.5 M urea. These three stages included two exothermal peaks and one induction period in between. The first stage of hydration displayed pre-induction peaks associated with the dissolution of RMC and subsequent precipitation of brucite and HMHCs, which occurred during the first ~4 hrs of hydration. These pre-induction peaks, which is partially attributed to the endothermic reactions of the hydrolysis of urea, were lower than the peaks of CS and HA samples. The low level of pre-induction peaks also indicated that the dissolution of RMC in samples using UPB-urea mixture was low because of their higher initial pH when compared to the CS and HA samples. The second stage of reaction, the induction period (started at ~4 hrs and finished at ~12-18 hrs), was associated with the very low level of heat release period in UPB-urea samples. This stage corresponded to a required time period (~6 hrs), at which the critical concentration of the dissolved ions in order to form the hydration and carbonation products was reached. The third stage was the acceleration and deceleration phase that was associated with the increase in heat released from the nucleation, growth, and precipitation processes in hydration and carbonation products. The exothermal peaks of acceleration-deceleration were more obvious than those of the pre-induction. The higher urea concentration was associated with the higher endothermic reactions in the UPB-urea solution, thereby causing a delay in the appearance of peaks in the acceleration-deceleration process. On the other hand, increasing the urea concentration to 2 M resulted in only one exothermal peak in samples of U2M and HA.U2M. The $CO_3^{2-}$ concentration generated from the hydrolysis of urea could be sufficient for the formation of HMHCs in U2M and HA.U2M samples at the early stage, thereby largely eliminating the induction period in these samples. As a result, the exothermic RMC dissolution, along with the formation of carbonation products, not only compensated for the endothermic reactions in the UPB-urea solution, but also led to individual exothermal peaks with very high intensities in these samples. The higher exothermic peak of sample U2M could explain its earlier setting times than HA.U2M sample observed as described above regarding the flow and setting times. The cumulative heat results indicated the highest total heat released in U2M and HA.U2M samples (FIGS. 16A and 16B), which could correspond to the highest formation of HMHCs in these samples. Despite achieving lower levels of RMC hydration, samples consisting of UPB and 0.5-1.5 M urea could provide the additional formation of HMHCs, resulting in cumulative heat curves that reached the same level as CS after 48 hrs of hydration. Moreover, a comparison of pastes without UPB-urea revealed that the acceleration in hydration led to the much higher cumulative heat in HA.CS sample than CS at all times.

Figure 16A:
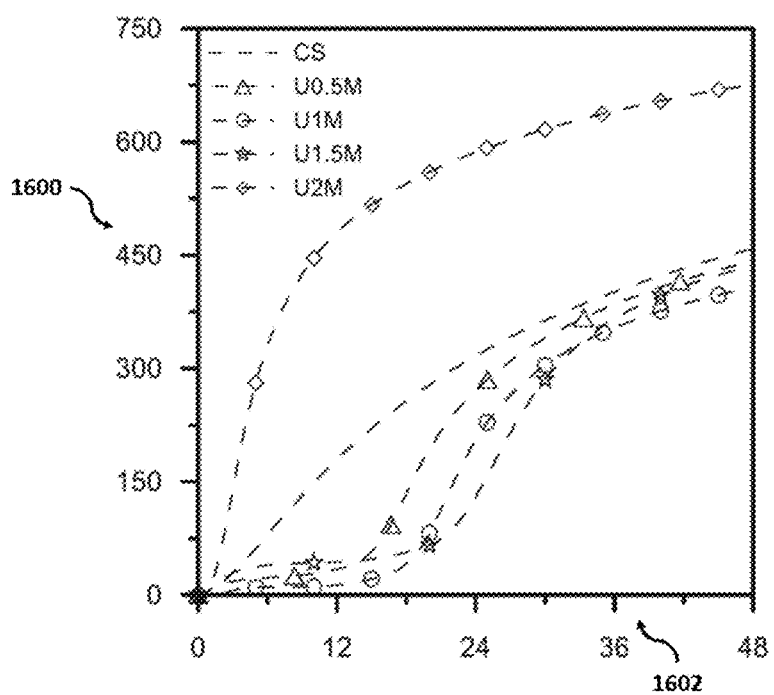
FIG. 16A shows isothermal calorimetry results for the cumulative heat of samples without hydration agent (HA). 1600 denotes for cumulative heat (J/g) and 1602 denotes for time (hr).
Figure 16B:
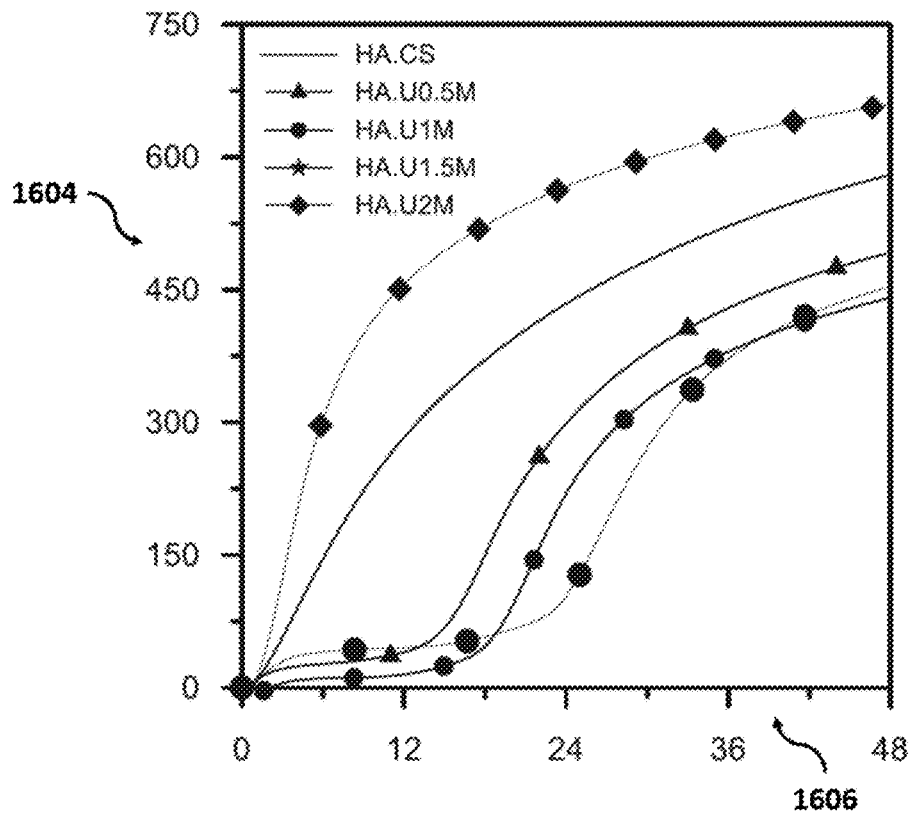
FIG. 16B shows isothermal calorimetry results for the cumulative heat of samples with HA. 1604 denotes for cumulative heat (J/g) and 1606 denotes for time (hr).
Figure 17A:
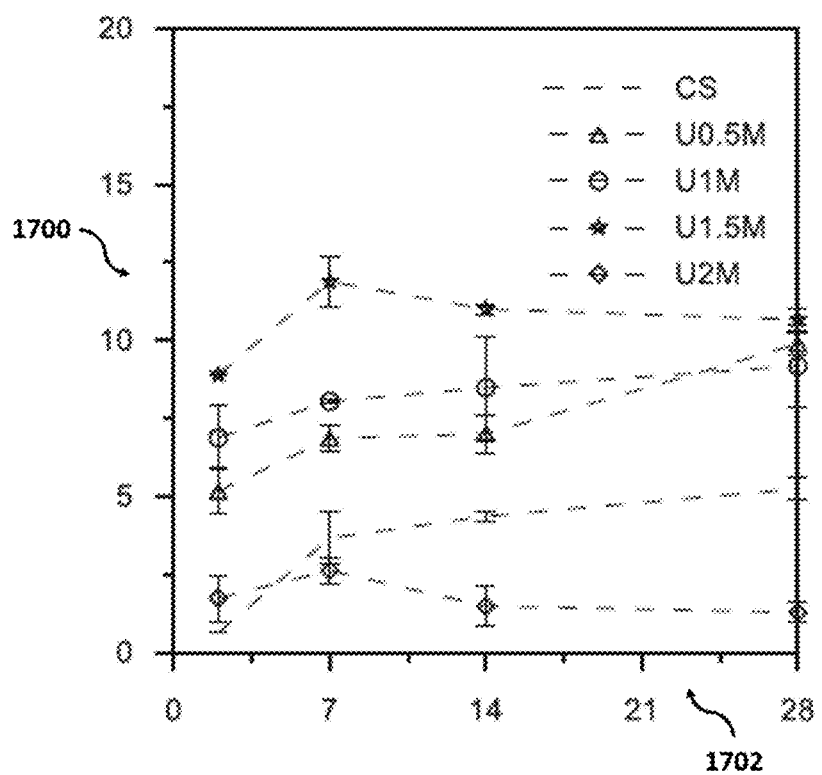
FIG. 17A shows compressive strength of paste samples without HA. 1700 denotes for compressive strength (MPa) and 1702 denotes for age (days).
Figure 17B:
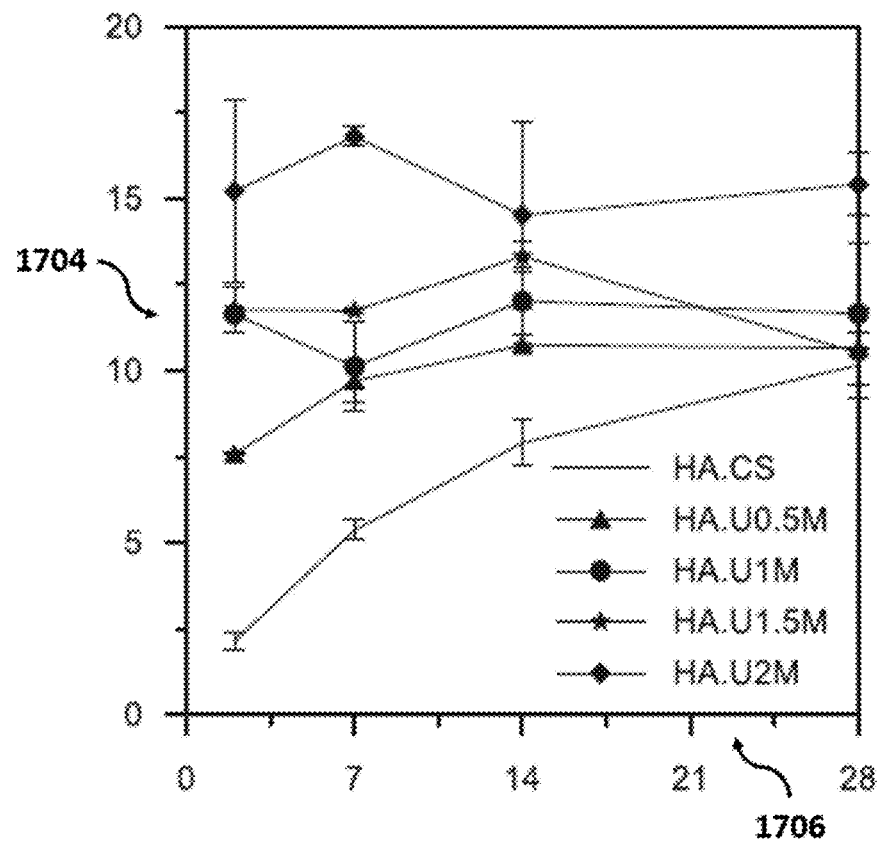
FIG. 17B shows compressive strength of paste samples with HA. 1704 denotes for compressive strength (MPa) and 1706 denotes for age (days).

Compressive strength—FIGS. 17A and 17B reveal the strength gain of paste samples versus duration during 28 days of curing. The control sample (CS) had a limited hydration and resulted in a strength of ~1 MPa at 2 days (FIG. 17A). This sample gained a majority of its strength from 2 to 7 days, reaching ~4 MPa, which remained stable until 28 days. For the samples treated using mixtures of UPB and 0.5-1.5 M urea the strength gain was accelerated by a substantial amount. Among these samples, increases in the urea concentration led to the higher early compressive strengths. The compressive strengths of U0.5M, U1M, and U1.5M samples were ~5-9 MPa at 2 days and increased to ~7-12 MPa at 7 days. Afterwards, the compressive strength of U1.5M sample remained constant as the highest value among the samples without HA, whereas those of U0.5M and U1M samples slightly increased to achieve ~10 and 9 MPa at 28 days, respectively. Overall, the compressive strengths of U0.5M, U1M, and U1.5M samples were much higher than those of CS. UPB could enhance the strength of PC-based mixes, but the PC samples, in which bacteria were embedded, presented a slight increase in strength when compared to the control samples only containing PC (i.e. without bacteria). Despite the acceleration in its hydration (FIGS. 16A and 16B), the U2M samples showed the lowest compressive strength. The reason for this is explained in example 2F.

The compressive strengths of samples including HA are shown in FIG. 17B. The enhancement of hydration in the presence of HA slightly increased the 2-day compressive strength of the HA sample to 2 MPa. Its compressive strength gradually increased to 5, 8, and 10 MPa after 7, 14, and 28 days, respectively. Moreover, the simultaneous inclusion of HA and UPB-urea significantly improved the compressive strength of HA.

U0.5M, HA.U1M, HA.U1.5M, and HA.U2M samples. The highest compressive strength within samples with HA was ~17 MPa for HA. U2M after 7 days. It should be noted that the HA.U2M sample revealed an increase in its 2-day compressive strength of ~15 MPa, whereas these strength values of HA.U0.5M, HA.U1M, and HA.U1.5M samples reached ~7-12 MPa. However, there was no a significant change in the compressive strength of these samples during the remaining 26 days of curing, as they achieved a majority (~90%) of their compressive strength within the initial 2 days of curing. Similar observation was made for the tests shown in FIG. 17A using 0.5-1.5 M urea. Therefore, another major benefit of using the MCP for the self-carbonation of RMC-based mixes is that the full strength can be gained within 7 days or shorter and a curing for 28 days is no longer necessary.

Figure 18A:
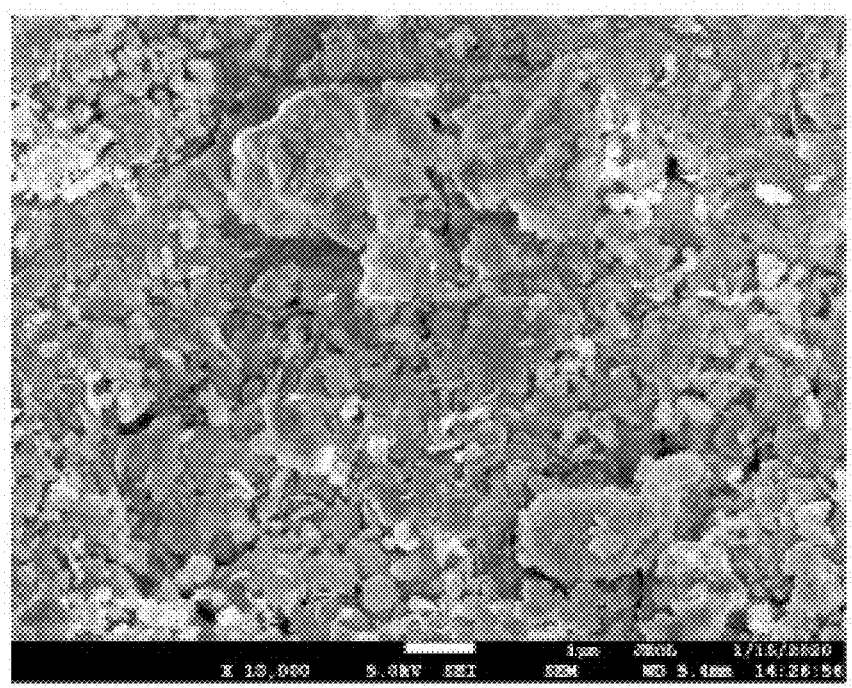
FIG. 18A is a SEM image of CS sample after 2 days of curing. Scale bar denotes 1 μm.
Figure 18B:
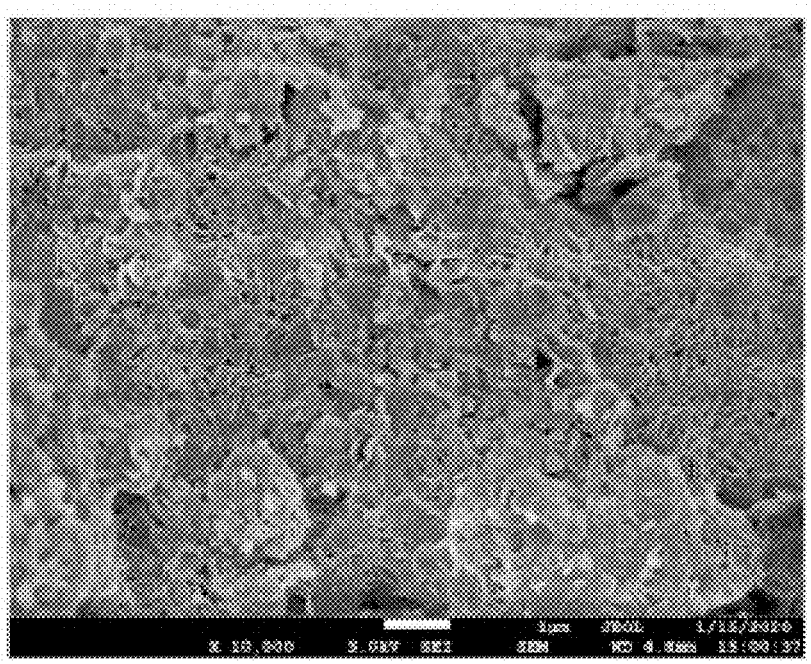
FIG. 18B is a SEM image of U1M sample after 2 days of curing. Scale bar denotes 1 μm.
Figure 18C:
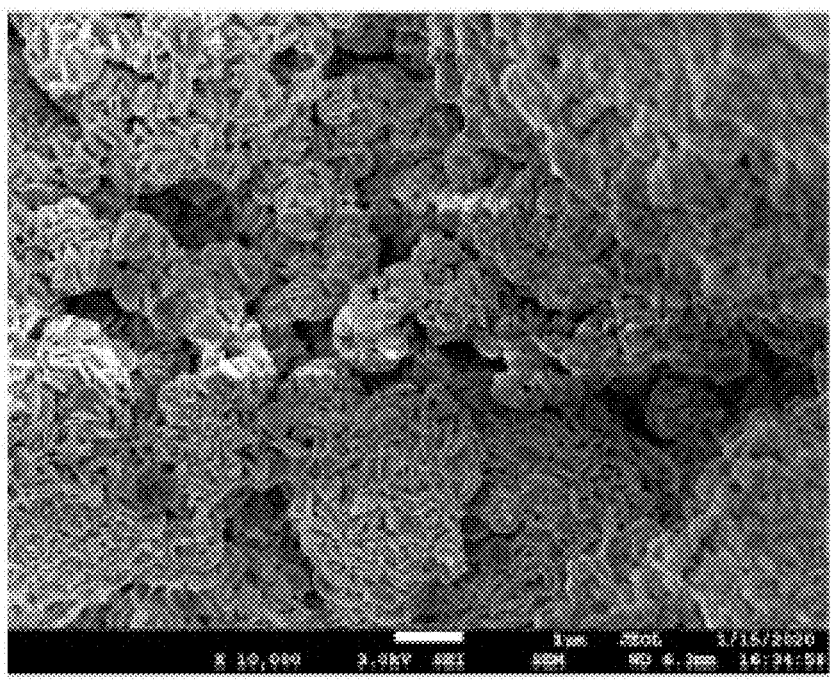
FIG. 18C is a SEM image of U2M sample after 2 days of curing. Scale bar denotes 1 μm.
Figure 18D:
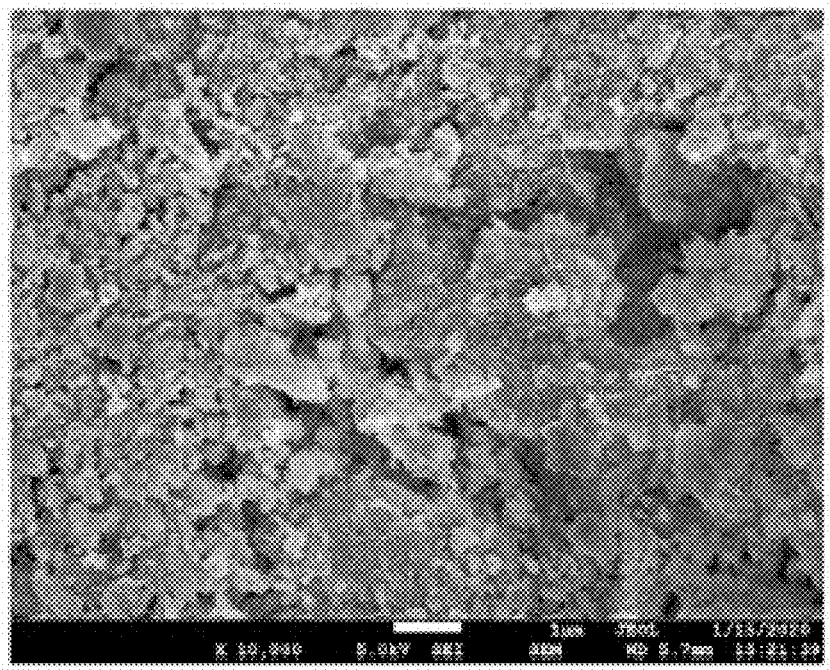
FIG. 18D is a SEM image of HA.CS sample after 2 days of curing. Scale bar denotes 1 μm.
Figure 18E:
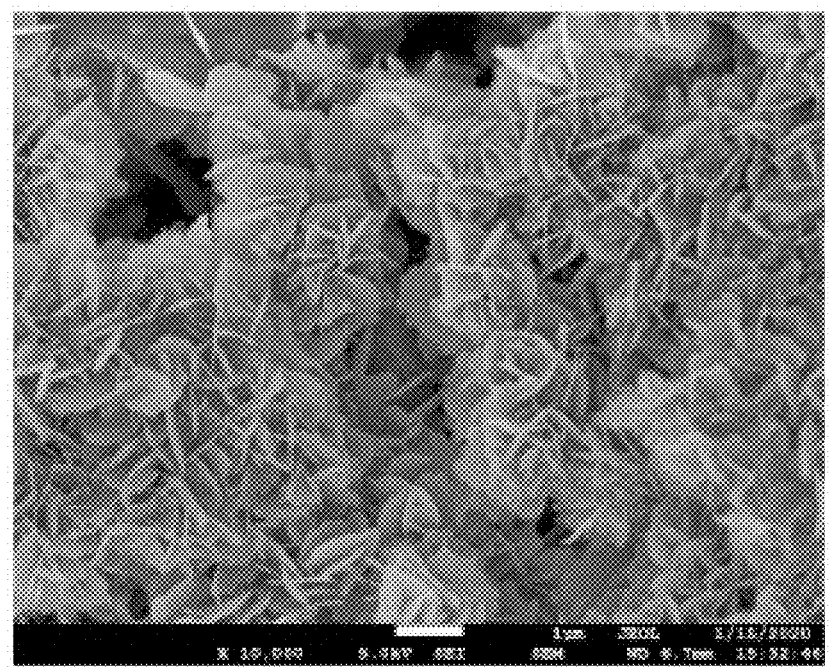
FIG. 18E is a SEM image of HA.U1M sample after 2 days of curing. Scale bar denotes 1 μm.
Figure 18F:
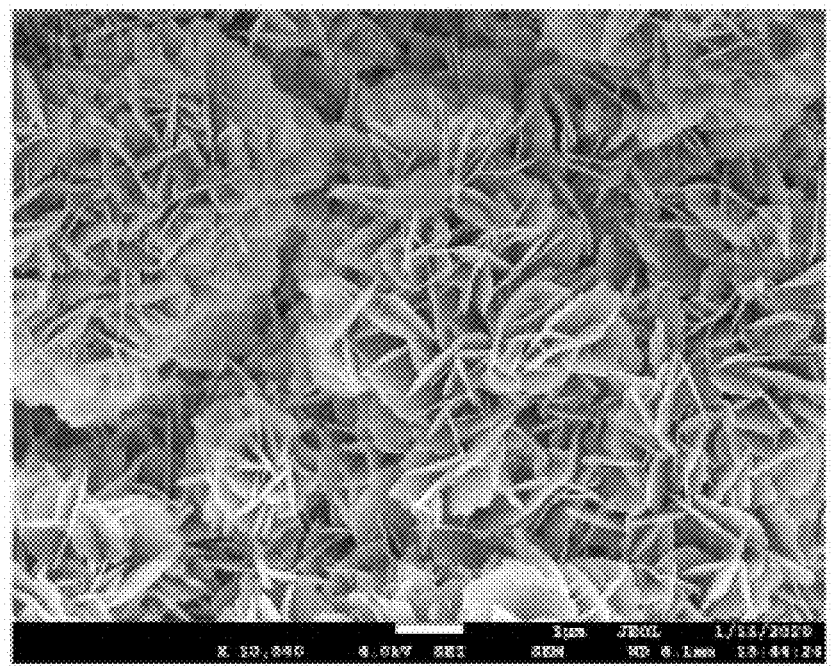
FIG. 18F is a SEM image of HA.U2M sample after 2 days of curing. Scale bar denotes 1 μm.

SEM—The morphologies of the hydration and carbonation products of all samples after 2 days are shown in FIG. 18A to 18F. The SEM image of CS showed several unhydrated MgO grains (FIG. 18A). However, the use of UPB-urea significantly changed the microstructure and morphology of hydration and carbonation products in U1M and U2M samples (FIGS. 18B and 18C). Clusters of plate-like hydromagnesite forming cohesive crystals were observed in the U1M sample. These well-bonded clusters could explain the significantly higher compressive strengths of the U1M sample than CS. While this plate-like morphology of hydromagnesite was consistent with those reported, other studies using $MgCl_2$ as a $Mg^{2+}$ source observed needle-like crystals that were identified as nesquehonite. Interestingly, the hydration of U2M sample formed brucite with a hexagonal crystal structure. The weak connection observed in these hexagonal brucite crystals could explain the lowest compressive strength revealed by the U2M sample. The use of HA led to the formation of smaller brucite particles away from the original MgO grains, which facilitated the further progress of hydration and carbonation in the HA.CS sample (FIG. 18D). Furthermore, the formation of plate-like hydromagnesite/dypingite led to massively cohesive phases in the HA sample. The simultaneous use of UPB-urea and HA resulted in a significant improvement in the morphology of HMHCs in HA.U1M and HA.U2M samples (FIGS. 18E and 18F). The formation of hydromagnesite/dypingite with diameters of ~0.7-1 µm produced massive cohesive crystals, resulting in dense microstructures in samples of HA.U1M and HA.U2M. The densification of the microstructure, which composed of carbonate phases with improved morphologies, contributed to the noticeable improvement in the compressive strength of these samples.

XRD—XRD patterns of samples after 2 days of curing. In addition to unhydrated MgO (main peak at 42.9° 2θ), brucite (main peak at 38.1° 2θ), and artinite (main peak at 32.8° 2θ) were observed in samples. A comparison of the unhydrated MgO based on the intensity of internal standard, fluorite (main peak at 28.2° 2θ), revealed the higher intensity of unhydrated MgO in the UPB-urea samples than that in the corresponding CS and HA.CS samples. The use of UPB-urea mixtures led to the formation of poor crystallinity of brucite with broad peaks in UPB-urea samples. The higher concentration of urea resulted in the lower and broader peaks of brucite in samples involving the use of UPB-urea mixtures. The lower degree of crystallinity and lower contents of brucite in those UPB-urea samples than the CS and HA.CS samples could be attributed to its reaction with $CO_3^{2-}$ released from the UPB-urea to form HMHCs, as observed in SEM images (FIGS. 18B, 18E and 18F). However, these HMHC peaks might be lost in the noise of XRD patterns. When compared with CS, the inclusion of HA not only accelerated the formation of brucite but also improved its reactivity by increasing its surface area, as seen in FIG. 18D, resulting in the higher formation of artinite in the HA.CS sample. The use of HA also enhanced the hydration of MgO in samples using UPB-urea. As can be seen from FIGS. 19A and 19B, the samples with HA provided slightly lower peaks of MgO than those in the corresponding samples without HA.

Figure 21A:
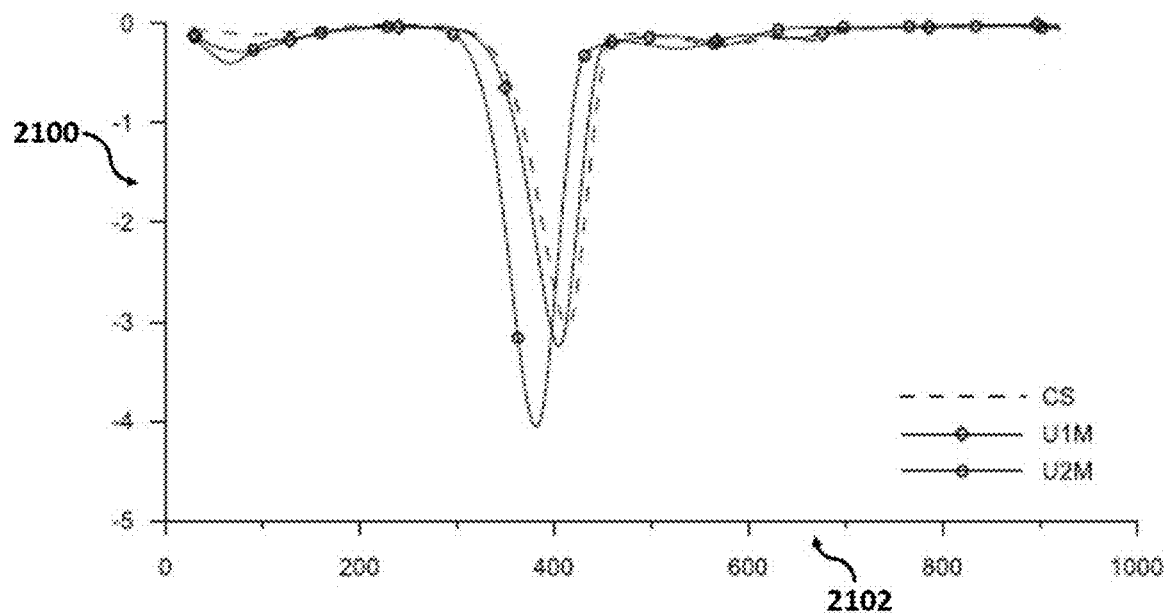
FIG. 21A shows DTG results of samples without HA after 2 days of curing. 2100 denotes for DTG (%/min) and 2102 denotes for temperature (° C.).
Figure 21B:
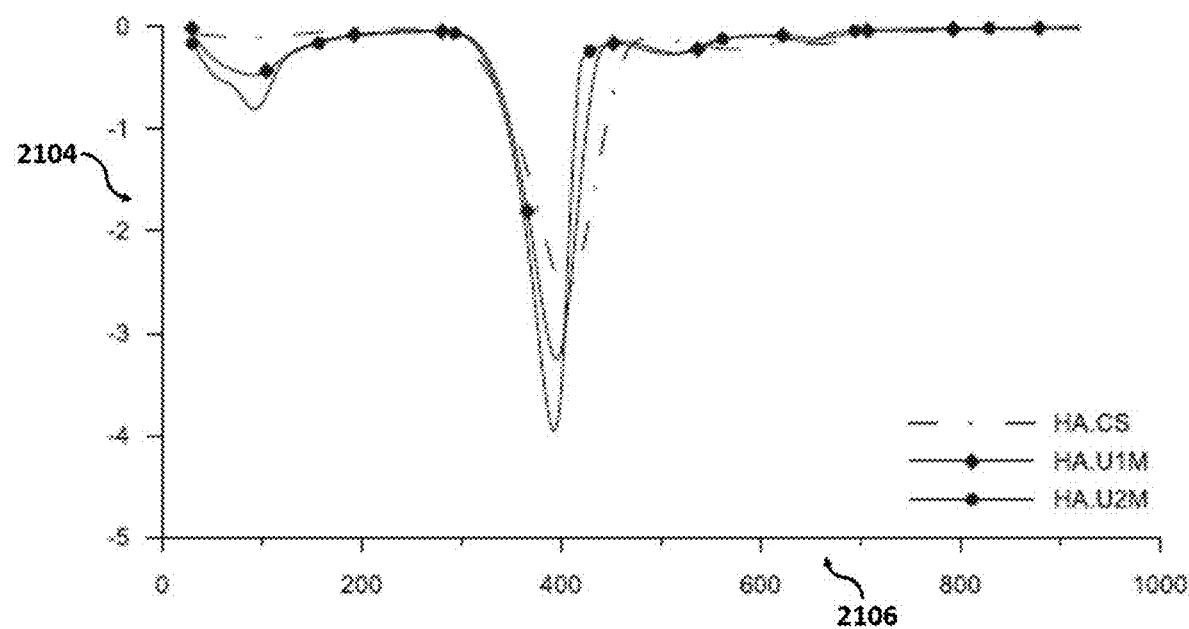
FIG. 21B shows DTG results of samples with HA after 2 days of curing. 2104 denotes for DTG (%/min) and 2106 denotes for temperature (° C.).

TG-IR and DTG—TG-IR results of samples at 2 days of curing are presented in FIG. 20A to 20F. The TG curves displayed the percentage of mass loss corresponding to the changing of decomposition temperature in samples. TG results indicated that samples containing UPB-urea and/or HA had much higher mass loss than CS. This additional mass loss could be attributed to the extra formation of HMHCs within these samples. In term of mass loss due to a release of $H_2O$ and $CO_2$, the IR curves revealed the corresponding samples using UPB-urea had different IR absorbance patterns of $H_2O$ and $CO_2$ compared to the CS and HA.CS samples. As shown in IR curves of FIG. 20A to 20F, a small peak of the dehydration at ~140-180° C. was observed in all samples. The CS and HA.CS samples provided similar IR absorbance patterns which indicated the dehydroxylation peak at ~440° C. and the decarbonation peaks at ~400, 580, and 690° C. The use of UPB-urea with 1 M urea led to a very high intensity of decarbonation peak at ~400° C. in the U1M sample. On the other hand, the UPB-urea sample with 2 M urea resulted in a shift of the dehydroxylation peak to ~400° C., and produced one decarbonation peak at ~590° C., as well as an additional broad peak of the decarbonation at ~430° C. in the U2M sample. The simultaneous inclusion of UPB-urea and HA caused a higher intensive decarbonation peak at ~410° C. and lower intensity of the dehydroxylation peak at ~400° C. within samples HA.U1M and HA.U2M when compared to the HA.CS sample. The lower intensity of dehydroxylation peaks in these samples can be attributed to the lower content of brucite due to its conversion into HMHCs. FIGS. 21A and 21B plotted derivative thermogravimetry (DTG) results corresponding to the decomposition temperatures of samples after 2 days curing. Three main decomposition stages of samples included the dehydration of water bond to HMHCs (~30-300° C.), the simultaneous dehydroxylation and decarbonation (~300-450° C.), and the decarbonation (~450-920° C.). It is worth noting that the simultaneous peaks of dehydroxylation and decarbonation were observed around ~410° C. in CS and HA.CS samples. However, the use of UPB-urea shifted the corresponding decomposition peaks to 380-400° C. in U1M, U2M, HA. U1M, and HA.U2M samples, resulted from high contents of decarbonation and the change in crystallinity of brucite. The mass loss associated with each of the decomposition stage was obtained by calculating the area of its deconvoluted DTG curve, and by based on the IR results. The total mass loss of each sample is summarized in FIG. 22. As can be seen from FIG. 22, the lowest contents of dehydration (1.3%) and decarbonation (11.1%) in CS indicated the lowest formation of HMHCs in this sample. The low level of water bond to HMHCs and the high $CO_2$ content within CS cured under ambient for 2 days revealed the high content of uncalcinated MgCO3 in RMC. When compared with CS, the HA.CS sample showed slightly higher formation of HMHCs which were 1.5% and 13.7% for dehydration and decarbonation contents. The CS and HA.CS samples showed high contents of the uncarbonated hydroxyl group (12.7% and 12.3%). In contrast to CS and HA samples, the U1M and HA.U1M samples produced the significant increase dehydration (3.2% and 5%) and decarbonation (18.5% and 19.1%) contents, and the considerable decrease in dehydroxylation content (5.1% and 6.9%). This opposite behavior of mass loss proved the role of UPB-urea in accelerating the carbonation in these samples. However, increasing urea concentration to 2 M in U2M and HA.U2M samples might lead to level off the $CO_2$ sequestration which was reflected by the decrease in decarbonation content (13.4% and 17.4%) and the increase in dehydroxylation content (6.7-16.8%). Despite the lower $CO_2$ sequestration content, U2M and HA.U2M samples showed higher dehydration contents than U1M and HA.U1M samples, respectively. This result suggested that samples of U2M and HA.U2M contained HMHCs with high water bond such as artinite or dypingite.

Example 2F: Discussion on Results for Example 2A

RMC-based mixes are known for their limited reaction and associated weak strengths under ambient conditions, necessitating the use of accelerated carbonation conditions for notable strength development. These methods are not only inconvenient but also costly and potentially unsafe as they require special curing environments connected to sources that can provide high concentrations of $CO_2$ for reasonable strength gain. This example aimed to resolve this issue via the internal provision of $CO_3^{2-}$ ions to improve the self-carbonation process of RMC mixes. The influence of UPB-urea solution with different concentrations of urea, and its synergistic combination with HA, on the hydration and carbonation mechanisms of RMC mixes were investigated. The weakly alkaline environment (i.e. pH of 9.96-10.24) of RMC-based samples could be a favourable condition for *Sporosarcina pasteurii* strain, enabling substantial urease activity that led to the release of carbonate ions. Therefore, the RMC-based mixes could incorporate UPB-urea without any encapsulation or immobilization processes, differing from reports using PC-based mixes. The direct mixing of bacterial culture in RMC pastes with a high solution/RMC ratio could provide the necessary nutrients for the survival of bacterial cells and the uniform distribution of microbes within the paste samples. Previous studies reported that directly embedded *Sporosarcina pasteurii* culture in PC-based mixes may provide the highest viable bacterial concentrations and calcium carbonate mass after 7 days, albeit without the significant improvement of strength. In terms of the lacking oxygen issues, the *Sporosarcina pasteurii* strain was not actively growing under an anaerobic condition. Also it is the bacterial enzyme urease not the bacteria that initiate the urea hydrolysis process. Thus, the initial urease activity of *Sporosarcina pasteurii* was not significantly affected by anaerobic conditions (i.e. absence of oxygen). In line with these findings, the present examples involved the cultivation of UPB under aerobic conditions, followed by its mixing with the urea solution and RMC. The kinetics of urea hydrolysis from bacteria led to the production of $CO_3^{2-}$ ions at the initial stage (i.e. 2-7 days) of the curing process, highlighting that the use of RMC mixes with UPB-urea might provide a favourable environment for the formation of HMHCs via MCP at early ages. The use of UPB-urea led to the additional formation of HMHCs, improving setting times, and microstructural and mechanical performances of RMC-based samples. Despite improving the mechanical performance, the hydrolysis of urea accelerated by UPB, significantly increased the pH value of the mixing solution, which reduced the hydration degree of MgO. Accordingly, hydrolyzing urea through ureolytic bacteria released hydroxide ($OH^-$) ions (Eq. (7)), which increased the initial pH value of the solution in comparison with water (8.8-9.1 vs. 7.8), resulting in the lower dissolution of MgO. Another limitation was the covering of unreacted MgO grains with bacteria and reaction products. The negative charges of bacterial cell walls could drive them towards the surface of MgO grains. Furthermore, the reaction between $Mg^{2+}$ dissolving from MgO and $CO_3^{2-}$ released from UPB-urea (Eq. (9)) formed HMHCs that partially deposited on the surface of MgO grains, which limited their further reaction due to their covering by both bacterial cells and HMHCs.

As seen in FIGS. 15A and 15B, samples involving the UPB-urea solutions containing 0.5-1.5 M urea produced lower level of heat release than CS within the first 24 hrs of hydration. The higher concentrations of urea resulted in slower hydration processes with longer induction periods and longer delay of the acceleration-deceleration period (FIG. 15B). Although the lower hydration degree of MgO was presented through the strong peaks of MgO in UPB-urea samples containing 0.5-1.5 M urea (FIGS. 19A and 19B), these samples still reached the same cumulative heat as CS after 48 hrs (FIG. 20A to 20F). This could be due to carbonation, the heat release during which compensated for the low heat released from the hydration reaction. A majority of the heat released by these samples was observed during the acceleration-deceleration period.

When the concentration of urea increased to 2 M, a sole exothermal peak with a high intensity was observed within U2M and HA.U2M samples, instead of the induction and acceleration-deceleration periods observed in other samples containing UPB-urea solutions (FIGS. 15A and 15B). The slow dissolution of MgO in UPB-urea samples containing 0.5-1.5 M urea, which was associated with the high initial pH of the mixing solution and the insufficient concentration of $OH^-$ ions (Eq. (7)) and $CO_3^{2-}$ ions (Eq. (9)), delayed the formation of HMHCs within these samples. Accordingly, the induction stage corresponded to the delay time required for the $Mg^{2+}$, $OH^-$ and $CO_3^{2-}$ ions to reach critical concentration in order to form the carbonation products at the acceleration-deceleration stage in samples with 0.5-1.5 M urea. The TG-IR and DTG results (FIG. 22) revealed a significant increase in the hydration and carbonation products in samples with 2 M urea, when compared to those containing 1 M urea. This implied the higher release of $OH^-$ and $CO_3^{2-}$ ions from UPB-urea solutions in samples with 2 M urea in comparison to samples using a lower urea concentration. The higher concentration of $OH^-$ and $CO_3^{2-}$ ions could enable the simultaneous dissolution of MgO and the nucleation and growth of hydration and carbonation products, resulting in a sole exothermal peak in U2M and HA.U2M samples (FIGS. 15A and 15B). The accelerated formation of brucite and HMHCs, reflected by the highest total mass loss contents in samples U2M and HA.U2M (FIG. 22), was responsible for their highest cumulative heat among all samples (FIGS. 16A and 16B).

Figure 25:
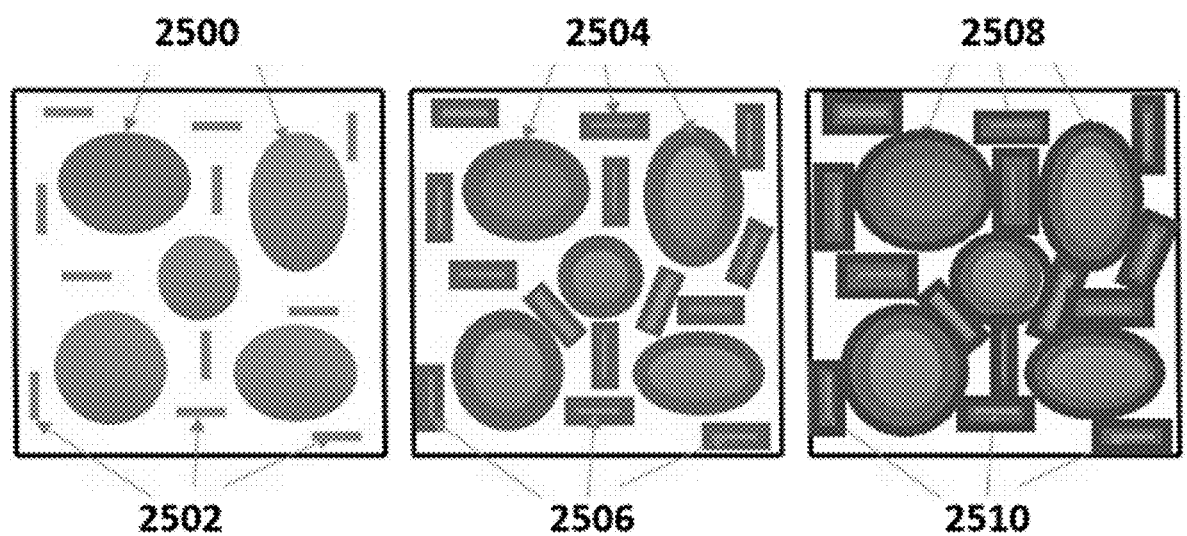
FIG. 25 is a schematic representation of the formation of hydration and carbonation products in UPB-urea with hydration agent showing (left image) nesquehonite seeds within the pore space to facilitate nucleation on their surfaces, (center image) brucite nucleates both on RMC grains and seed surfaces to enable a higher degree of carbonation and (right image) hydrated magnesium hydroxy carbonates (HMHCs) form both on brucite and seed surfaces, thereby improving the carbonation degree and mechanical strengths. 2500 denotes for RMC grains, 2502 denotes for seeds, 2504 denotes for brucite, 2506 denotes for seeds, 2508 denotes for HMHCs, and 2510 denotes for seeds.

The interaction between HA and UPB-urea solution was studied by analyzing the precipitates shown in FIGS. 23A and 23B. The dissolution of HA in the UPB-urea solution enabled the reaction between $Mg^{2+}$ (i.e. from HA) and $CO_3^{2-}$ (i.e. from UPB-urea) to form nesquehonite, as seen in FIGS. 23A and 23B. The use of 2 M urea resulted in nesquehonite composed of larger crystals (FIG. 23B) than that observed in the presence of 1 M urea (FIG. 23A). The nesquehonite that initially formed acted as a nucleation site, which improved the formation of hydration and carbonation products. In comparison to samples without nucleation seeding (FIG. 24), the dispersion of nesquehonite seeds in the pore solution facilitated the nucleation and growth of HMHCs on their surfaces, enabled by the increased contact surface between uncarbonated MgO/brucite and $CO_3^{2-}$ ions for the further reaction (FIG. 25). The role of nesquehonite as a nucleation site in improving the carbonation degree was confirmed by the increase in the mass loss associated with carbonation (FIG. 22) and compressive strength (FIGS. 17A and 17B) of UPB-urea samples with HA, in comparison to UPB-urea samples without HA.

Despite the slower hydration of MgO at the early stages, the accelerated formation of HMHCs and/or brucite in samples containing UPB-urea solutions resulted in shorter setting times in these samples than the CS and HA.CS samples (FIG. 14). The shorter setting times of samples containing UPB-urea solutions could improve the productivity in terms of the preparation and use of RMC-based building components by enabling their early de-molding. Increases in the concentration of urea led to shorter setting times in UPB-urea samples. The accelerated dissolution of MgO and the accelerated formation of brucite in the presence of HA also shortened the setting time of HA.CS sample when compared to CS. Despite the lowest $CO_2$ sequestration among samples involving UPB-urea (i.e. mass loss due to decarbonation 13.4% vs. 17.4-19.1%, FIG. 22), the U2M sample presented the shortest setting times, which was in line with its highest exothermal peak and total mass loss content. The accelerated precipitation of brucite also played an important role in shortening the setting times in this sample.

The use of HA also shortened the setting times of samples with a urea concentration of 0.5-1.5 M. This reduction in the setting time could be attributed to the higher HMHC formations in samples involving the simultaneous use of HA and UPB-urea than those involving the sole use of UPB-urea (i.e. mass loss of HA.U1M vs. U1M due to dehydration (5.0% vs. 3.2%) and decarbonation (19.1% vs. 18.5%) was shown in FIG. 22. The nucleation seeding effect of nesquehonite in HA and UPB-urea solutions (FIGS. 23A and 23B) played an important role in enhancing the formation of HMHCs, thereby shortening the setting times in UPB-urea samples with a low concentration of urea (0.5-1.5 M) and HA. When the concentration of urea increased to 2 M, the released $OH^-$ and $CO_3^{2-}$ ions could be sufficient for the rapid formation of brucite and HMHCs at early stages (FIGS. 15A and 15B). Since sufficient brucite could rapidly form at early stages, the setting time of U2M sample was significantly reduced when compared to U1.5M sample (4.7 vs. 15.8 hrs), which did not have a major dependence on the presence of nesquehonite seeds. Accordingly, when compared with the HA.U2M sample, the higher pH value of the pore solution within U2M sample (10.24 vs. 10.02) stimulated the precipitation of brucite, resulting in visibly shorter setting times (4.7 vs. 7.5 hrs).

Figure 19A:
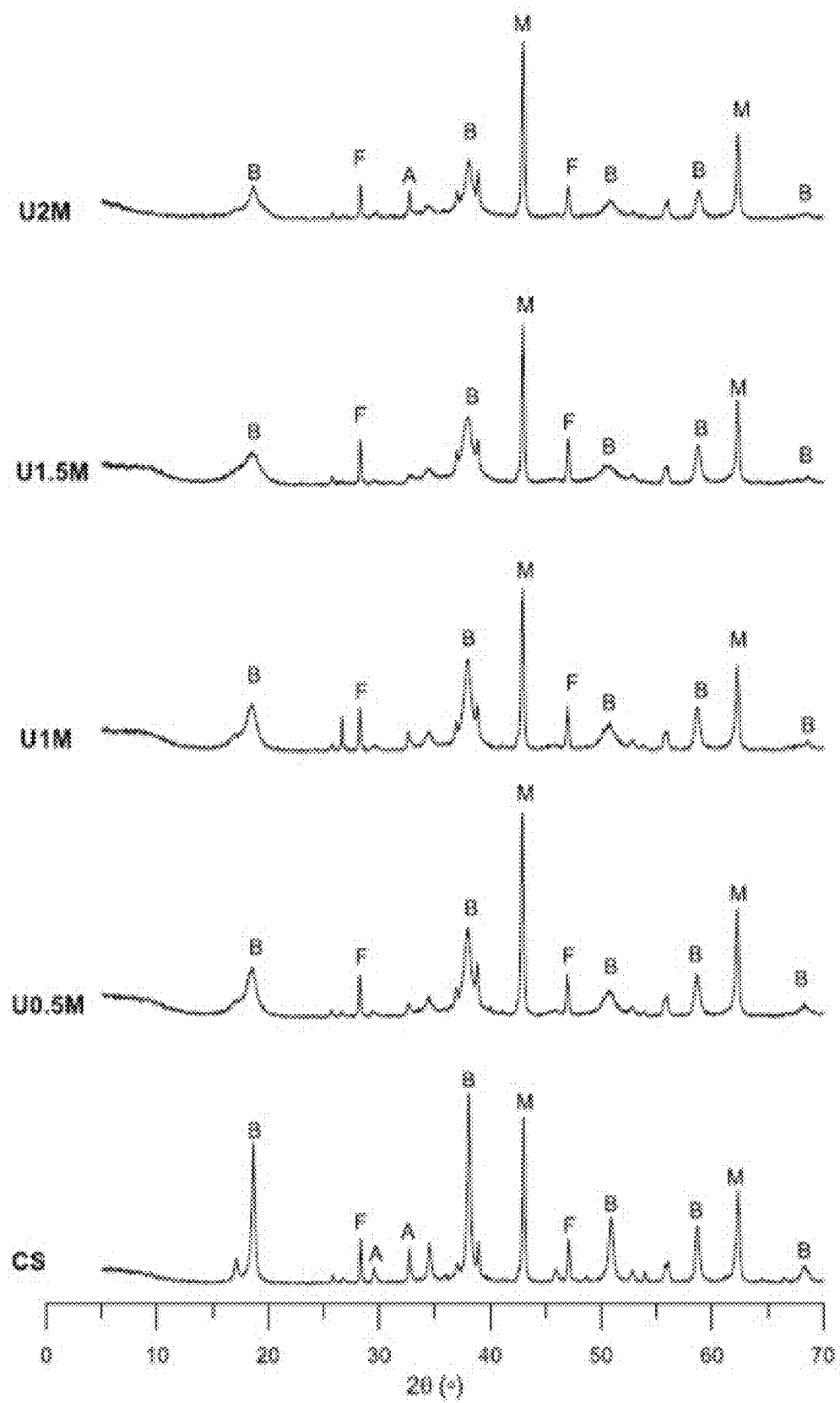
FIG. 19A shows XRD patterns of paste samples after 2 days of curing without HA. A denotes for artinite, B denotes for brucite, F denotes for fluorite, and M denotes for MgO.
Figure 19B:
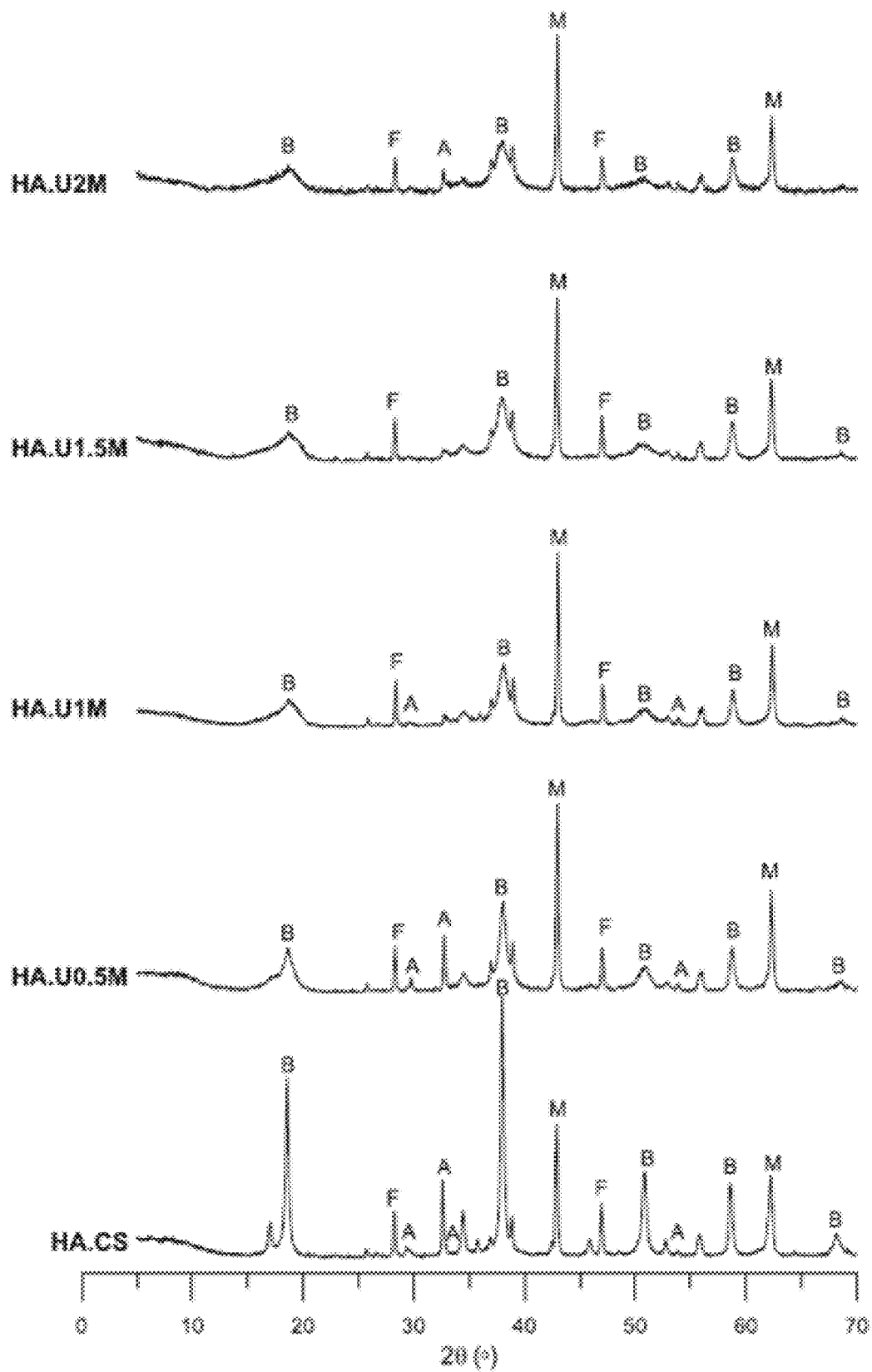
FIG. 19B shows XRD patterns of paste samples after 2 days of curing with HA. A denotes for artinite, B denotes for brucite, F denotes for fluorite, and M denotes for MgO.
Figure 20A:
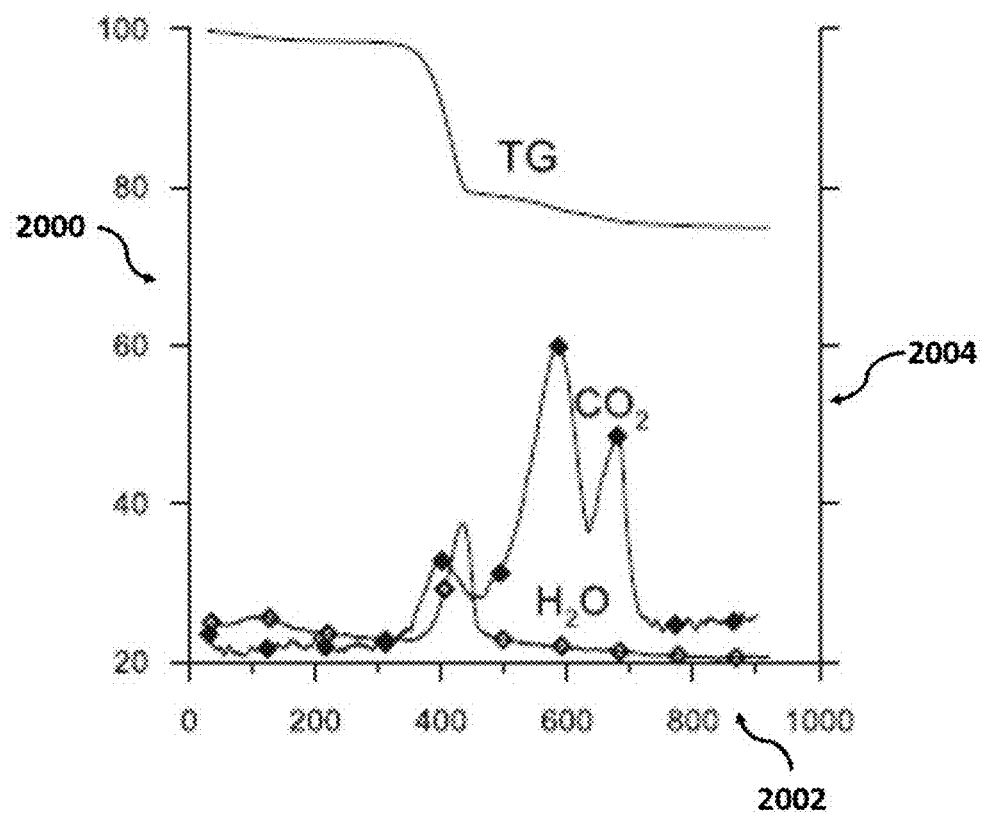
FIG. 20A shows TG-IR results of CS sample after 2 days of curing. 2000 denotes for mass loss (wt %), 2002 denotes for temperature (° C.), and 2004 denotes for absorbance (a.u.).
Figure 20B:
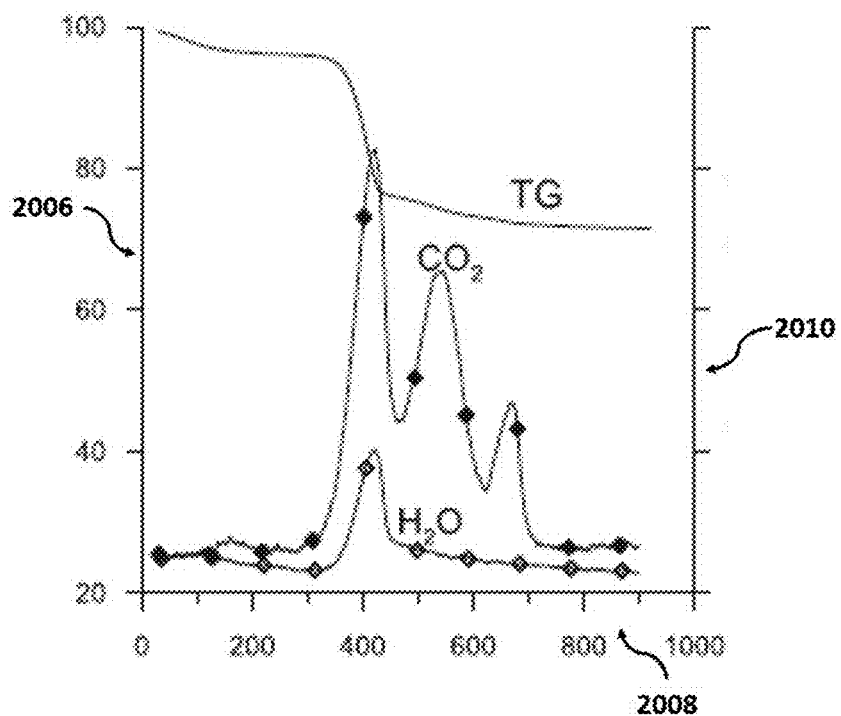
FIG. 20B shows TG-IR results of U1M sample after 2 days of curing. 2006 denotes for mass loss (wt %), 2008 denotes for temperature (° C.), and 2010 denotes for absorbance (a.u.).
Figure 20C:
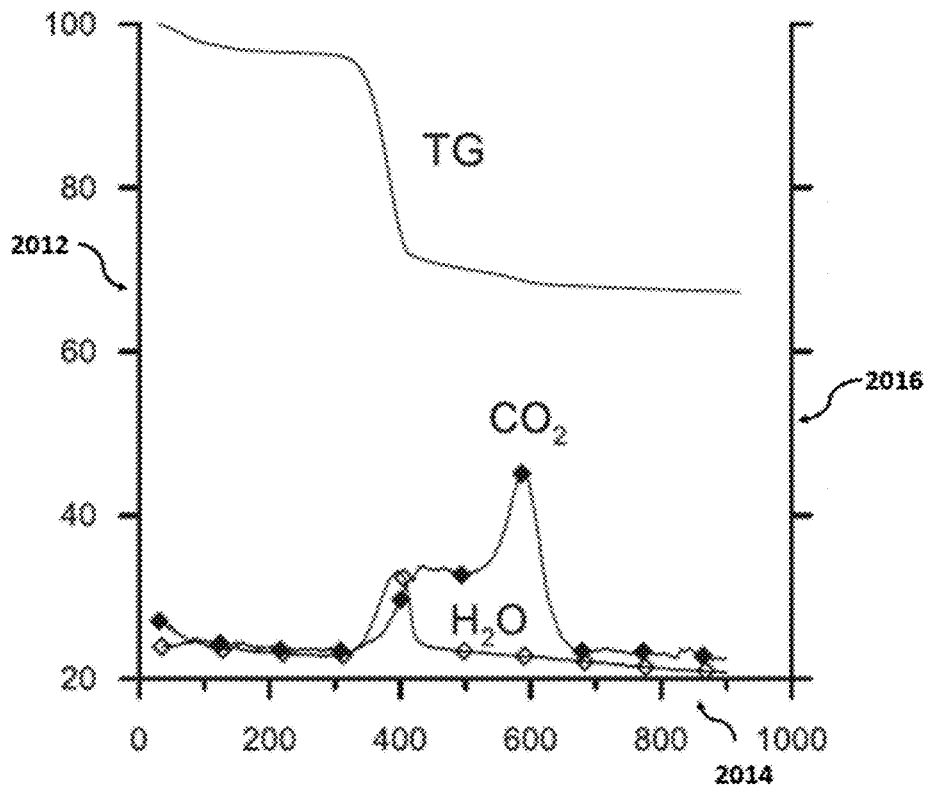
FIG. 20C shows TG-IR results of U2M sample after 2 days of curing. 2012 denotes for mass loss (wt %), 2014 denotes for temperature (° C.), and 2016 denotes for absorbance (a.u.).
Figure 20D:
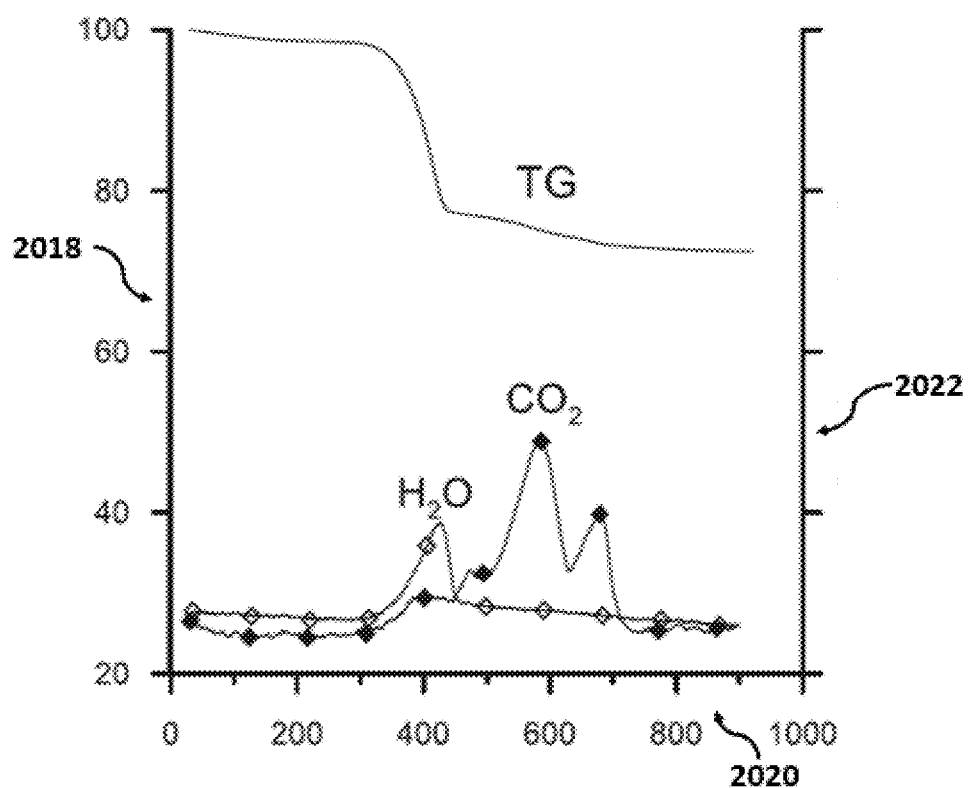
FIG. 20D shows TG-IR results of HA.CS sample after 2 days of curing. 2018 denotes for mass loss (wt %), 2020 denotes for temperature (° C.), and 2022 denotes for absorbance (a.u.).
Figure 20E:
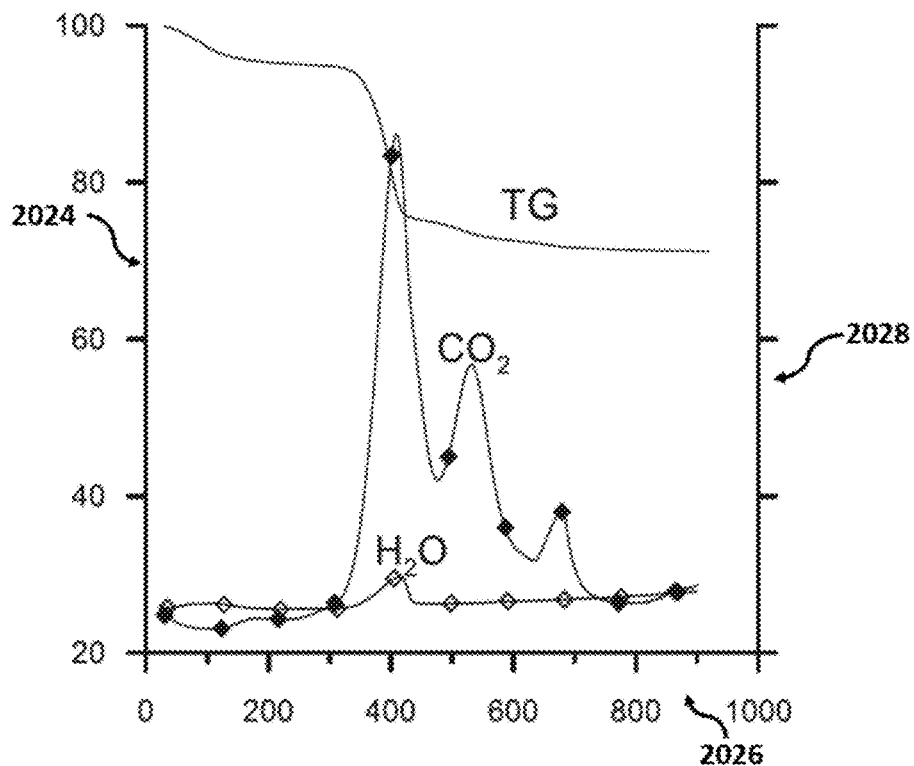
FIG. 20E shows TG-IR results of HA.U1M sample after 2 days of curing. 2024 denotes for mass loss (wt %), 2026 denotes for temperature (° C.), and 2028 denotes for absorbance (a.u.).
Figure 20F:
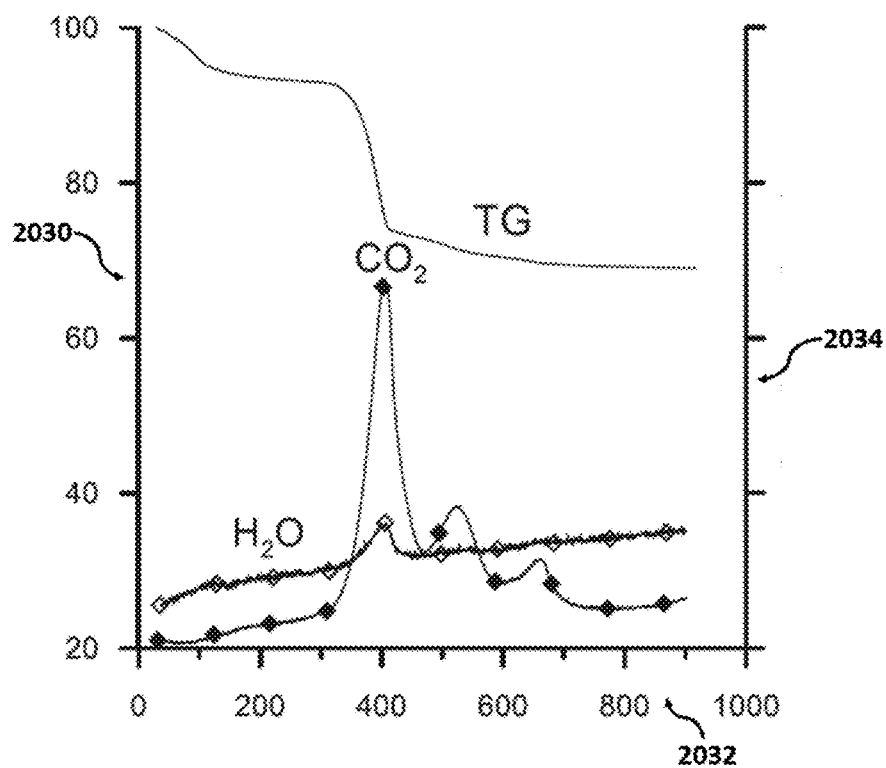
FIG. 20F shows TG-IR results of HA.U2M sample after 2 days of curing. 2030 denotes for mass loss (wt %), 2032 denotes for temperature (° C.), and 2034 denotes for absorbance (a.u.).

A majority of samples containing UPB-urea solutions with/without HA presented high contents of carbonate phases. The formation of HMHCs resulted from the reaction between $CO_3^{2-}$ ions (i.e. released by the UPB-urea solution) and $Mg^{2+}$ ions (i.e. released by the dissolution of MgO). The use of UPB-urea solutions not only accelerated the conversion of brucite to HMHCs, but also generated brucite with a poor crystallinity (FIGS. 19A and 19B). The poor crystallinity of brucite was indicated in the XRD pattern where broad peaks of brucite were found in UPB-urea samples. Despite the poor crystallinity, this transformation of brucite significantly improved the compressive strength of samples using UPB-urea solutions (FIGS. 17A and 17B). From these findings, improvements in the morphology and subsequent compressive strength was observed in the presence of brucite with a low degree of crystallinity.

Another improvement in the reaction mechanisms was introduced via the use of HA, which increased the presence of $Mg^{2+}$ available for the reaction with $CO_3^{2-}$ ions released from the UPB-urea solution (Eq. (9)), thereby stimulating the formation of HMHCs. Accordingly, samples with HA demonstrated higher mass losses due to decarbonation than the corresponding samples without HA (FIG. 22). Although the use of HA improved the sequestration of $CO_3^{2-}$ in the HA.CS sample when compared with CS (13.7% vs. 11.1%), the use of UPB-urea significantly enhanced the carbonation process, especially for samples containing 1 M urea (i.e. U1M (18.5%) and HA.U1M (19.1%)). The lowest carbonation degree, reflected by the lowest mass loss due to decarbonation (13.4%), could explain the lowest compressive strength of the U2M sample among those containing UPB-urea solutions. This low compressive strength was also attributed to the formation of a hexagonal brucite with a low cohesiveness (FIG. 18C). The high concentrations of $OH^-$ and $CO_3^{2-}$ ions released from U2M sample facilitated the simultaneous formation brucite and HMHCs at early stages (FIG. 22) The high concentration of $OH^-$ and $CO_3^{2-}$ ions was substantiated by the higher values of dehydration and decarbonation of U2M sample. The rapid formation of HMHCs on brucite/RMC surfaces (FIG. 24), could inhibit further contact between uncarbonated brucite/RMC and $CO_3^{2-}$ ions, resulting in the lowest carbonation degree in sample U2M. The use of HA not only reduced the pH value of the pore solution and slowed down the precipitation of brucite, but also led to the formation of nesquehonite seeds in the pore space in UPB-urea samples. As a result, UPB-urea samples with HA had significantly higher carbonation degrees than the corresponding samples without HA (FIG. 22). Despite the slightly lower mass loss due to decarbonation demonstrated by the HA. U2M sample than the HA.U1M sample (17.4% vs. 19.1%), the improved morphologies of HMHCs observed in the former (FIG. 18F) contributed to the achievement of the highest compressive strength among all the samples (~15 MPa in FIG. 17B). In addition to the improvements in the morphologies of HMHCs, the increase in the degree of hydration and carbonation revealed by the HA.U2M sample than the HA.U1M sample (i.e. the total mass loss 30.9% vs. 29.2%, Table 4), could explain its higher compressive strength (~15 MPa vs. ~12 MPa, FIG. 17B). Overall, the compressive strengths of RMC samples containing UPB-urea were much higher than those generally obtained by pure biocement stabilized sand samples, in which the biocement was employed to produce calcium carbonate as a binding agent. Accordingly, RMC samples containing UPB-urea solutions (except U2M sample) could gain compressive strengths higher than 5 MPa after 2 days, whereas the biocement only increased the average compressive strength of loose sand by up to ~3.5 MPa after 16 days via the use of bacterial cells and ~1.7 MPa after 16 days via the use of urease enzyme. These improvements in the reaction mechanisms of RMC samples, which translated into shorter setting times and higher strengths in the presence of UPB-urea without requiring the provision of high $CO_2$ concentrations, could open new avenues for the use of these mixes as a new geomaterial binder in geotechnical applications.

These RMC mixes may also replace PC used for the improvement of soft ground as a part of deep soil cement mixing or a control modulus column, which could increase the bearing capacity and reduce the settlement of natural soil. Generally, the use of PC in soft soil improvement results in a ~1 MPa increase in the soil strength in deep soil cement mixing, and ~1.5-4 MPa in jet grouting. Several practical ground improvement projects using PC-soil samples have reported a 28-day unconfined compressive strength of 0.7-2.1 MPa. The implementation of the proposed RMC-UPB-urea formulations in soil mixing can incorporate a mature technique of soil cement mixing that is popular in ground improvement. Therefore, it should be possible to apply these RMC mixes containing UPB-urea in ground improvement applications, depending on their final cost. In some cases, the much shorter setting times of these mixes could be a major advantage over the use of PC for ground improvement, eliminating or largely reducing any delays within construction processes such as the installation of adjacent soil-cement columns or building of structures on top. Furthermore, RMC mixes containing UPB-urea could be used as a grouting material for road repair to enable the rapid binding of aggregates in the base and subbase layers of pavements, fill voids in soil under building foundations, and seal fractures of rocks behind tunnel linings.

The limited strength development of RMC-based mixes under ambient conditions limits the use of RMC on a large scale in different building applications. This study aimed to resolve this issue via the synergistic use of MCP in the presence of a HA, which enabled the increased formation of HMHCs and improved the mechanical performance of RMC-based mixes. The hydrolysis of urea by UPB generates both $OH^-$ and $CO_3^{2-}$ ions, which can significantly enhance the hydration and carbonation processes of RMC-based mixes without the use of any external sources of $CO_2$. The UPB-urea solution can be directly used due to the relatively low pH of RMC-based mixes, thereby eliminating any need for encapsulation or immobilization to protect bacterial cells.

The results obtained in this example demonstrated that the formation of HMHCs strongly depended on the concentration of urea and the use of HA. The initially high pH of UPB-urea solutions limited the hydration of MgO. The dissolution of MgO, accompanied with the nucleation and growth of brucite, led to a sole exothermal peak in U2M and HA.U2M samples; whereas the use of UPB-urea with 0.5-1.5 M urea resulted in an induction period due to the lower initial hydration, followed by an additional exothermal peak due to the subsequent carbonation reaction. Among the samples containing 0.5-1.5 M urea, increasing the concentration of urea led to a longer delay in the appearance of the second exothermal peak. However, increasing the urea concentration up to 2 M accelerated the precipitation of brucite and HMHCs and generated an exothermal peak with a significantly higher intensity than those of CS and HA samples.

The use of HA not only accelerated the hydration of MgO but also stimulated the reaction between $Mg^{2+}$ (i.e. released by the dissolution of RMC and the HA) and $CO_3^{2-}$ (i.e. released by the UPB-urea solution). Accordingly, samples involving the simultaneous use of HA and UPB-urea presented the highest HMHCs contents. The use of UPB-urea also led to the formation of brucite with a poor crystallinity. The highest amount of carbonation was observed in samples including 1 M urea. However, the highest compressive strength (~15 MPa) was achieved in the synergistic combination of HA and UPB with 2 M urea, which was supported by the higher amount of hydrate (i.e. brucite with poor crystallinity) and carbonate (i.e. HMHCs with improved morphologies) formations.

Overall, the results presented in this example highlighted the potential of using the present self-carbonation technique in the development of RMC mixes with improved reaction mechanisms, which translated into enhanced microstructure and performance. This method not only eliminates the need for any additional supply of external $CO_2$, but also facilitates the development of sufficient strengths and shorter setting times in RMC-based mixes cured under ambient conditions. These advancements inevitably increase the effectiveness of RMC as a binder and open up new avenues of applications, in which RMC can be used for both the repair of existing structures or construction of new building components on a large scale.

Further studies may look into the optimization of the mix design and identification of the role of key factors such as the effect of lack of oxygen and nutrients, and mixing stress on urease activity, viability, and uniform distribution of bacterial cells. The incorporation of HMHCs, waste materials and industrial by-products along with UPB-urea and HA in RMC blends can also be investigated for reduced environmental impact and cost.

Example 3A: General Discussion of Present Microbial Carbonation Method with Seeding The performance of RMC-based mixes may be determined by the hydration and carbonation processes. As mentioned in example 2A, the hydration of RMC involves the dissolution of MgO, which is associated with an increase in the pH of the pore solution (see Eq. (10) below). The high pH environment initiates the dissolution of $CO_2$ (see Eq. (11) below) to form hydrated magnesium hydroxy carbonates (HMHCs) via the reaction between dissolved MgO and $CO_2$ (see Eqs. (12-14) below). The formation of HMHCs results in the reduction of porosity and the provision of bonding strength that enables the hardening and strength development of RMC mixes. Artinite, hydromagnesite and nesquehonite are the most commonly observed HMHCs in RMC mixes.

The dissolution of MgO:

$$MgO + H_2O \leftrightarrow Mg^{2+} + 2OH^- \quad (10)$$

The dissolution of $CO_2$:

$$CO_2 + H_2O \leftrightarrow 2H^+ + CO_3^{2-} \quad (11)$$

The reaction of dissolved MgO and $CO_2$ to form HMHCs:

$$2Mg^{2+} + 2OH^- + CO_3^{2-} + 2H_2O \rightarrow \quad (12)$$
$$MgCO_3 \cdot Mg(OH)_2 \cdot 3H_2O \text{ (artinite)}$$

$$5Mg^{2+} + 2OH^- + 4CO_3^{2-} + 4H_2O \rightarrow \quad (13)$$
$$4MgCO_3 \cdot Mg(OH)_2 \cdot 4H_2O \text{ (hydromagnesite)}$$

$$Mg^{2+} + 2OH^- + CO_3^{2-} + 3H_2O \rightarrow MgCO_3 \cdot 3H_2O \text{ (nesquehonite)} \quad (14)$$

Previous studies focused on the improvement of the carbonation processes, as well as the associated microstructural development and mechanical performance of carbonated RMC-based mixes. For such reported formulations, the formation of HMHCs was enhanced via the use of accelerated (5-20% $CO_2$ concentration) or supercritical carbonation conditions, resulting in compressive strengths of 25-46 MPa. Along with elevated $CO_2$ concentrations, high temperature pre-curing conditions (1-day curing at 50-60° C. prior to accelerated carbonation under ambient temperatures) significantly improved the performance of RMC mixes. The implementation of these measures such as the high temperature pre-curing was reported to accelerate the conversion of MgO into $Mg(OH)_2$(aq,s), which stimulated the carbonation to form HMHCs with improved morphologies, resulting in a 40% improvement in 28-day compressive strength (40 vs. 56 MPa). However, these studies may still suffer from one or more limitations discussed in the background section above. For instance, high temperature curing is energy consuming and hence not environmentally desirable.

Aiming to solve the issues, the present example presents a promising approach with a high potential to overcome the deficiencies of carbon dioxide diffusion via the provision of an internal accelerated self-carbonation process that can complement the limitations of external carbonation. The goal of this internal self-carbonation is to improve the transformation of RMC into HMHCs, as well as the productivity of the preparation of RMC concrete. This internal accelerated self-carbonation is to be achieved via an approach based on the use of microbial carbonation process (MCP), in which carbonate ions are produced through a series of reactions by the introduction of urease-producing bacteria (UPB) to catalyse the hydrolysis of urea (Eqs. (15-19)). Hydrolysing one mole of urea produces one mole of carbamic acid and one mole of ammonia (Eq. (15)). The unstable carbamic acid immediately hydrolyses to release carbonic acid and ammonia (Eq. (16)). These compounds then dissolve into water by equilibrium reactions, resulting in the formation of ammonium, hydroxide, and bicarbonate ions (Eqs. (17) and (18)). These hydroxide products creates an alkaline environment, which stimulates the formation of carbonate ions (Eq. (19)).

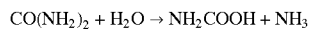

$$CO(NH_2)_2 + H_2O \rightarrow NH_2COOH + NH_3 \quad (15)$$

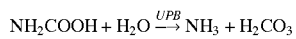

$$NH_2COOH + H_2O \xrightarrow{UPB} NH_3 + H_2CO_3 \quad (16)$$

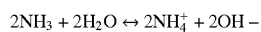

$$2NH_3 + 2H_2O \leftrightarrow 2NH_4^+ + 2OH^- \quad (17)$$

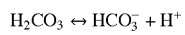

$$H_2CO_3 \leftrightarrow HCO_3^- + H^+ \quad (18)$$

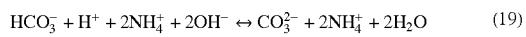

$$HCO_3^- + H^+ + 2NH_4^+ + 2OH^- \leftrightarrow CO_3^{2-} + 2NH_4^+ + 2H_2O \quad (19)$$

Previous examples focusing on the use of MCP revealed the formation of various carbonates (e.g. $CaCO_3$ and HMHCs) via the reaction between carbonate ions and provided alkali cations (e.g. $Ca^+$ and $Mg^{2+}$), which probably led to the adoption of this method for healing cracks in concrete samples, cementing loose sand soil, improving the engineering properties of soil samples, and enhancing the mechanical properties of RMC pastes. Accordingly, the high level of carbonate ions released via MCP (Eq. (19)) could enhance the conversion of the unhydrated MgO and uncarbonated brucite into HMHCs within RMC mixes, resulting in sufficiently high early strengths to enable the demolding of samples without any need for external $CO_2$ sources. The use of MCP for self-carbonation could increase the production rate and degree of HMHCs, which could not only enhance the mechanical performance but also eliminate any concerns regarding volume stability of RMC mixes, thereby leading to improved durability in the long term. Furthermore, the enabling of a fast demolding process in the absence of an external $CO_2$ source could increase the productivity of RMC sample preparation, facilitating the use of RMC on a larger scale.

The present example further contributes by presenting the role of MCP as an accelerated self-carbonation method to improve the performance of RMC samples via the increased conversion of RMC into HMHCs. This was achieved by overcoming the limitations of external $CO_2$ diffusion via the use of MCP for the carbonation of the sample core, whereas the carbonation of sample exterior was enhanced via accelerated carbonation conditions. To enable this, MCP was prepared by two UPB-urea mixtures, in which 1 or 2 M urea was used. Carbonation reaction was further enhanced by the simultaneous inclusion of 0.5% (i.e. by mass of binder) hydromagnesite as nucleation seeds (S). The presence of these seeds was aimed to facilitate the formation of brucite in the pore space, thereby increasing its contact surface area with carbonate ions and stimulating the carbonate reaction. The hydration kinetics of RMC-based mixes with and without S, in the presence of UPB-urea solutions, were analyzed by isothermal calorimetry. The influence of UPB-urea solution on the conversion of RMC into HMHCs, and the mechanical performance of RMC samples cured under ambient and accelerated carbonation conditions were also investigated and reported. Accordingly, the effectiveness of accelerated self-carbonation induced by MCP was assessed by compressive strength, density and water absorption measurements, for which samples were assessed at 2, 7, 14 and 28 days. Furthermore, the properties of HMHCs and the microstructural development of RMC-UPB-urea mixtures were investigated by scanning electron microscopy (SEM), x-ray diffraction (XRD), thermogravimetric-infrared spectroscopy (TG-IR), and derived thermogravimetry (DTG).

Example 3B: Materials for Example 3A

Figure 26:
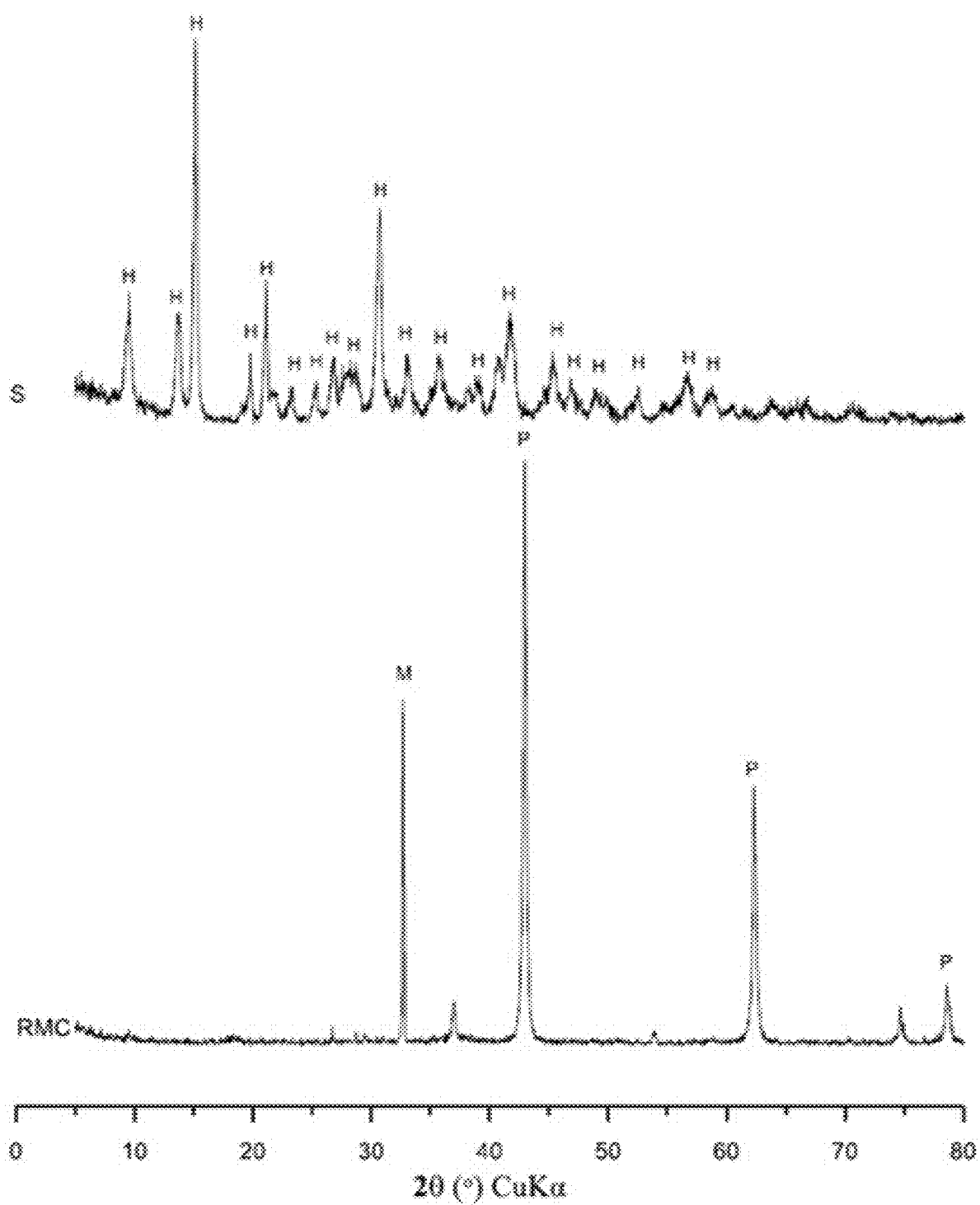
FIG. 26 denotes XRD patterns of RMC and S. P denotes for periclase, H denotes for hydromagnesite, and M denotes for magnesite.

RMC obtained from Richard Baker Harrison-UK and S obtained from Fisher Scientific-UK were used to form the main binder component in this study. The XRD patterns of RMC and S are shown in FIG. 26. The low calcination temperatures used during its production led to the presence of uncalcined magnesite in RMC, as observed at 32.8° and 42.9° 2θ, which partially overlapped with periclase (FIG. 26). The chemical composition and physical properties of RMC are presented in Table 5 below.

TABLE 5

Chemical composition and physical properties of RMC

|  | Chemical composition (%) | | | | | | | Physical properties | |
|---|---|---|---|---|---|---|---|---|---|
|  | MgO | SiO$_2$ | CaO | R$_2$O$_3$ | K$_2$O | Na$_2$O | LOI | Specific gravity (g/cm$^3$) | Specific surface area (m$^2$/g) |
| RMC | >91.5 | 2.0 | 1.6 | 1.0 | — | — | 4.0 | 3.0 | 16.3 |

Figure 27:
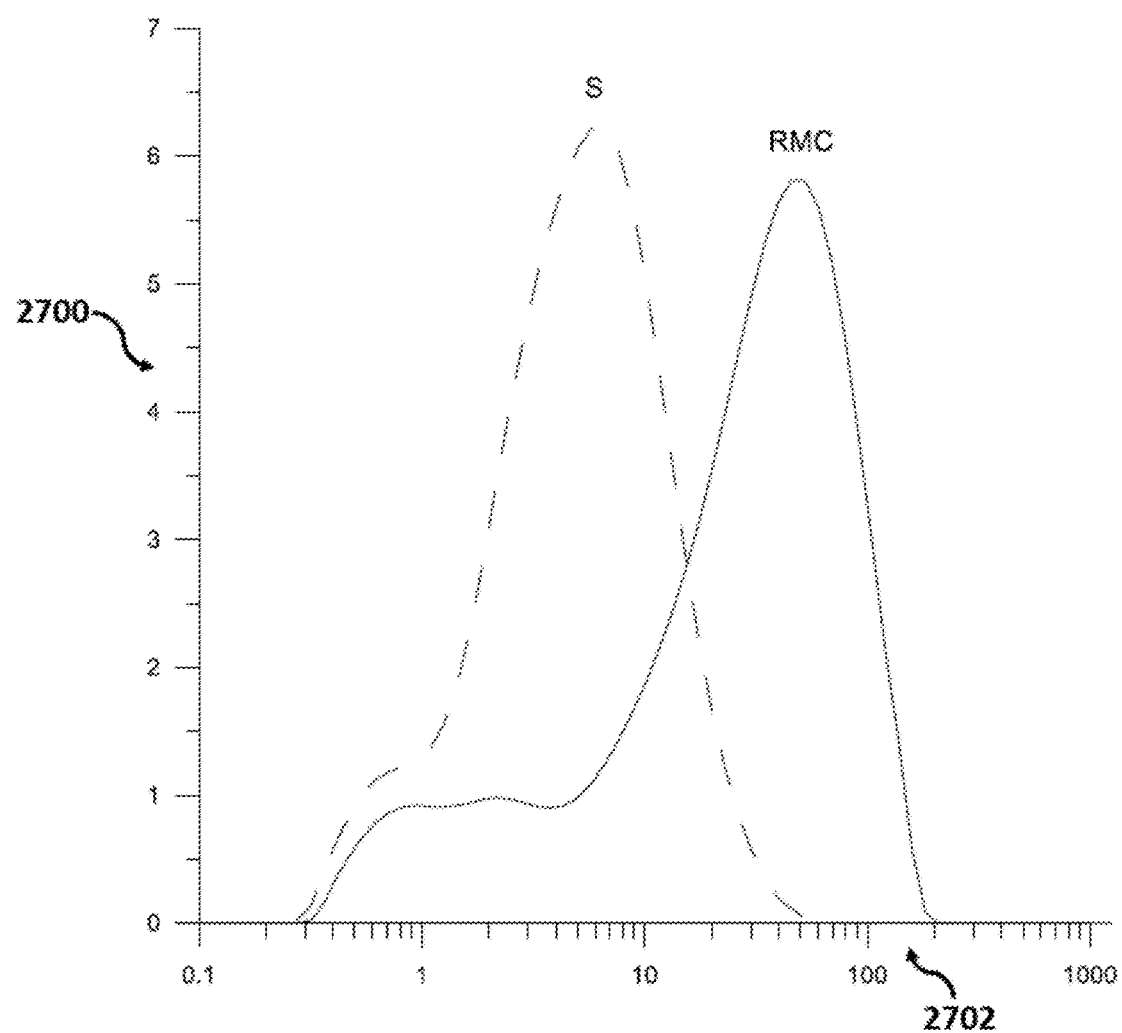
FIG. 27 shows the particle size distributions of RMC and Seeds (S). 2700 denotes for volume (%) and 2702 denotes for particle size (μall).

FIG. 27 indicates the finer particle size of S in comparison to RMC. Course aggregates with a particle size range of 4.7-9.5 mm were properly cleaned in a water tank to remove contaminants, followed by storage in a container until they achieved saturated surface dry condition prior to mixing.

Figure 28:
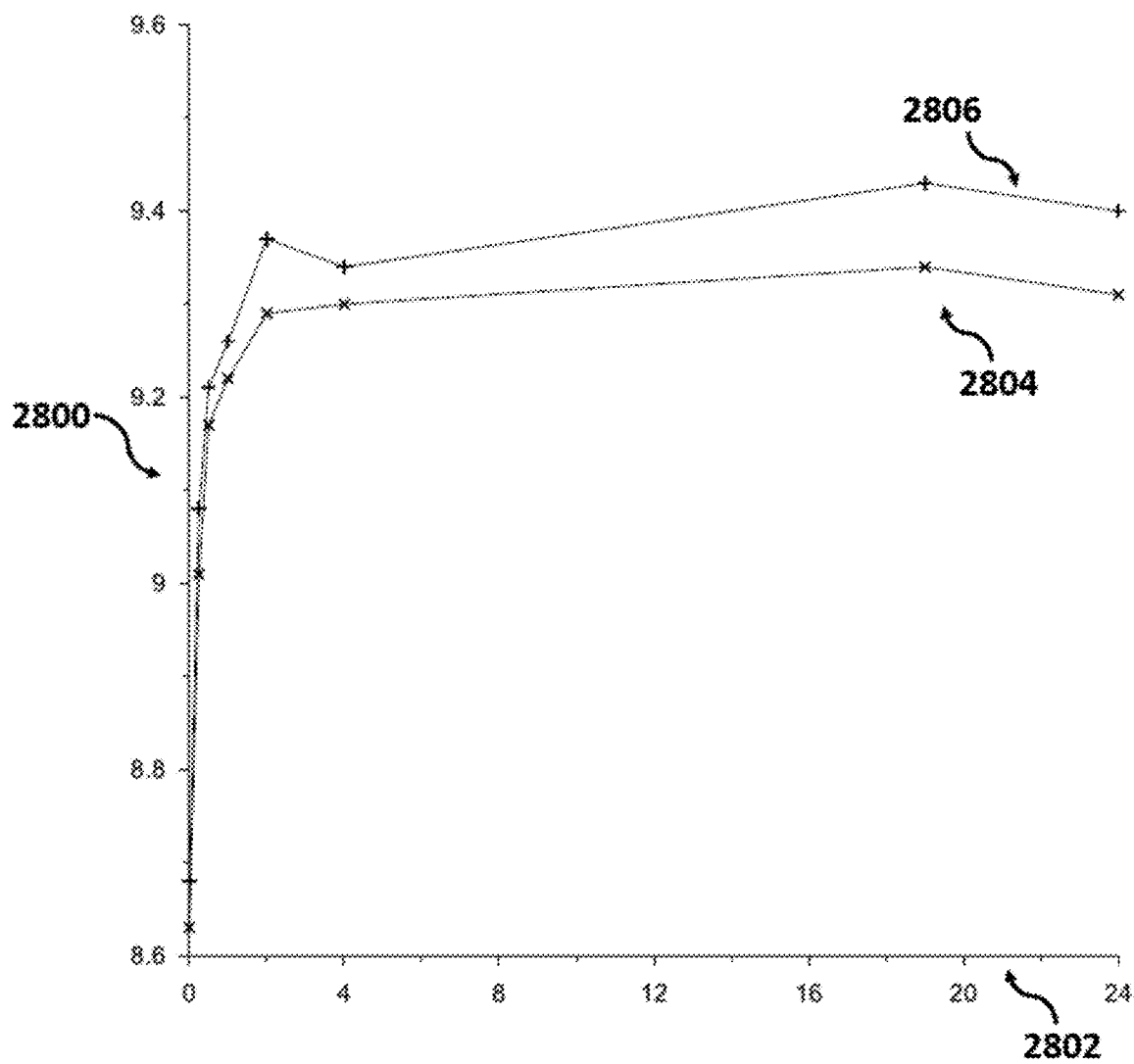
FIG. 28 is a plot of pH values of UPB-urea solutions. 2800 denotes for pH, 2802 denotes for time (hrs), 2804 denotes for UPB-urea 1 M, and 2806 denotes for UPB-urea 2 M.

*Sporosarcina pasteurii* DSM 33 was used as the UPB that was introduced in the prepared samples. The medium prepared for pilot liquid cultures contained the following chemical compounds in 1 L distilled water: 10 g of NH$_4$Cl, 20 g of yeast extract, 50 µL of NiCl$_2$ (12 g/L), whose pH was adjusted at 9.0. The medium was autoclaved, followed by the addition of 10 g/L of urea, which were filter-sterilized. The *Sporosarcina pasteurii* strains were transferred into the medium for cultivation under an aerobic condition with a temperature controlled shaker (i.e. shaking at a speed of 350 rpm, incubation for 48 hrs, temperature of 25±1° C.). The cultures of UPB were harvested after 48 hrs for the measurement of optical density (OD600) and urease activity. The cultures with ~3.1 of OD600 and ~20 U/ml of urease activity (1 U=1 µM of urea hydrolyzed/min) were stored at 4° C. until they were used in the prepared samples. The solutions containing 1 or 2 M of urea were prepared by mixing urea powder with distilled water. The increase in the pH of UBP-urea solutions after mixing is shown in FIG. 28. The pH values of UBP-urea solutions were initially ~8.6 and increased to ~9.2 after 1 hr of mixing. The pH values of solution containing 2 M of urea were slightly higher than those with 1 M of urea (i.e. 9.4 vs. 9.3 after 2 hours of mixing).

Example 3C: Sample Preparation and Methodology for Example 3A

Two sets of samples (i.e. with and without S) were prepared to investigate the influence of MCP on the performance of carbonated RMC-based concrete samples. The detailed mixture proportions of the prepared concrete samples are shown in Table 6 below.

TABLE 6

Mixture proportions of concrete samples prepared for example 3A.

| | Mixture proportion (kg/m$^3$) | | | | | | |
|---|---|---|---|---|---|---|---|
| Sample | W/B | RMC | S | Water | Bacteria | Urea (1M) | Urea (2M) | Aggregates |
| CS | 0.65 | | | 312 | — | — | — | 1120 |
| MCP1 | 0.7 | 480 | — | — | 168 | 168 | — | 1100 |
| MCP2 | 0.7 | | — | — | 168 | — | 168 | 1100 |
| S | 0.65 | | | 312 | — | — | — | 1120 |
| S.MCP1 | 0.7 | 477.6 | 2.4 | — | 168 | 168 | — | 1100 |
| S.MCP2 | 0.7 | | | — | 168 | — | 168 | 1100 |

The first set of samples included a control sample (CS) and two other samples using MCP with different urea concentrations (i.e. sample MCP1 contained a mixture of UPB with 1 M urea, whereas sample MCP2 contained a mixture of UPB with 2 M urea). The second set of samples (S, S.MCP1 and S.MCP2) followed a similar compositional design, with the main difference being the presence of 0.5% S to enhance the carbonation of RMC. The use of UPB-urea in MCP samples (MCP1, MCP2, S.MCP1 and S.MCP2) led to an increase in the water (or solution)/RMC ratio from 0.65 to 0.7 to obtain a comparable workability with the CS and S samples. The higher volume of solution in MCP samples than CS and S samples led to lower aggregate contents (i.e. 1100 vs. 1120 kg/m$^3$). Before the preparation of samples, water or UPB-urea solutions were mixed with RMC prior to the addition of coarse aggregates. To prepare the seeded samples, S was dispersed in water or UPB-urea solutions before mixing with RMC and coarse aggregates. The use of fine aggregates was omitted to enable the extraction of carbonated paste from the rest of the sample without any contamination, which increased the accuracy of phase quantifications. Once the mixing process was completed, 5×5×5 cm cubic samples were cast, consolidated and kept under ambient conditions (~30° C., ~80% relative humidity (RH) and ~0.04% CO$_2$ concentration) for 2 days prior to demolding. To further enhance the transformation of RMC and brucite into HMHCs, the demolded samples then were cured under accelerated carbonation conditions (~30° C., ~80% RH and 10% CO$_2$ concentration) for up to a total of 28 days.

Example 3D: Characterization for Example 3A

Isothermal calorimetry—The corresponding paste samples (i.e. containing the same proportions of solution, S and RMC as concrete mixtures shown in Table 6 above) were prepared to evaluate the influence of MCP on the reaction kinetics of RMC with or without S. The heat evolution of prepared pastes was monitored by an I-Cal 8000 High Precision calorimeter. Before the analysis, the raw materials were preheated at 30° C. in the calorimeter channels to achieve a similar temperature as the measurement temperature (30° C.). After mixing, the paste samples were immediately placed into the calorimeter channels to record the heat evolution for up to 125 hours.

Physical properties—The influence of MCP on the performance of RMC-based concrete samples was assessed through density measurements, preformed by determining the change in sample dimension and mass, and compressive strength measured by a Toni Technik Baustoffprüfsysteme machine at a constant loading rate of 55 kN/min. The pore structure of RMC-based concrete samples with and without MCP was evaluated via the water absorption test. Concrete samples at 14 and 28 days were tested for their water absorption according to ASTM C1585-13. All samples were dried in an environmental chamber at a temperature of 50° C. and RH of 80% for 2 days and cooled down in sealed containers at ~30° C. for 1 day before their initial mass values were measured, after which they were placed in a water tank. Their absorption mass values were also measured when they reached a constant mass under water, which reflected their water absorption capacity. Water absorption (W) was calculated as a percentage of the initial mass, as shown in the equation below, where A is the 256 absorption mass of samples after reaching a constant mass when immersed in water and I is the initial mass.

$$W=(A-I)\times 100/I \text{ (\%)}$$

Microstructural analysis—After compressive strength tests, paste segments were extracted from concrete samples cured under ambient conditions (at the age of 2 days) and accelerated carbonation conditions (at the age of 14 days) for microstructural analysis. To evaluate the effectiveness of accelerated self-carbonation induced by MCP, solid paste segments were collected from the inner sections (i.e. core) of concrete samples, where $CO_2$ diffusion was inhibited by the formation of an impervious HMHC layer during the initial carbonation; and at the outer sections (i.e. exterior) of concrete samples, which was directly subjected to a high concentration of $CO_2$. The procedure of storing the selected segments in isopropanol and drying to inhibit further hydration, as well as grinding down to powder form for XRD and TG-IR analyses, was detailed in previous examples. Powder XRD, using Cu Kα 273 radiation (40 kV, 30 mA), was recorded in the range of 5–70° 2θ by a Philips PW 1800 spectrometer with a scanning rate of 0.04° 2θ/step. Fluorite (CaF) was used at 5 wt % as an internal standard to semi-quantitatively compare the relative amounts of crystalline phases in all samples. TG-DTG was carried out with a Perkin Elmer TGA 4000 under nitrogen flow at a flow rate of 20 ml/min. Each sample was heated from 30° C. to 920° C. at a heating rate of 10° C./min. The outlet of the Perkin Elmer TGA 4000 equipment was linked with a Perkin Elmer FT-IR spectrometer via a Perkin Elmer TG-IR TL 8000 interface. This interface transferred the evolved gases from the TGA equipment to the FT-IR spectrometer to provide information regarding the gases released during thermal decomposition. The IR absorbances of $H_2O$ and $CO_2$ released during thermal decomposition were identified in the ranges of ~3400-4000 $cm^{-1}$ and 2250-2450 $cm^{-1}$, respectively. To quantify the amount of $H_2O$ and $CO_2$ at each step of thermal decomposition, DTG curves were deconvoluted based on the IR absorbances of $H_2O$ and $CO_2$ by using Gaussian area deconvolution method and Origin 2017 software. The influence of MPC on the morphologies of hydration and carbonation products of RMC samples with and without S was analyzed via SEM images obtained by a Zeiss Evo 50 microscope. The selected segments extracted from each sample were coated with gold before SEM analysis.

Example 3E: Characterization of Results for Example 3A

Figure 29A:
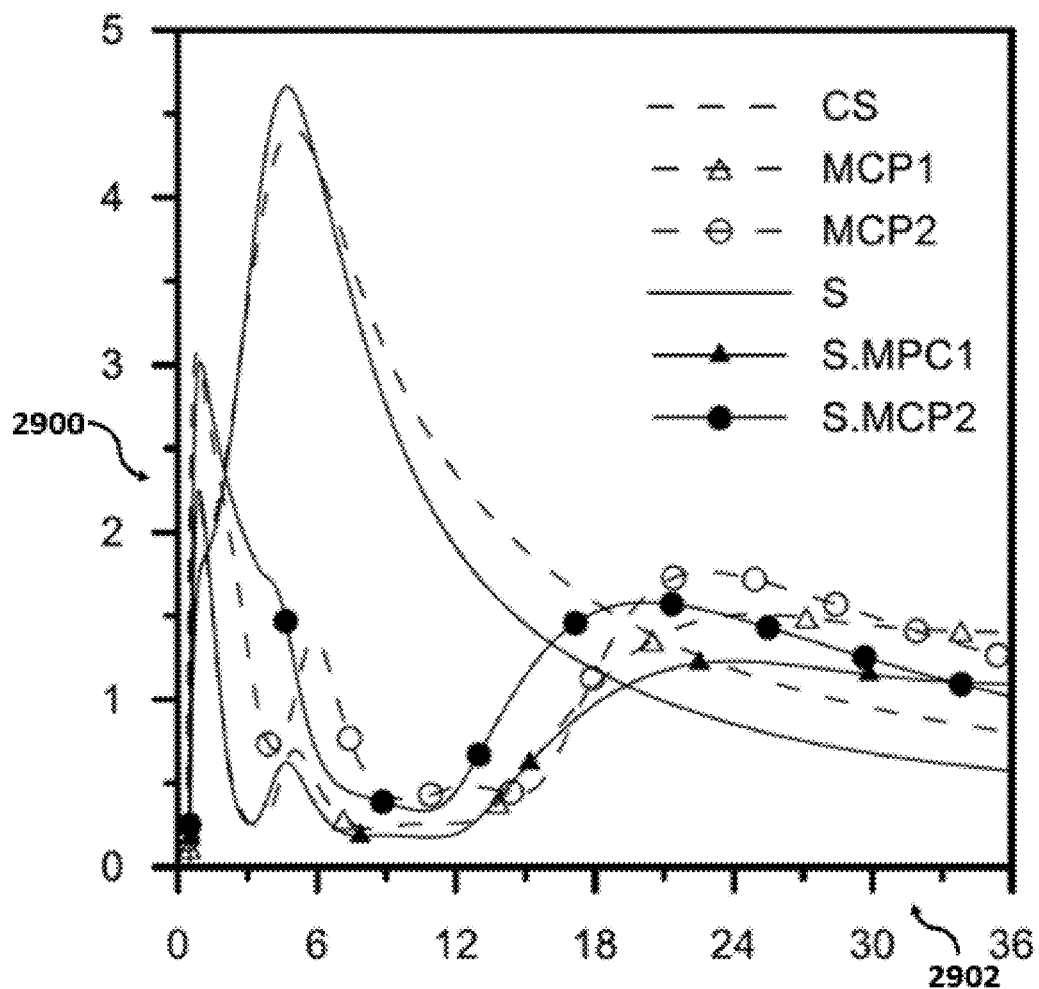
FIG. 29A shows the heat evolution of hydrated samples, specifically the heat flow during the first 36 hrs. 2900 and 2902 denote for heat flow (mW/g) and time (hrs), respectively.
Figure 29B:
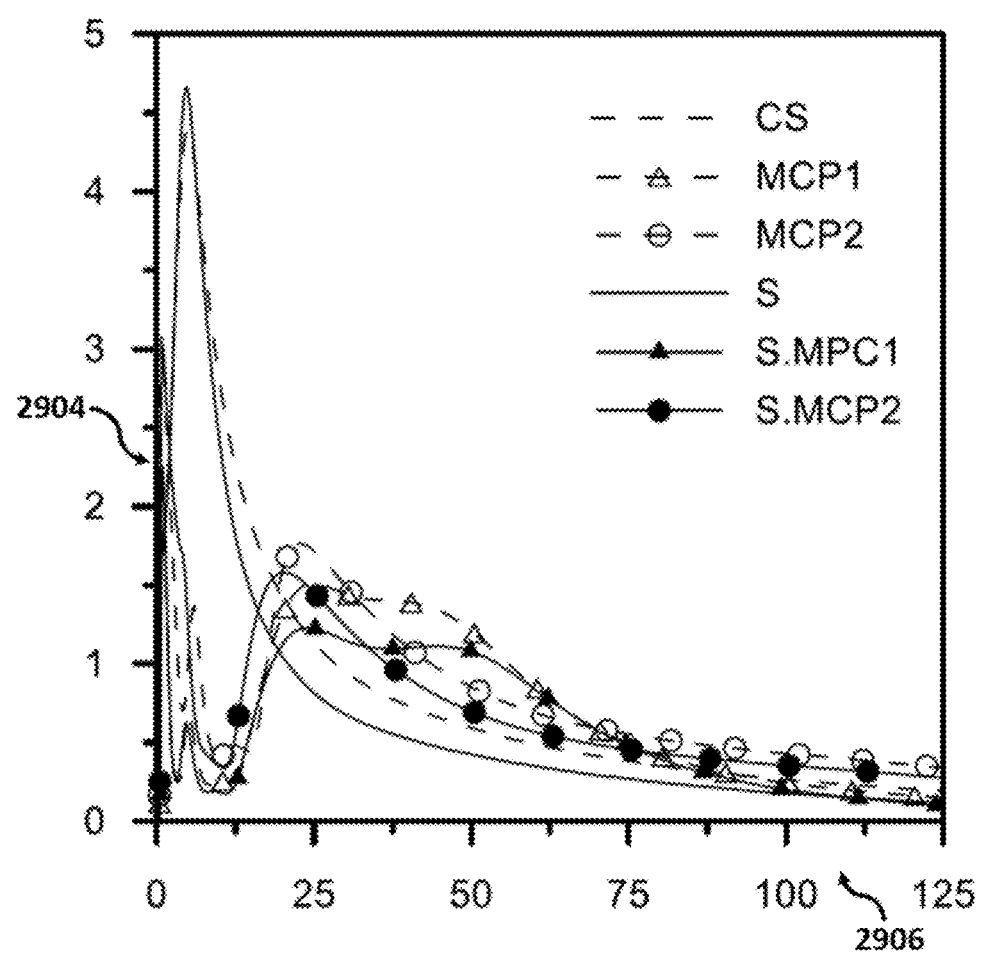
FIG. 29B shows the heat evolution of hydrated samples, specifically the heat flow up to 125 hrs. 2904 and 2906 denote for heat flow (mW/g) and time (hrs), respectively.
Figure 29C:
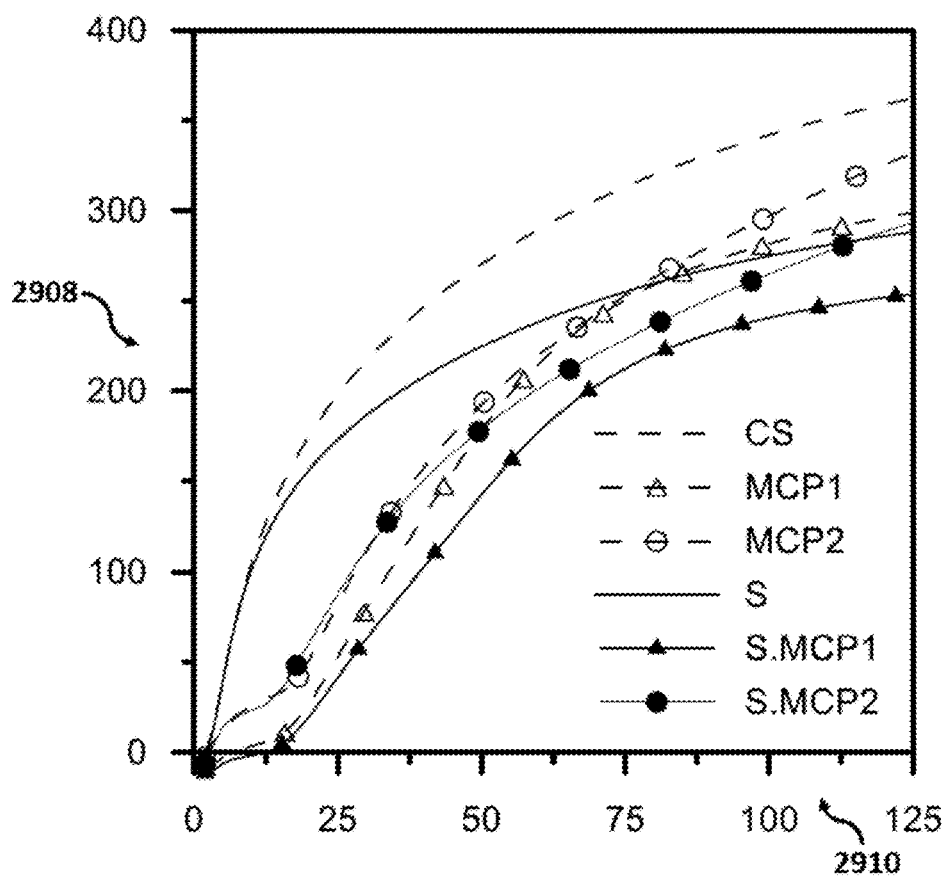
FIG. 29C shows the heat evolution of hydrated samples, specifically the cumulative heat. 2908 and 2910 denote for cumulative heat (J/g) and time (hrs), respectively.

Isothermal calorimetry—The heat evolution of paste samples during the first 125 hours of hydration and carbonation (i.e. internal reaction associated with MCP) are shown in FIG. 29A to 29C. The heat release due to the dissolution of MgO and the subsequent precipitation of brucite resulted in 300 an exothermic peak in CS and S samples at ~5.5 hours after mixing (FIG. 29A). Alternatively, MCP samples (MCP1, MCP2, 302 S.MCP1 and S.MCP2) including UPB-urea solutions revealed three distinct stages of reaction. The first stage of reaction resulted in a single pre-induction peak in sample S.MCP2 (at ~2 hours after mixing) and two pre-induction peaks (at ~2 and ~5-6 hrs after mixing) in samples MCP1, MCP2 and S.MCP1. These pre-induction peaks were associated with the hydration of MgO, and the subsequent precipitation of brucite and HMHCs. The endothermic hydrolysis of urea could have interfered with the heat evolution due to hydration and carbonation within MCP samples, resulting in much lower peaks of pre-induction in these samples than those in CS and S samples. The higher initial pH of UPB-urea than water (i.e. 9.2-9.4 vs. 7.8) also contributed to the slow dissolution of MgO, along with the lower pre-induction peaks observed in MCP samples when compared with CS and S samples. Following the first stage was the second stage of reaction, the induction period (starting at ~7-9 hours and finishing at ~12-15 hours), which corresponded to a required interval of ~5-6 hours for the release of carbonate and magnesium ions. The accumulation of these ions to reach a critical concentration led to the formation of HMHCs. Finally, the third stage, referring to the acceleration and deceleration period, was associated with the increase in heat released from the nucleation, growth, and precipitation processes involved in the formation of HMHCs. The exothermic peaks of acceleration-deceleration were observed at ~20-22 hours after mixing. The heat release during acceleration-deceleration led to higher heat flow in MCP samples than the corresponding CS and S samples after 22 hours of mixing (FIG. 29B). Samples MCP2 and S.MCP2, which included a higher concentration of $CO_3^{2-}$ due to their higher urea concentration, revealed higher pre-induction and acceleration-deceleration process peaks than corresponding samples MCP1 and S.MCP1. The cumulative heat results (FIG. 29C) highlighted the lower amounts of cumulative heat in MCP samples when compared to corresponding CS and S samples, which was particularly obvious at earlier stages of reaction. This difference was associated with the endothermic urea hydrolysis, and the low dissolution of MgO in the presence of UPB-urea solutions with higher pH. Despite their lower levels of MgO hydration and endothermic reactions, MCP samples revealed an increase in their cumulative heat over time via the increased formation of HMHCs, which contributed to the heat released and resulted in heat curves that surpassed the S sample after ~113 hrs of hydration. Out of these samples, MCP2 demonstrated a constant increase in its heat release, which approached that of the CS towards the end of the analysis at 125 hrs.

Figure 30:
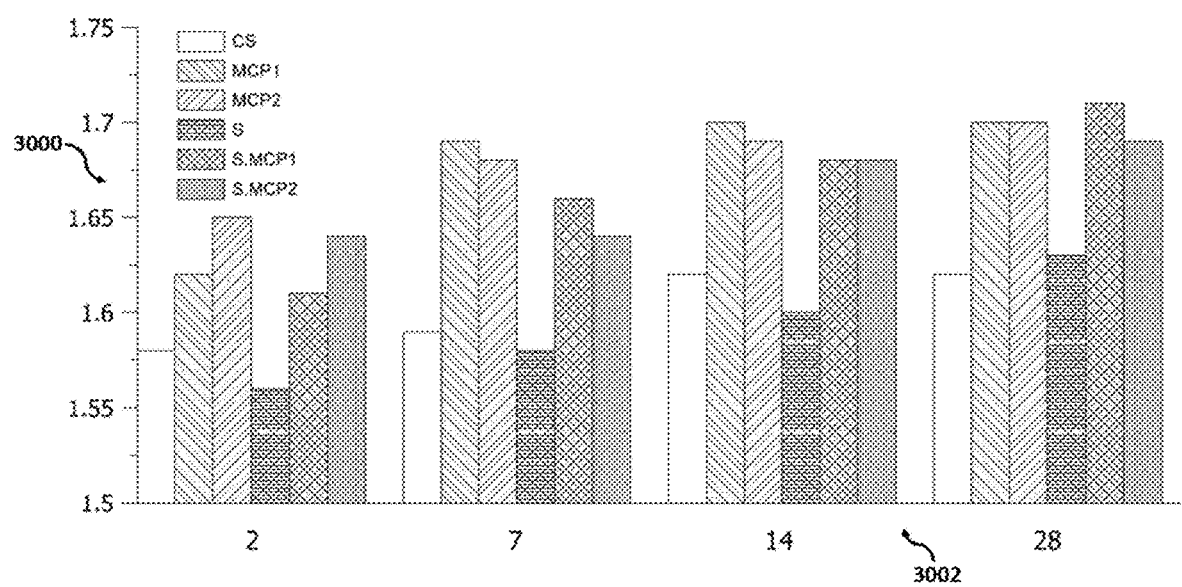
FIG. 30 is a plot of the density of carbonated samples after 2 days under ambient conditions, followed by carbonation conditions. 3000 denotes for density (g/cm$^3$) and 3002 denotes for ages (days).

Density—FIG. 30 reveals the density evolution of all concrete samples during 28 days of curing. The density of all samples increased with the duration of carbonation, which was more evident at earlier stages of curing. This increase in density was associated with the formation of carbonate phases that reduced the initial porosity and resulted in denser microstructures. Despite their higher solution/binder ratios (0.7 vs. 0.65), MCP samples demonstrated higher densities than CS and S samples at all ages. These higher densities of MCP samples could be attributed to their higher $CO_2$ and water absorption, leading to the formation of HMHCs. MCP samples were hardened in their original molds under the ambient conditions, without any source of external $CO_2$ for the first two days. Therefore, the higher densities of MCP samples were related to the accelerated self-carbonation induced by MCP within these samples. The use of accelerated carbonation led to a more obvious difference in the density levels of MCP samples when compared to CS and S samples at 7-28 days. Overall, the density data highlighted the role of MPC in densifying the sample microstructure.

Despite their lower densities at early ages, seeded samples (S, S.MCP1, and S.MCP2) revealed slightly higher density values than corresponding samples (CS, MCP1, and MCP2) at later ages, which could be an indication of the enhancement of their reaction mechanisms in the presence of seeds and/or MCP.

Figure 31:
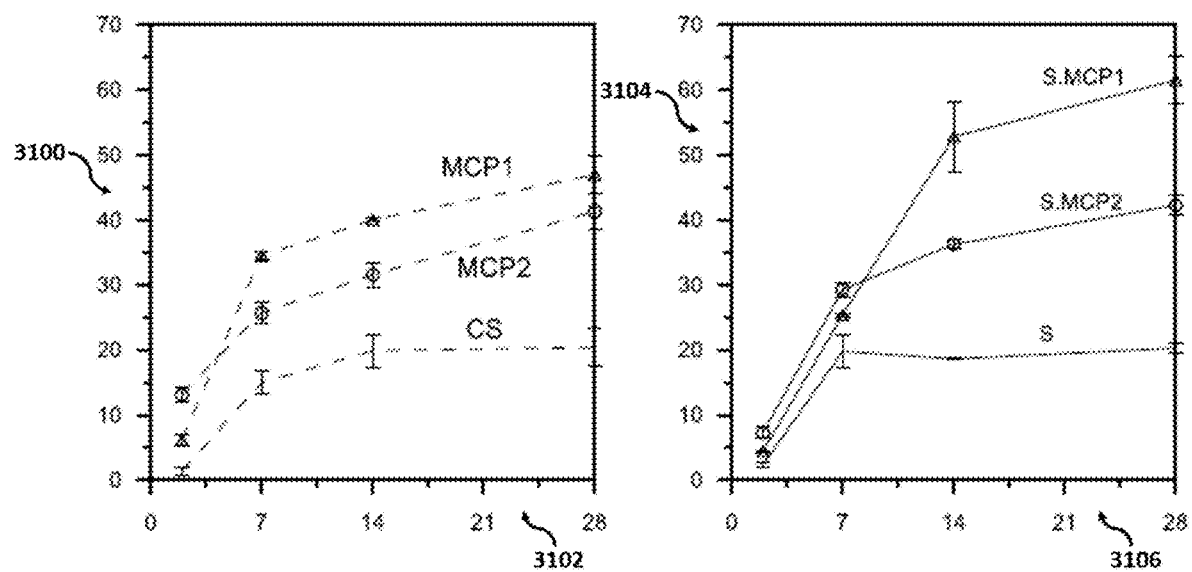
FIG. 31 shows compressive strength of samples after 2 days under ambient conditions, followed by up to 26 days under accelerated carbonation conditions. The left image shows samples without S and right image shows samples with S. 3100 and 3104 denote for compressive strength (A/Pa), and 3102 and 3106 denote for age (days).

Compressive strength—The strength development of concrete samples during 28 days of curing is shown FIG. 31. The formation of brucite with limited strength gain in CS and S samples resulted in limited compressive strengths of ~1 MPa and ~2 MPa after 2 days of curing under ambient conditions, respectively. The use of MCP within samples MCP1, MCP2, S.MCP1 and S.MCP2 had an obvious influence in the strength development, leading to significantly higher results than CS and S samples. This improvement in strength was associated with the accelerated self-carbonation of these samples. The use of a higher concentration of urea in samples S.MCP2 and MCP2, enabled the increased presence of $CO_3^{2-}$ from the hydrolysis of urea, which led to 2-day compressive strengths as high as 13 MPa. These values were almost twice as high as the corresponding samples S.MCP1 and MCP1. Alternatively, a comparison of the strength development of CS and S samples revealed the limited contribution S played in the strength development in comparison to the use of MCP. Following the initial 2 days of curing under ambient conditions, all samples were subjected to accelerated carbonation curing for up to 28 days. During this period, CS and S samples gained a majority of their strength from 2 to 7 days, resulting in strengths of ~15 MPa and 20 MPa, respectively. Both samples reached ~20 MPa at 14 days, which remained relatively stable until the end of the curing period. In line with the density results, the use of MCP not only accelerated strength gain at early ages (i.e. during ambient curing), but also enhanced the strength development at later stages (i.e. during accelerated carbonation curing). The higher level of initial pH in UPB-urea solution than water (i.e. 9.2-9.4 vs. 7.8) could have enabled the higher $CO_2$ dissolution in samples incorporating MCP, thereby enhancing the formation of HMHCs and associated strength development. Accordingly, the compressive strength of samples involving the use of MCP reached ~25-35 MPa after 7 days of curing. Despite their lower compressive strengths at 2 days, samples MCP1 and S.MCP1 gained notably higher compressive strengths than corresponding samples MCP2 and S.MCP2 after 14 days of 10 curing, reaching strengths of up to 53 MPa. This was followed by a steady increase in the strength of MCP samples until 28 days, revealing values that were 2-3 times of those of CS and S samples (i.e. 41-62 MPa vs. 20 MPa). Although the inclusion of S could not improve the compressive strength of samples S and S.MCP2 in comparison to samples CS and MCP2, it increased the 28-day compressive strength of S.MCP1 by ~32% when compared to MCP1 (i.e. 62 MPa vs. 47 MPa).

Water absorption—Table 7 below shows the water absorption values of all samples after 14 and 28 days of curing.

TABLE 7 water absorption (%) of concrete samples after 14 and 28 days of curing. Standard deviation is presented in parenthesis.

| Sample | 14 days | 28 days |
| --- | --- | --- |
| CS | 14.7 (0.5) | 14.5 (0.7) |
| MCP1 | 7.7 (0.3) | 6.2 (0.9) |
| MCP2 | 6.6 (0.8) | 5.5 (0.3) |
| S | 9.6 (0.9) | 9.0 (0.4) |
| S.MCP1 | 7.6 (0.2) | 5.1 (0.2) |
| S.MCP2 | 6.0 (0.2) | 5.3 (0.2) |

Table 7 In line with the density and compressive strength results, a significantly lower water absorption was observed in MCP samples when compared to CS and S samples, highlighting the role of accelerated self-carbonation in densifying the microstructure. Accordingly, the water absorption of CS and S samples at 14 days of curing was 14.7% and 9.6%, respectively. Despite their higher solution/binder ratios, the accelerated self-carbonation induced by the use of MCP reduced the water absorption of MCP samples to 6.0-7.7% at 14 days. Moreover, the continuation of carbonation until 28 days enabled the further reduction of water absorption in MCP samples to 5.1-6.2%, compared to a slight decrease in the water absorption of CS (14.5%) and S samples (9.0%). The simultaneous implementation of MCP and S in sample S.MCP1 resulted in the lowest water absorption of 5.1% after 28 days of curing, which was in line with the highest 28-day compressive strength revealed by this sample.

Figure 32A:
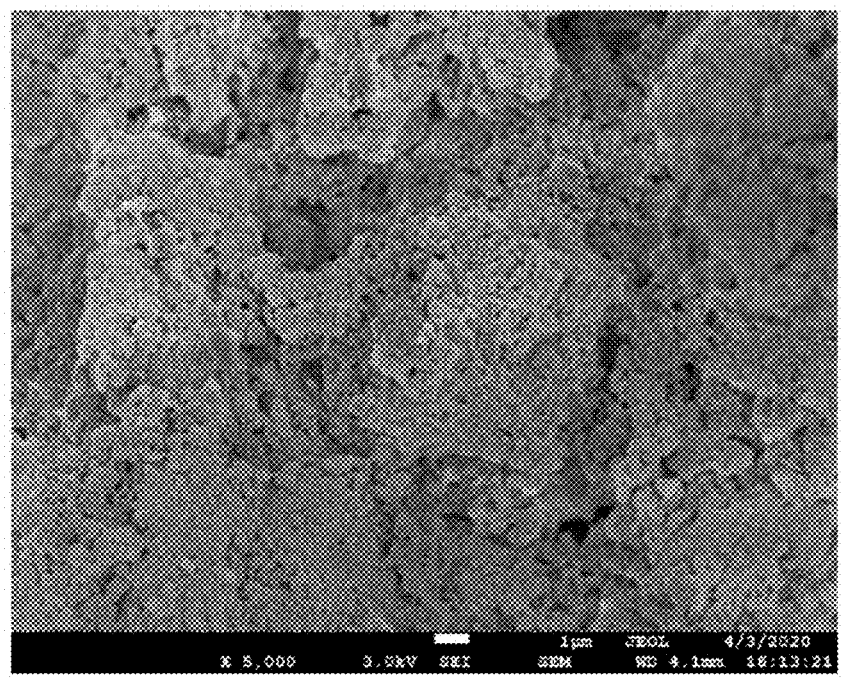
FIG. 32A is a SEM image of sample CS after 2 days of curing under ambient condition. Scale bar denotes 1 μm.
Figure 32B:
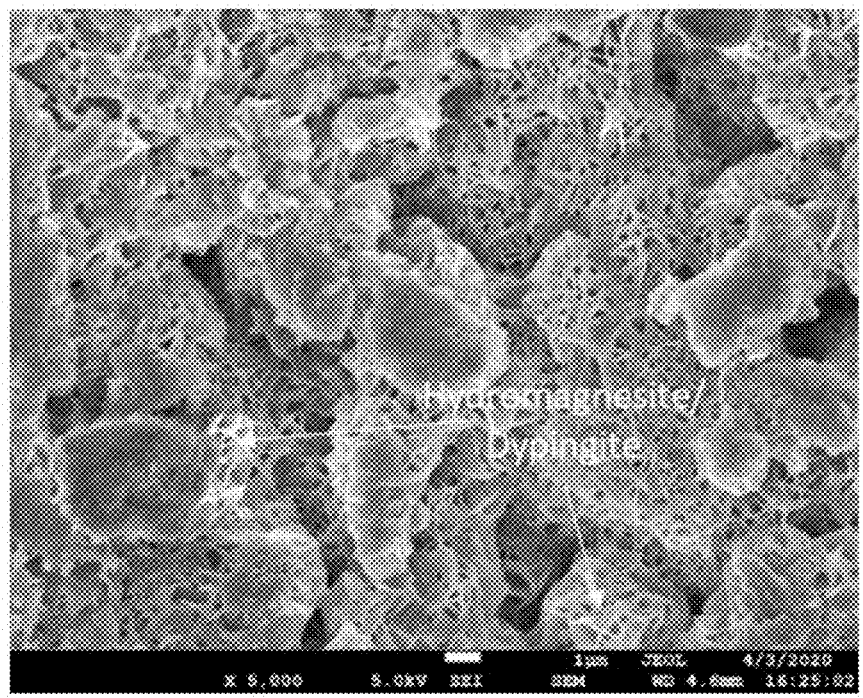
FIG. 32B is a SEM image of sample MCP1 after 2 days of curing under ambient condition. Scale bar denotes 1 μm.
Figure 32C:
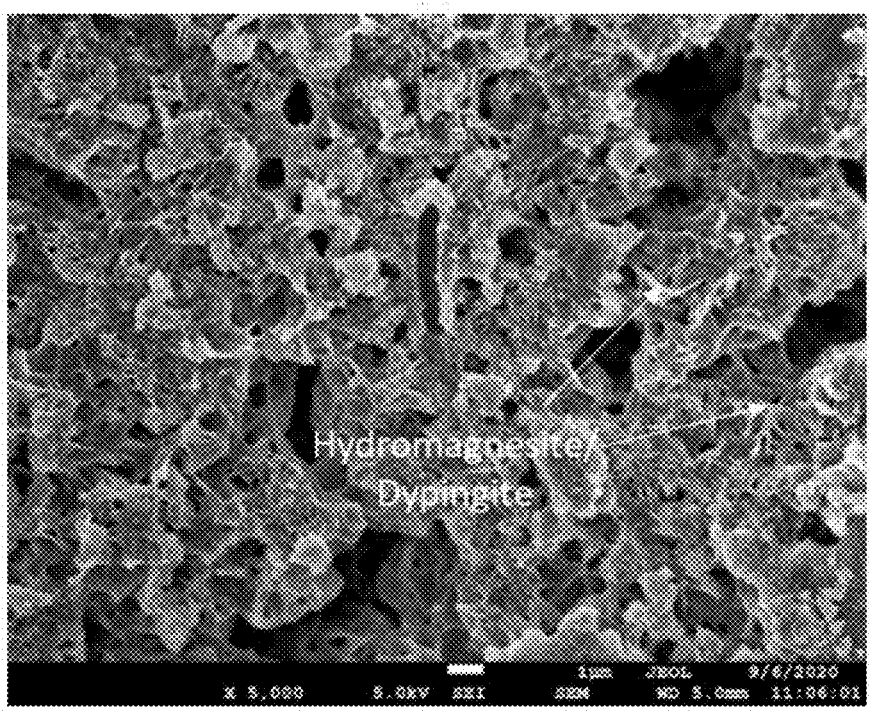
FIG. 32C is a SEM image of sample MCP2 after 2 days of curing under ambient condition. Scale bar denotes 1 μm.
Figure 32D:
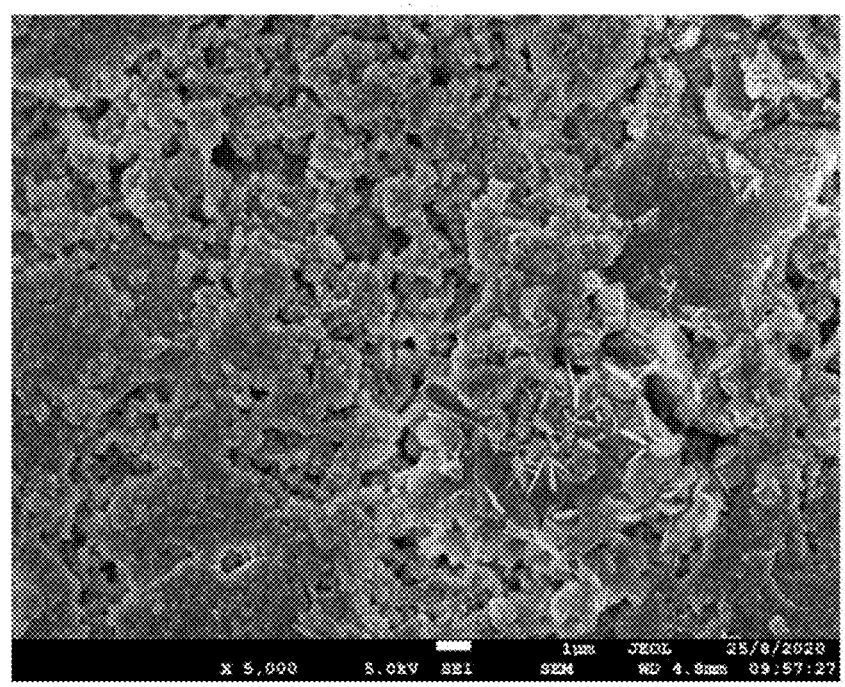
FIG. 32D is a SEM image of sample S after 2 days of curing under ambient condition. Scale bar denotes 1 μm.
Figure 32E:
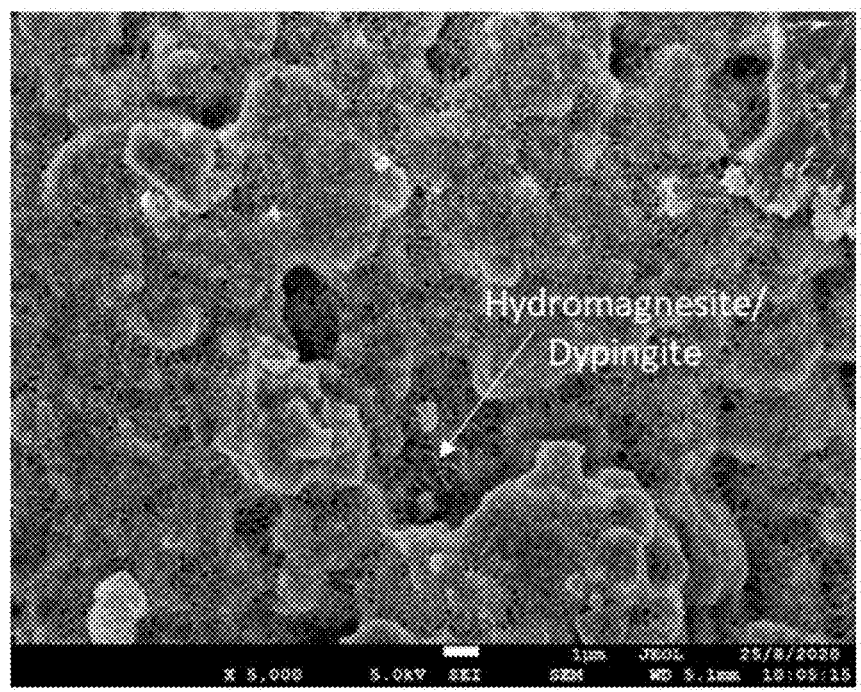
FIG. 32E is a SEM image of sample S.MCP1 after 2 days of curing under ambient condition. Scale bar denotes 1 μm.
Figure 32F:
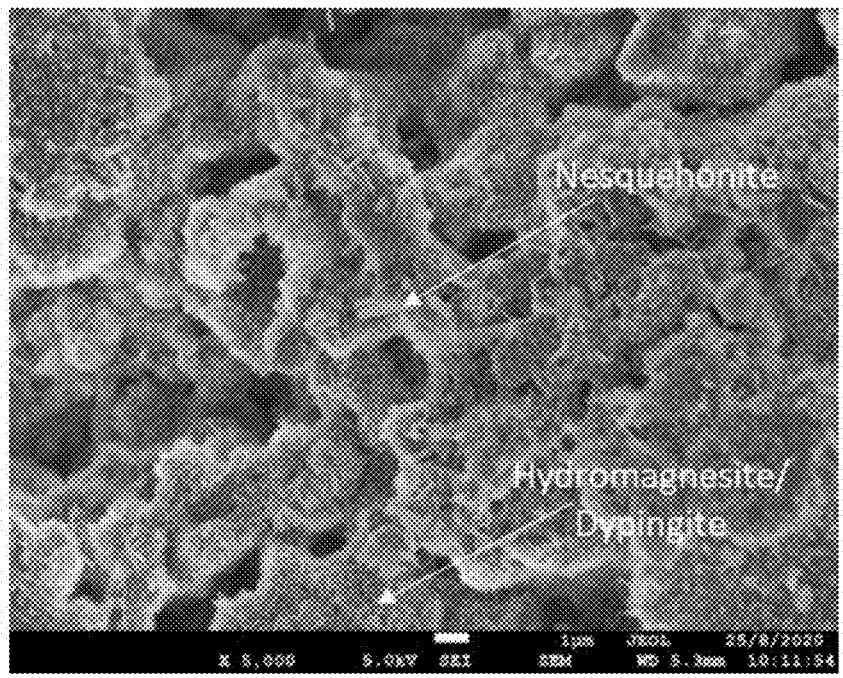
FIG. 32F is a SEM image of sample S.MCP2 after 2 days of curing under ambient condition. Scale bar denotes 1 μm.
Figure 33A:
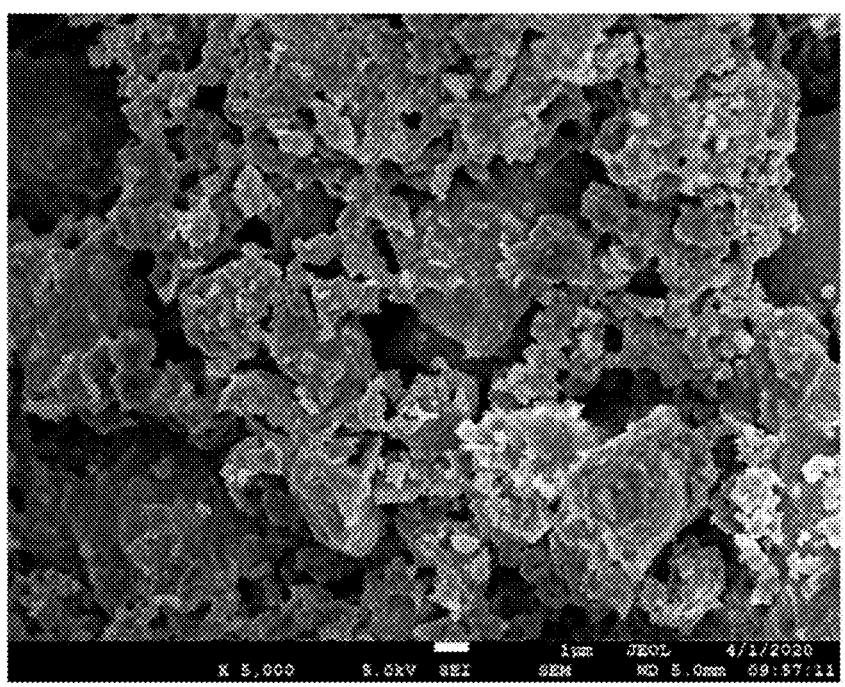
FIG. 33A is a SEM image of the inner sample CS after 2 days of curing under ambient condition, followed by 12 days under accelerated carbonation conditions. Scale bar denotes 1 μm.
Figure 33B:
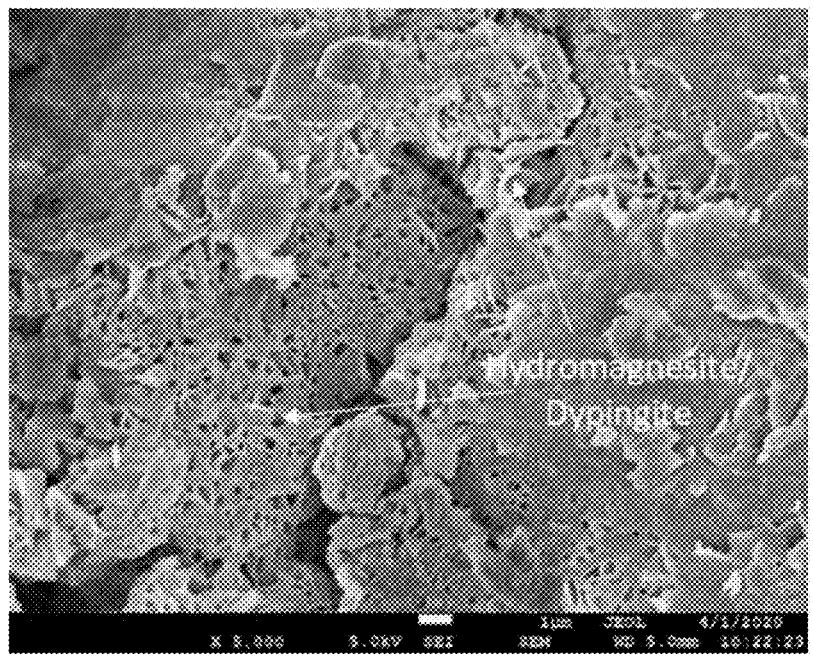
FIG. 33B is a SEM image of the inner sample MCP1 after 2 days of curing under ambient condition, followed by 12 days under accelerated carbonation conditions. Scale bar denotes 1 μm.
Figure 33C:
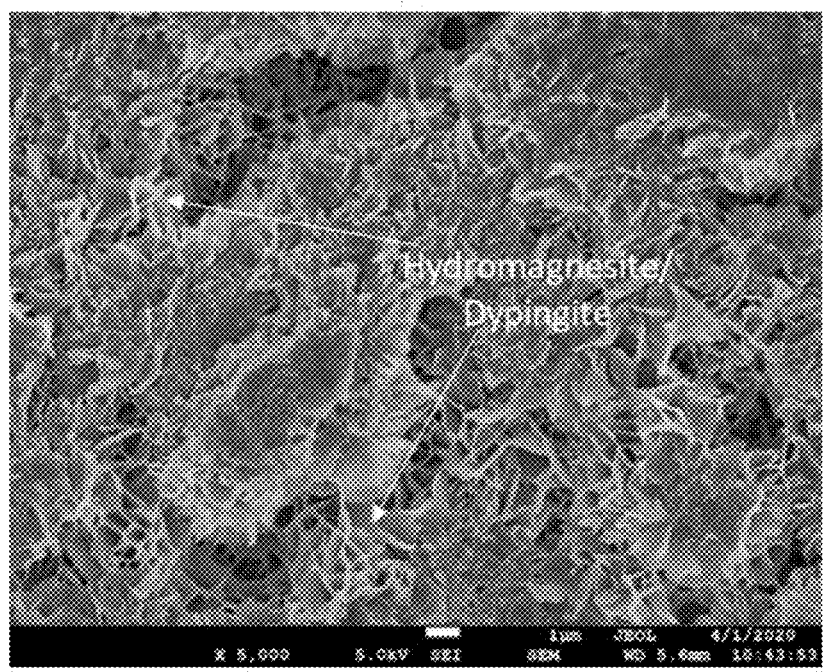
FIG. 33C is a SEM image of the inner sample MCP2 after 2 days of curing under ambient condition, followed by 12 days under accelerated carbonation conditions. Scale bar denotes 1 μm.
Figure 33D:
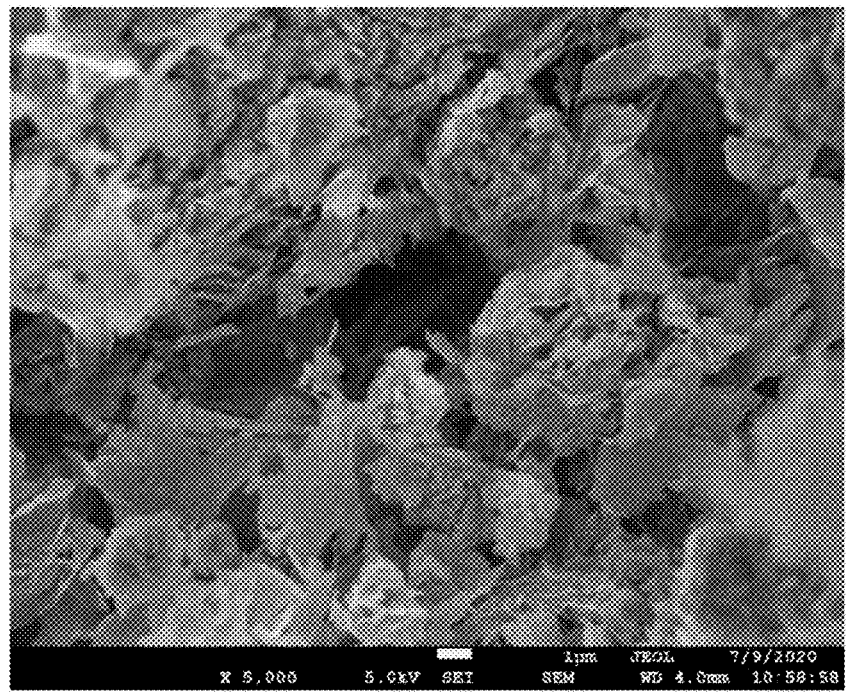
FIG. 33D is a SEM image of the inner sample S after 2 days of curing under ambient condition, followed by 12 days under accelerated carbonation conditions. Scale bar denotes 1 μm.
Figure 33E:
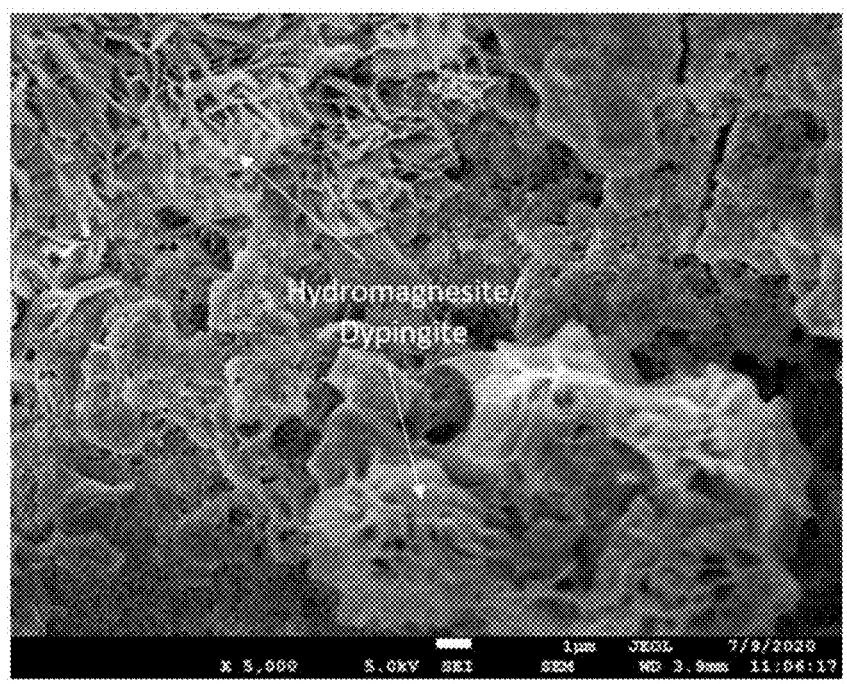
FIG. 33E is a SEM image of the inner sample S.MCP1 after 2 days of curing under ambient condition, followed by 12 days under accelerated carbonation conditions. Scale bar denotes 1 μm.
Figure 33F:
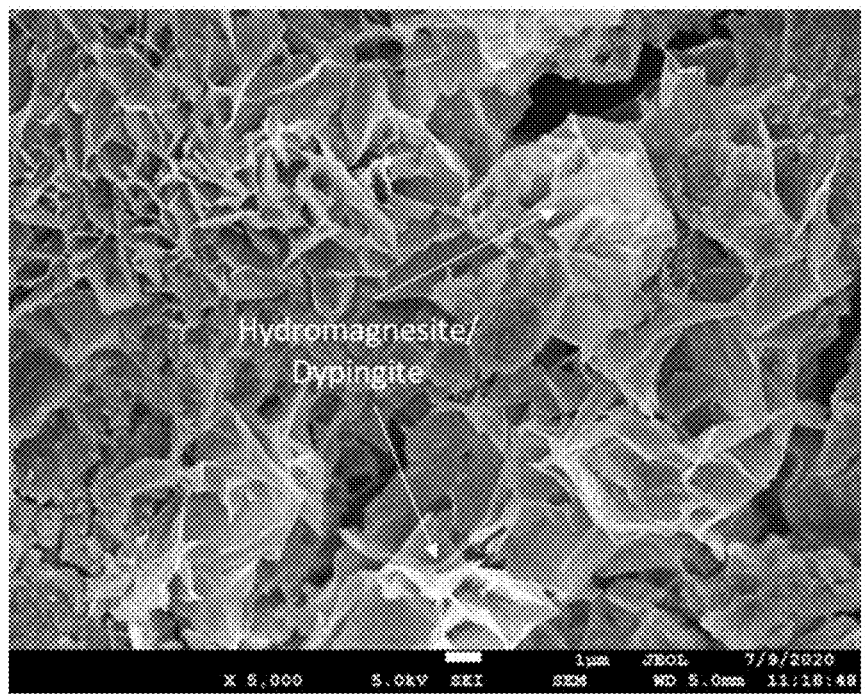
FIG. 33F is a SEM image of the inner sample S.MCP2 after 2 days of curing under ambient condition, followed by 12 days under accelerated carbonation conditions. Scale bar denotes 1 μm.
Figure 34A:
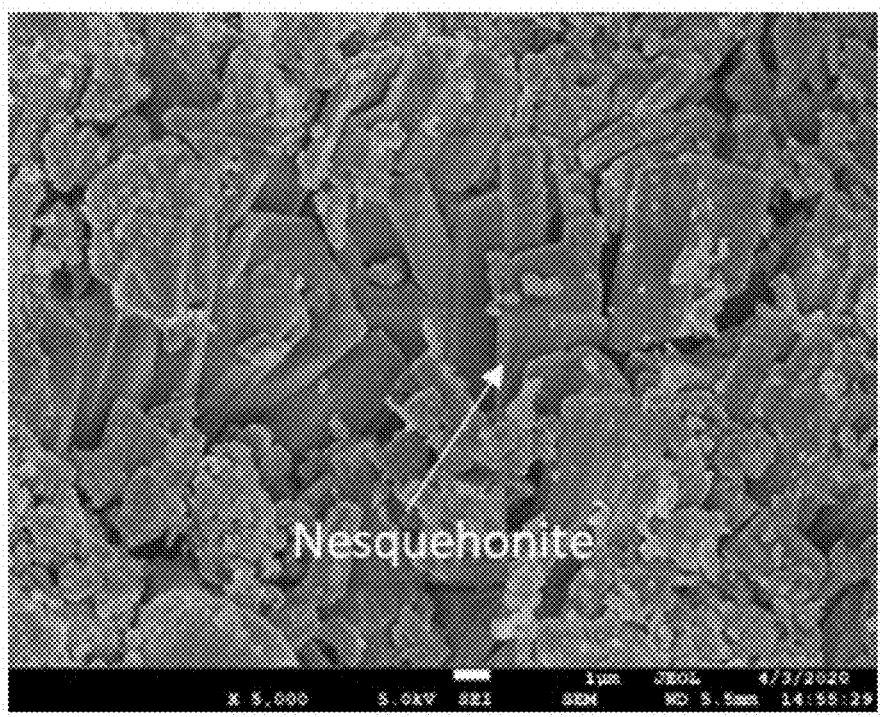
FIG. 34A is a SEM image of the outer sample CS after 2 days of curing under ambient condition, followed by 12 days under accelerated carbonation condition. Scale bar denotes 1 μm.
Figure 34B:
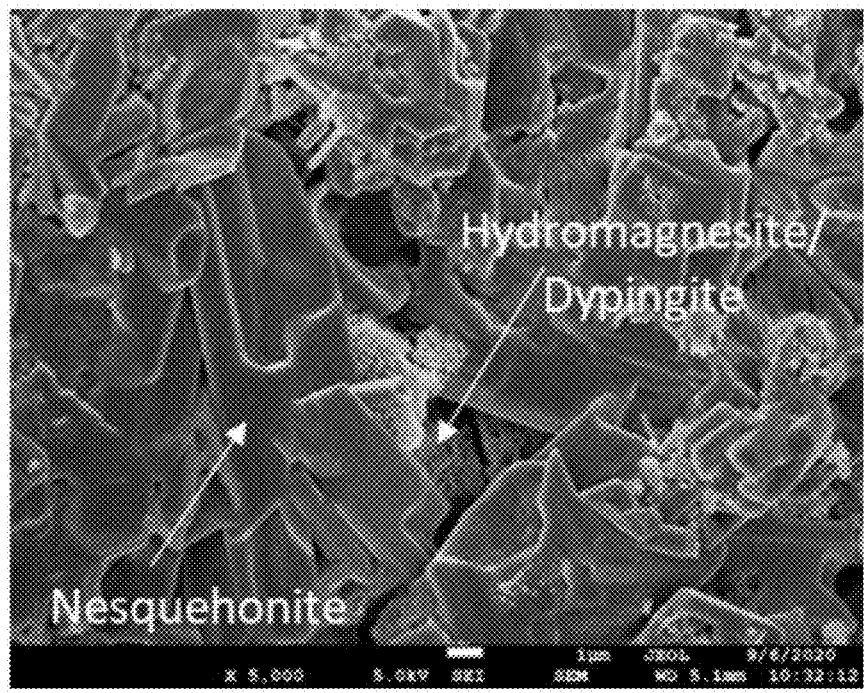
FIG. 34B is a SEM image of the outer sample MCP1 after 2 days of curing under ambient condition, followed by 12 days under accelerated carbonation condition. Scale bar denotes 1 μm.
Figure 34C:
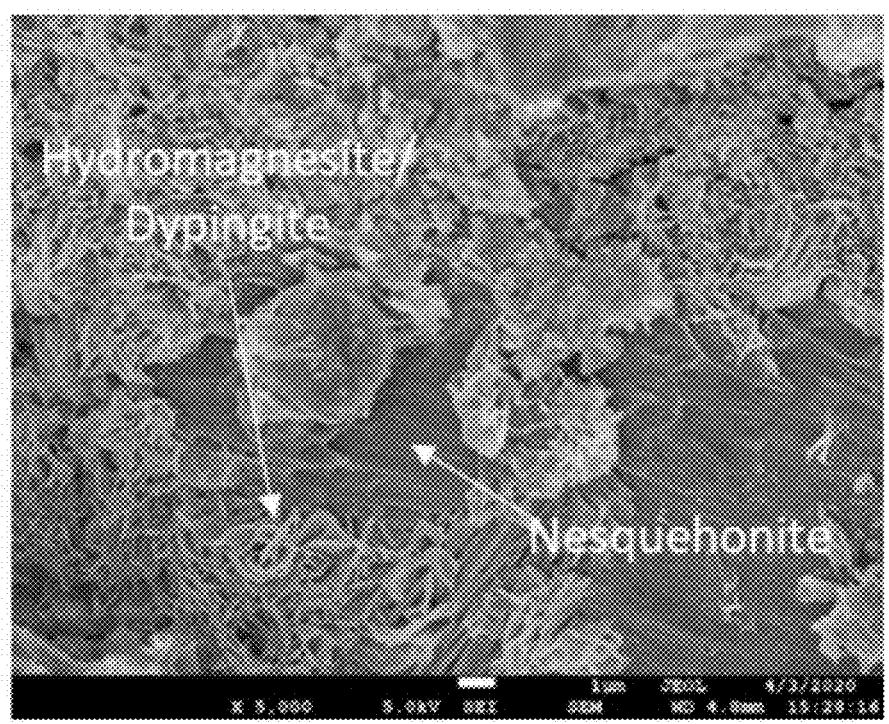
FIG. 34C is a SEM image of the outer sample MCP2 after 2 days of curing under ambient condition, followed by 12 days under accelerated carbonation condition. Scale bar denotes 1 μm.
Figure 34D:
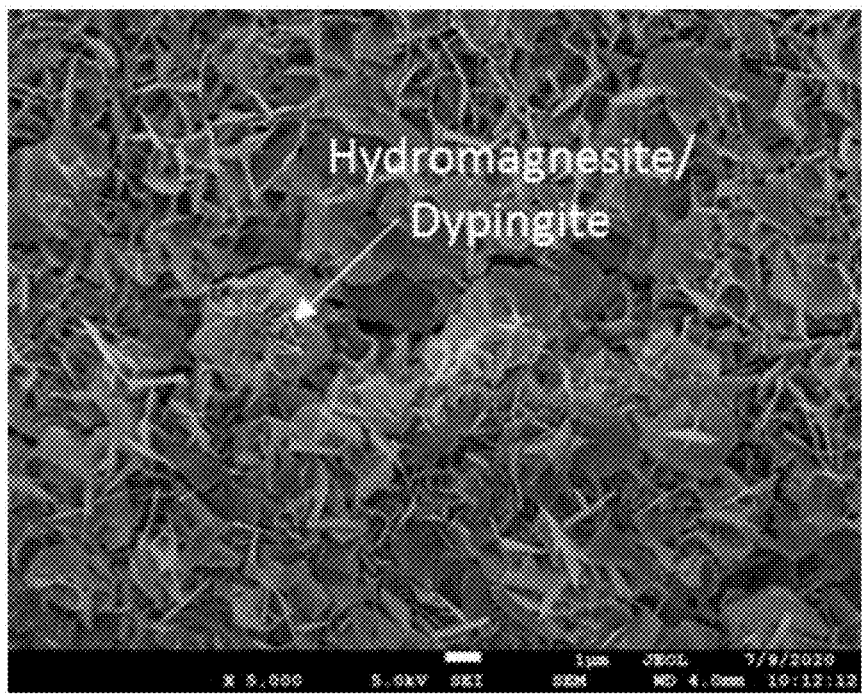
FIG. 34D is a SEM image of the outer sample S after 2 days of curing under ambient condition, followed by 12 days under accelerated carbonation condition. Scale bar denotes 1 μm.
Figure 34E:
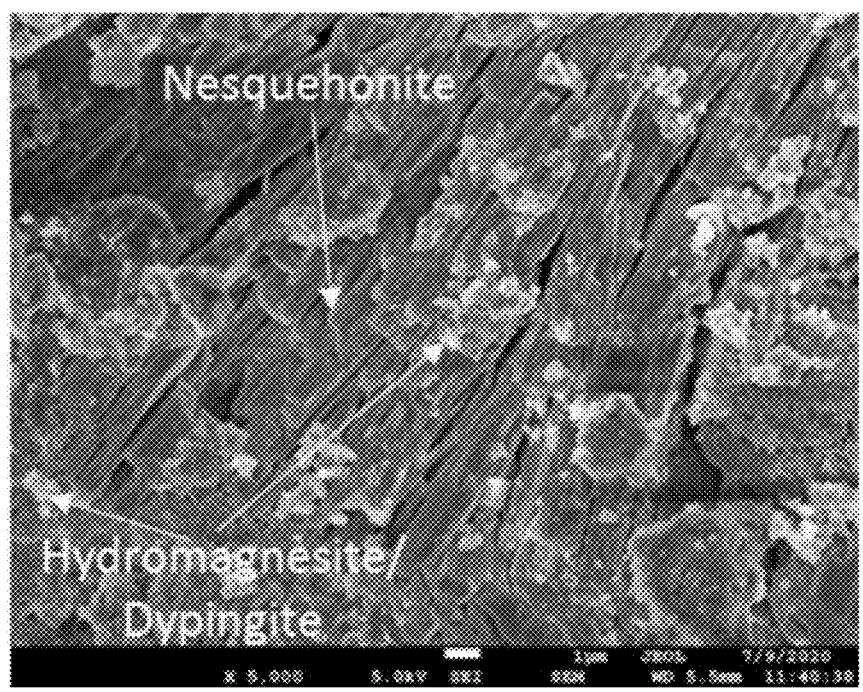
FIG. 34E is a SEM image of the outer sample S.MCP1 after 2 days of curing under ambient condition, followed by 12 days under accelerated carbonation condition. Scale bar denotes 1 μm.
Figure 34F:
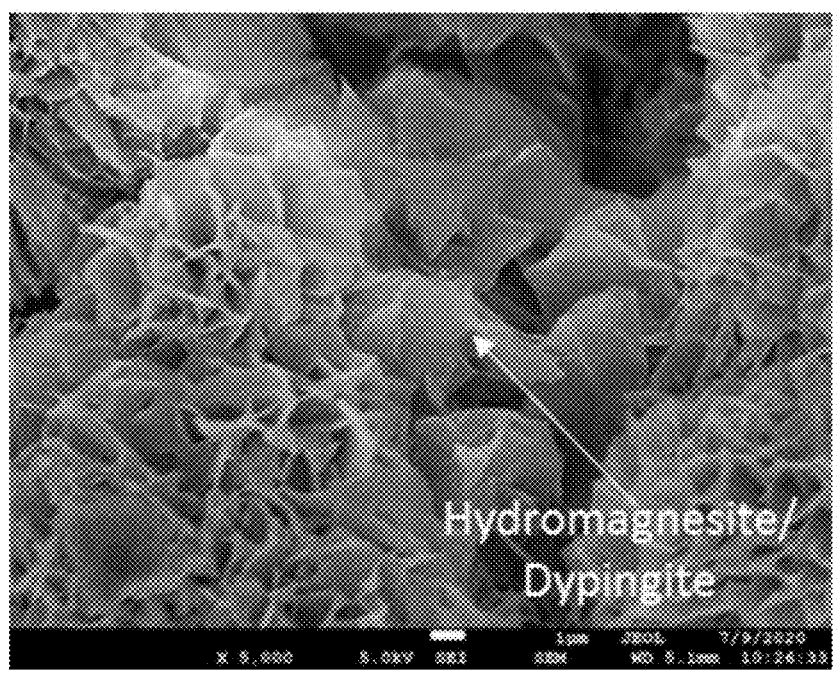
FIG. 34F is a SEM image of the outer sample S.MCP2 after 2 days of curing under ambient condition, followed by 12 days under accelerated carbonation condition. Scale bar denotes 1 μm.

Microstructure and morphology—FIG. 32A to 32F show the microstructures of all samples after 2 days of curing under ambient conditions. While the formation of HMHCs was not observed in the CS (FIG. 32A), the accelerated self-carbonation induced by MCP facilitated the formation of plate-like hydromagnesite/dypingite in samples MCP1 and MCP2 (FIGS. 32B and 32C). The binding properties provided by the formation of these HMHC crystals could have contributed to the strength gain revealed by these samples cured under ambient conditions for 2 days. The inclusion of seeds in S sample led to the formation of hydrate phases and disk-like crystals away from MgO grains (FIG. 32D). The dispersion of these small hydrate crystals could stimulate carbonation, thus enabling an increase in strength during the initial stages and resulting in higher strengths than CS at 7 days (FIG. 31 right image). The simultaneous implementation of MCP and S in samples S.MCP1 and S.MCP2 resulted in smaller hydromagnesite/dypingite crystals (FIGS. 32E and 32F) when compared to those crystals observed in samples MCP1 and MCP2. The larger sizes of HMHCs could have played a role in the higher 2-day strengths of the latter group. Along with plate-like hydromagnesite/dypingite crystals, the formation of needle-like nesquehosnite was observed in sample S.MCP2, albeit at a smaller scale. FIGS. 33A to 33F and 34A to 34F present the microstructures of the inner (i.e. obtained 432 from the sample core) and outer (i.e. obtained from the sample exterior) sections of all samples at 14 days, respectively. The inhibition of $CO_2$ diffusion towards the sample core restrained the formation of HMHCs and led to a porous microstructure in the core of CS (FIG. 33A). Despite the limited $CO_2$ diffusion, the provision of $CO_3^{2-}$ ion released via MCP enabled the formation of hydromagnesite/dypingite in the inner sections of samples MCP1 and MCP2 (FIGS. 33B and 33C). These HMHCs presented a high cohesion and binding, thereby densifying the microstructure of the cores of MCP1 and MCP2 samples in comparison to CS. These improvements in sample microstructure could explain the higher densities and compressive strengths, and lower water absorption values of these samples than CS. Similarly, the inner sections of samples S.MCP1 and S.MCP2 revealed the widespread formation of HMHCs (FIGS. 33E and 33F), leading to denser microstructures than sample S (FIG. 33D). When compared with the sole use of MCP (FIGS. 33B and 33C), the simultaneous inclusion of S and MCP led to the formation of hydromagnesite/dypingite clusters composed of larger crystals in the cores of samples S.MCP1 and S.MCP2 (FIGS. 33E and 33F), which could have played a role in the improved performance of S.MCP1 and S.MCP2. An investigation of the microstructure at the outer sections of all samples revealed the extensive formation of HMHCs (FIG. 34A to 34F). In spite of the formation of nesquehonite, the obvious presence of unhydrated MgO and uncarbonated brucite was still observed at the exterior of CS (FIG. 34A). The use of MCP resulted in the widespread formation of nesquehonite surrounded by hydromagnesite/dypingite at the exterior sections samples MCP1 and MCP2 (FIGS. 34B and 34C). The inclusion of seeds led to the formation of hydromagnesite/dypingite at the exterior of S sample (FIG. 34D). Alternatively, the simultaneous inclusion of S and MCP resulted in a significant improvement in the morphology of hydromagnesite/dypingite crystals observed in S.MCP2 sample (FIG. 34F) when compared with S sample (FIG. 34D). Differing from all samples, S.MCP1 sample (FIG. 34E) revealed the formation of dense walls composed of nesquehonite needles that seemed to originate around hydromagnesite/dypingite crystals. This unique microstructure that seemed to be dominated by nesquehonite rather than other HMHCs could explain the significantly higher strengths of S.MCP1 than all other samples prepared in this example. This improvement in the morphology of S.MCP1 could be attributed to the higher carbonation degree obtained in the presence of the simultaneous inclusion of S and MCP.

Figure 35:
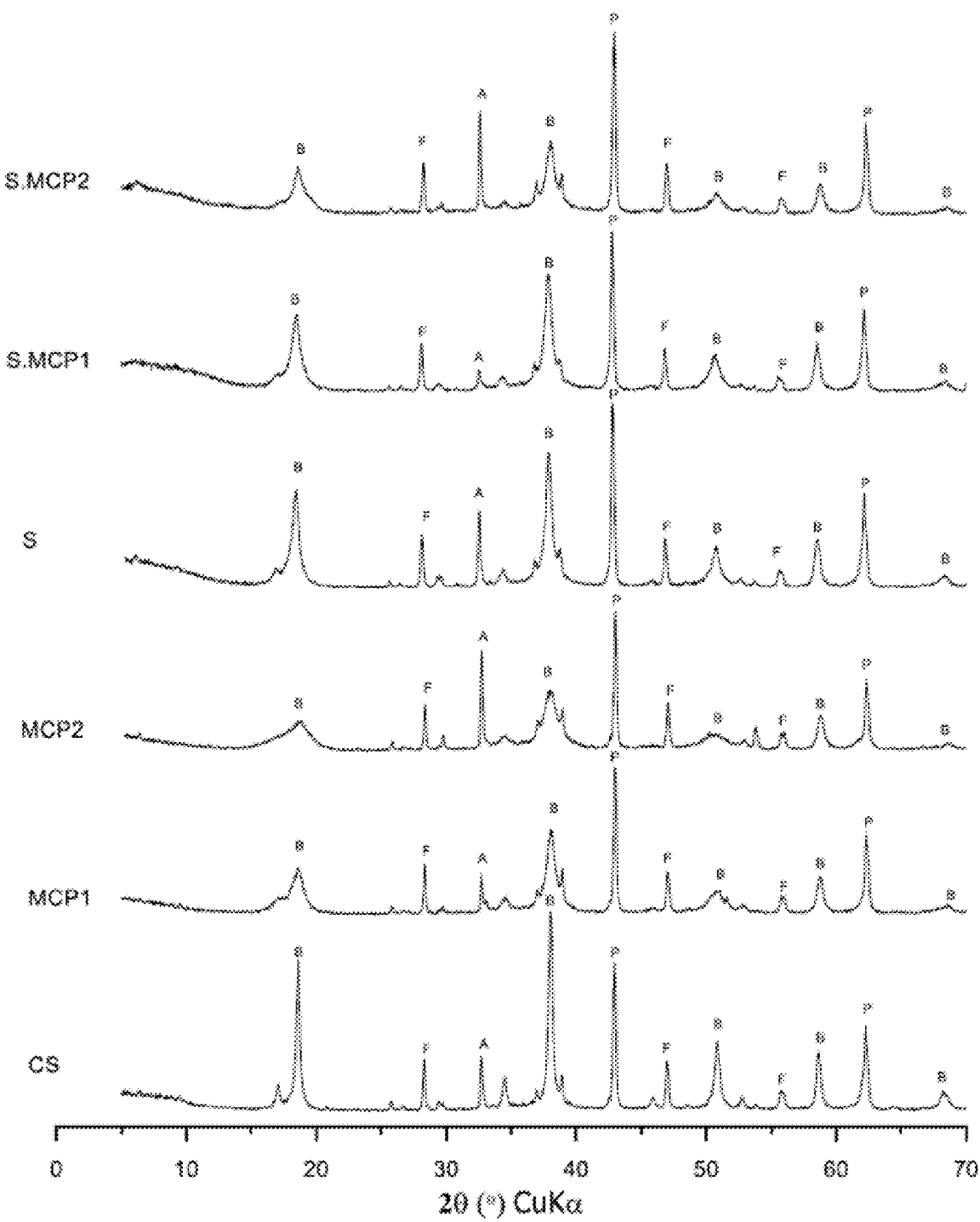
FIG. 35 shows XRD patterns of samples after 2 days of curing under ambient conditions. A denotes for artinite, B denotes for brucite, P denotes for periclase, and F denotes for fluorite.
Figure 36:
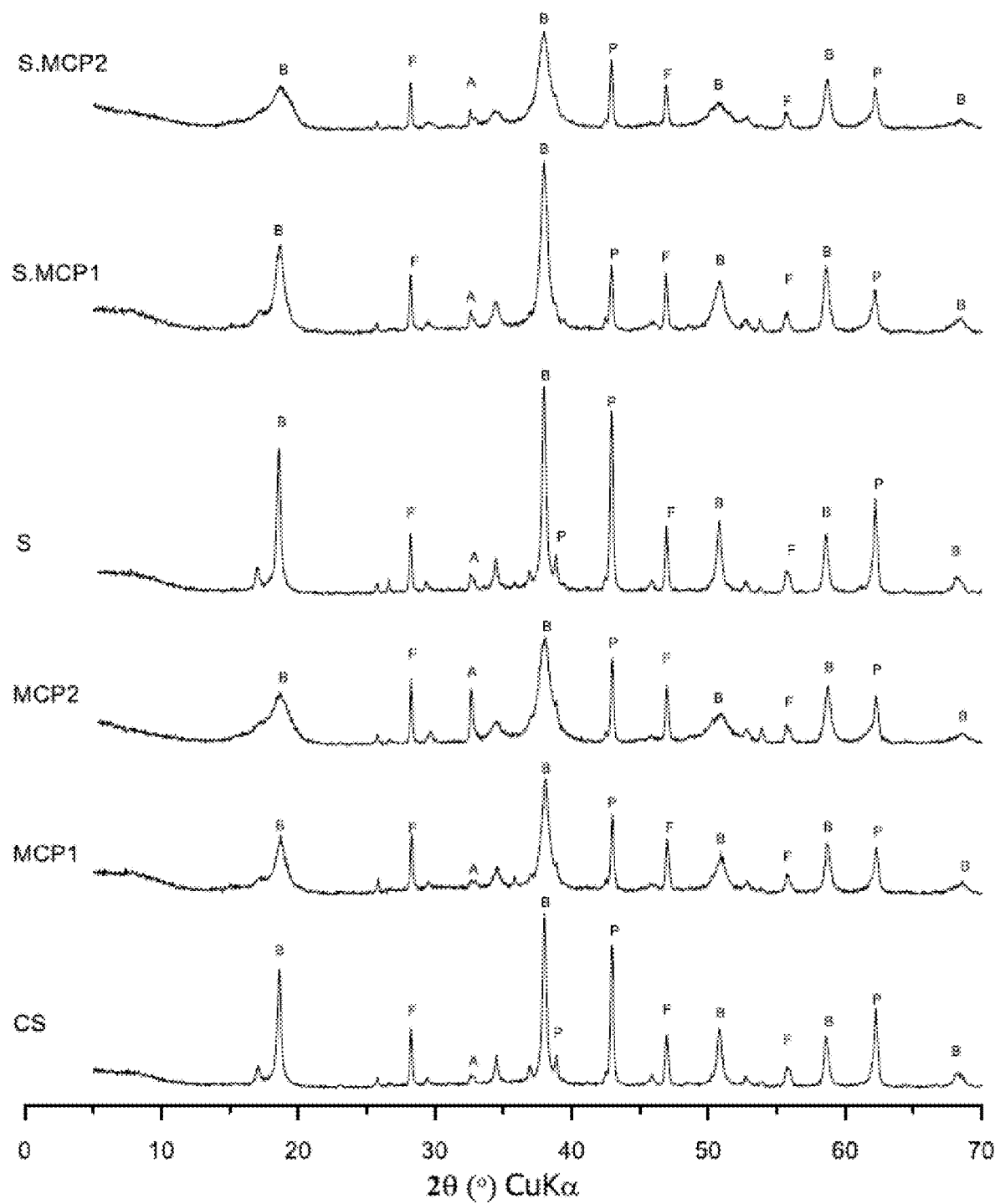
FIG. 36 shows XRD patterns of the inner samples after 2 days of curing under ambient conditions, followed by 12 days under accelerated carbonation conditions. A denotes for artinite, B denotes for brucite, P denotes for periclase, and F denotes for fluorite.
Figure 37:
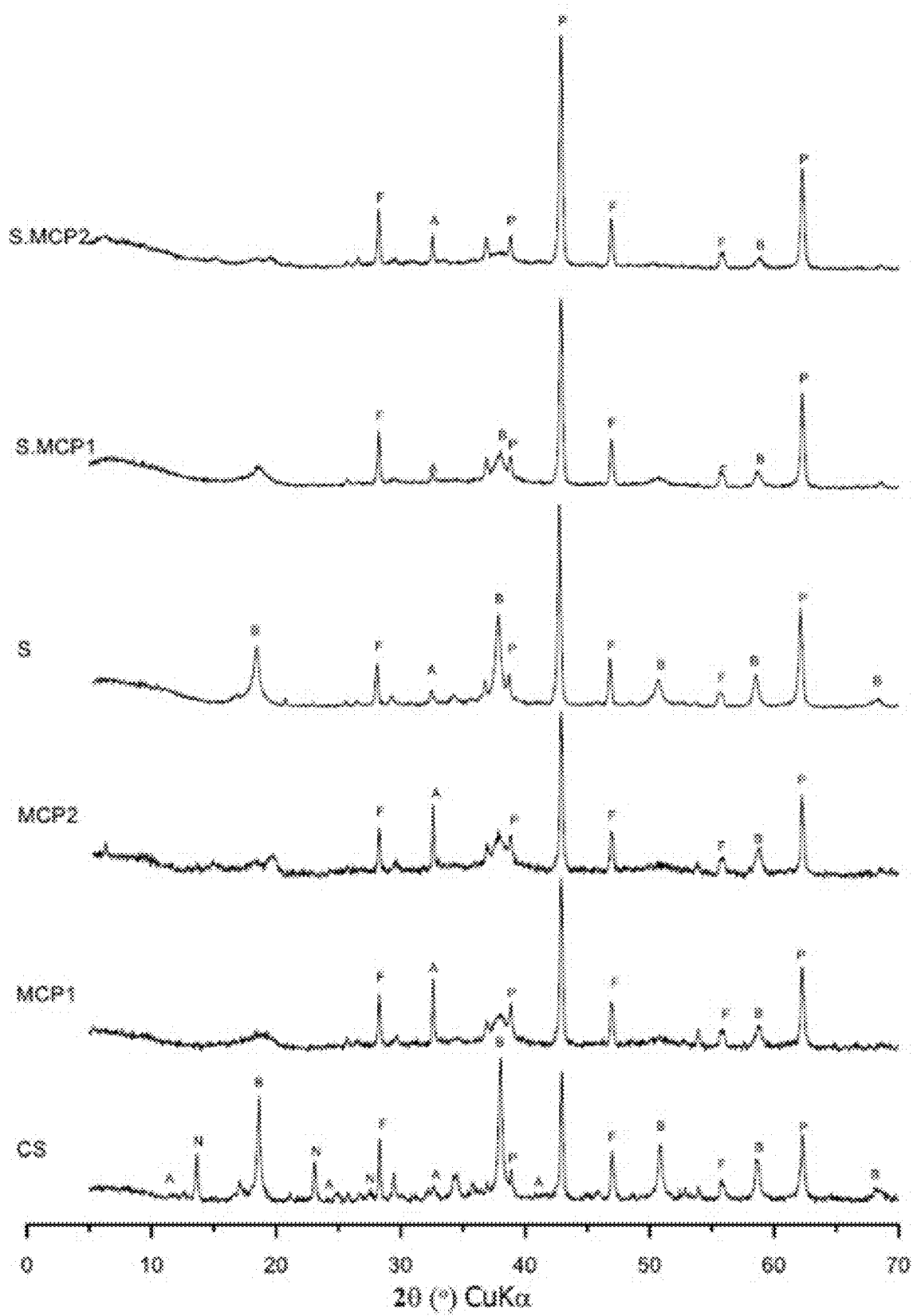
FIG. 37 shows XRD patterns of the outer samples after 2 days of curing under ambient conditions, followed by 12 days under accelerated carbonation conditions. A denotes for artinite, B denotes for brucite, N denotes for nesquehonite, P denotes for periclase, and F denotes for fluorite.
Figure 38A:
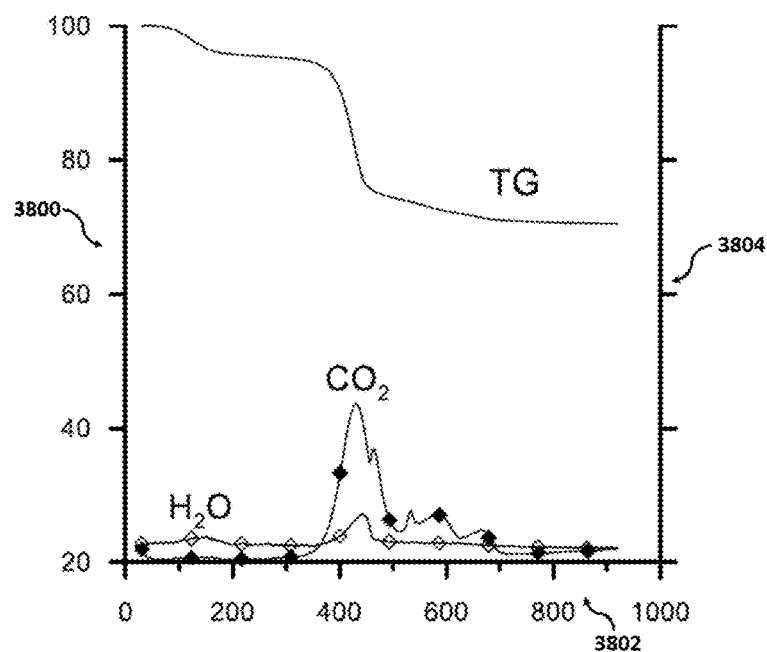
FIG. 38A shows TG-IR results of the inner sample CS after 2 days of curing under ambient condition, followed by 12 days under accelerated carbonation conditions. 3800, 3802, 3804 denote for heat loss (wt %), temperature (° C.), absorbance (a.u.), respectively.
Figure 38B:
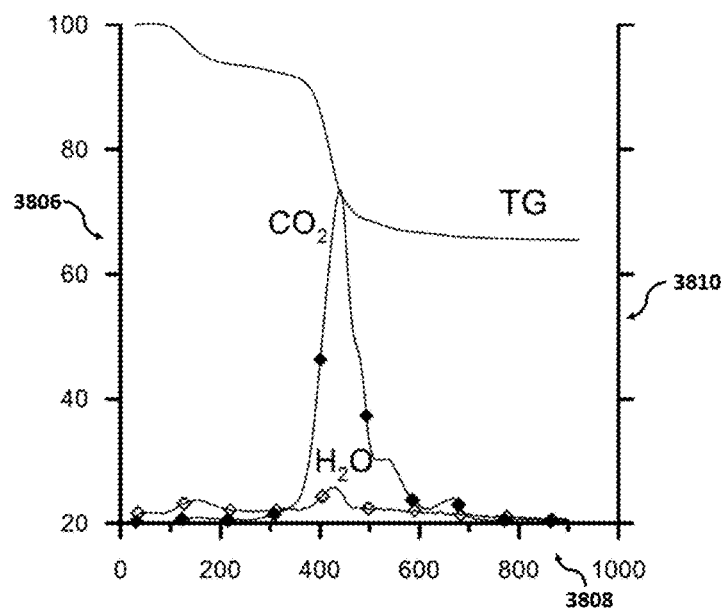
FIG. 38B shows TG-IR results of the inner sample MCP1 after 2 days of curing under ambient condition, followed by 12 days under accelerated carbonation conditions. 3806, 3808, 3810 denote for heat loss (wt %), temperature (° C.), absorbance (a.u.), respectively.
Figure 38C:
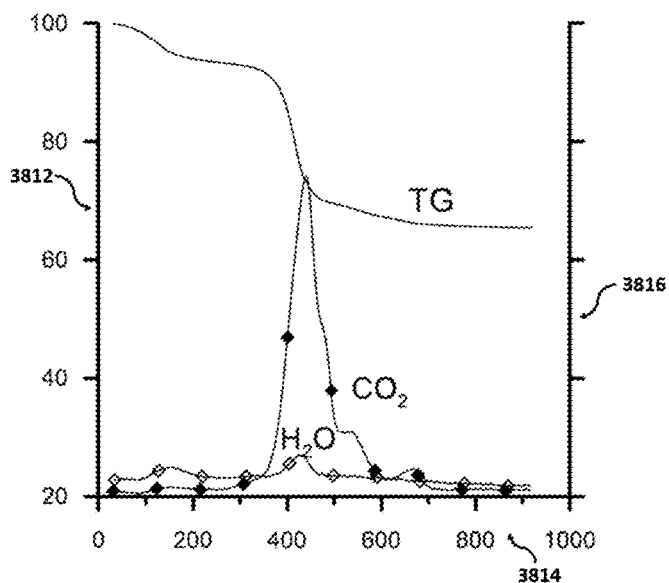
FIG. 38C shows TG-IR results of the inner sample MCP2 after 2 days of curing under ambient condition, followed by 12 days under accelerated carbonation conditions. 3812, 3814, 3816 denote for heat loss (wt %), temperature (° C.), absorbance (a.u.), respectively.
Figure 38D:
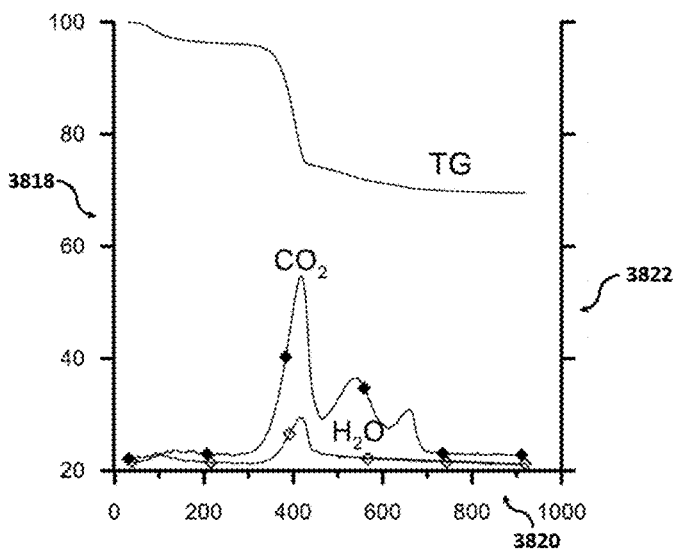
FIG. 38D shows TG-IR results of the inner sample S after 2 days of curing under ambient condition, followed by 12 days under accelerated carbonation conditions. 3818, 3820, 3822 denote for heat loss (wt %), temperature (° C.), absorbance (a.u.), respectively.
Figure 38E:
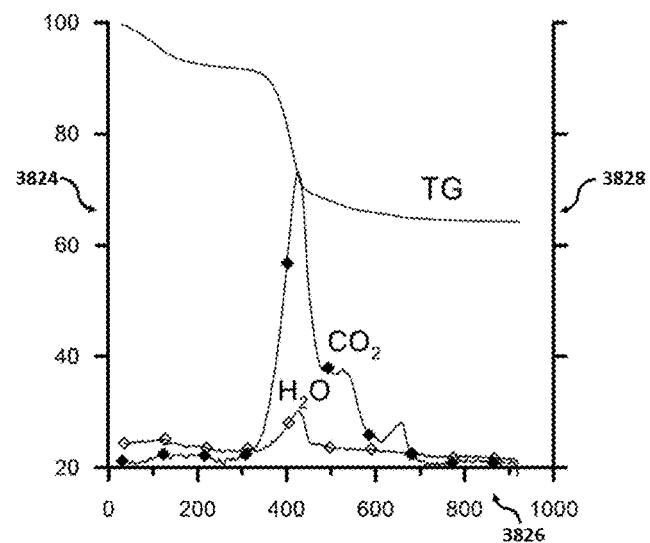
FIG. 38E shows TG-IR results of the inner sample S.MCP1 after 2 days of curing under ambient condition, followed by 12 days under accelerated carbonation conditions. 3824, 3826, 3828 denote for heat loss (wt %), temperature (° C.), absorbance (a.u.), respectively.
Figure 38F:
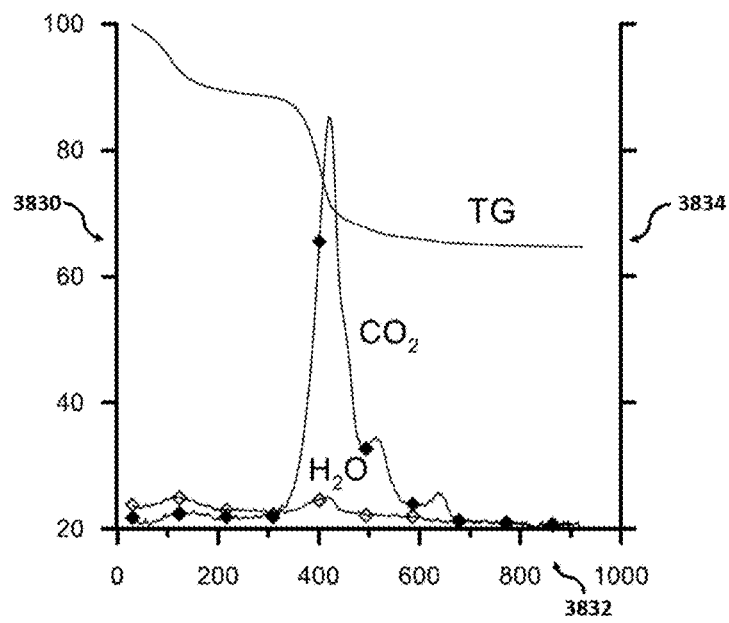
FIG. 38F shows TG-IR results of the inner sample S.MCP2 after 2 days of curing under ambient condition, followed by 12 days under accelerated carbonation conditions. 3830, 3832, 3834 denote for heat loss (wt %), temperature (° C.), absorbance (a.u.), respectively.
Figure 39A:
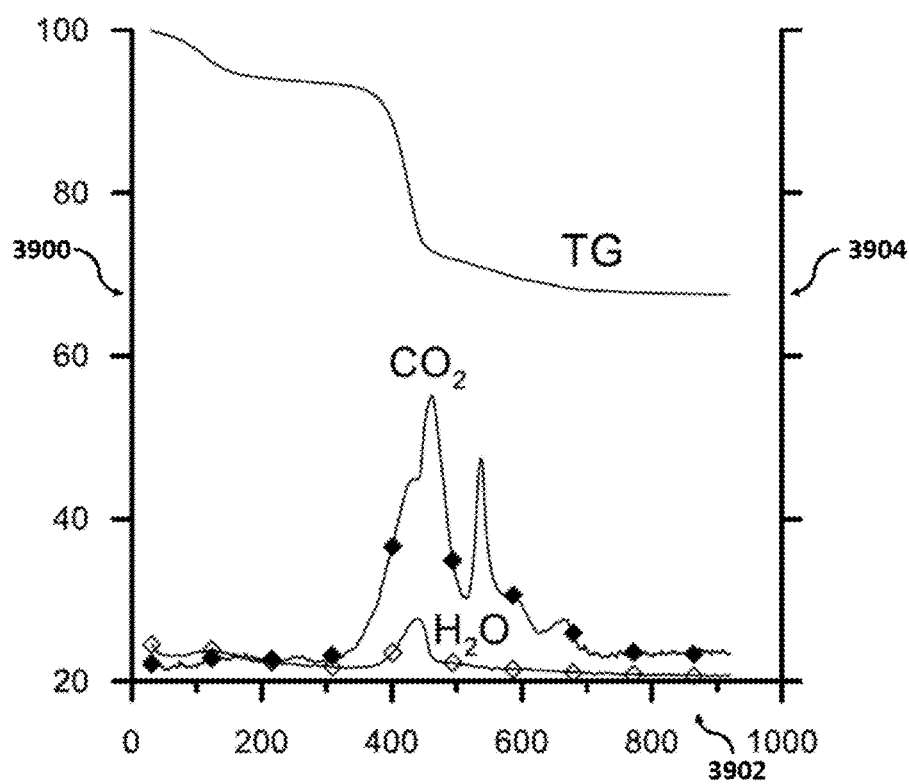
FIG. 39A shows TG-IR results of the outer sample CS after 2 days of curing under ambient condition, followed by 12 days under accelerated carbonation conditions. 3900, 3902, 3904 denote for heat loss (wt %), temperature (° C.), absorbance (a.u.), respectively.
Figure 39B:
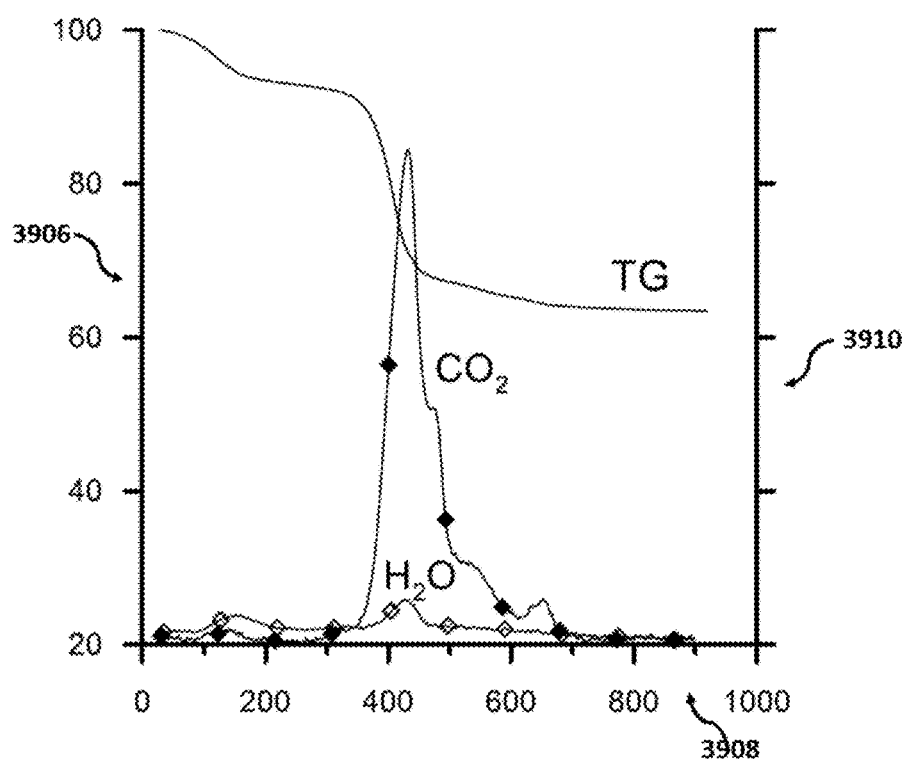
FIG. 39B shows TG-IR results of the outer sample MCP1 after 2 days of curing under ambient condition, followed by 12 days under accelerated carbonation conditions. 3906, 3908, 3910 denote for heat loss (wt %), temperature (° C.), absorbance (a.u.), respectively.
Figure 39C:
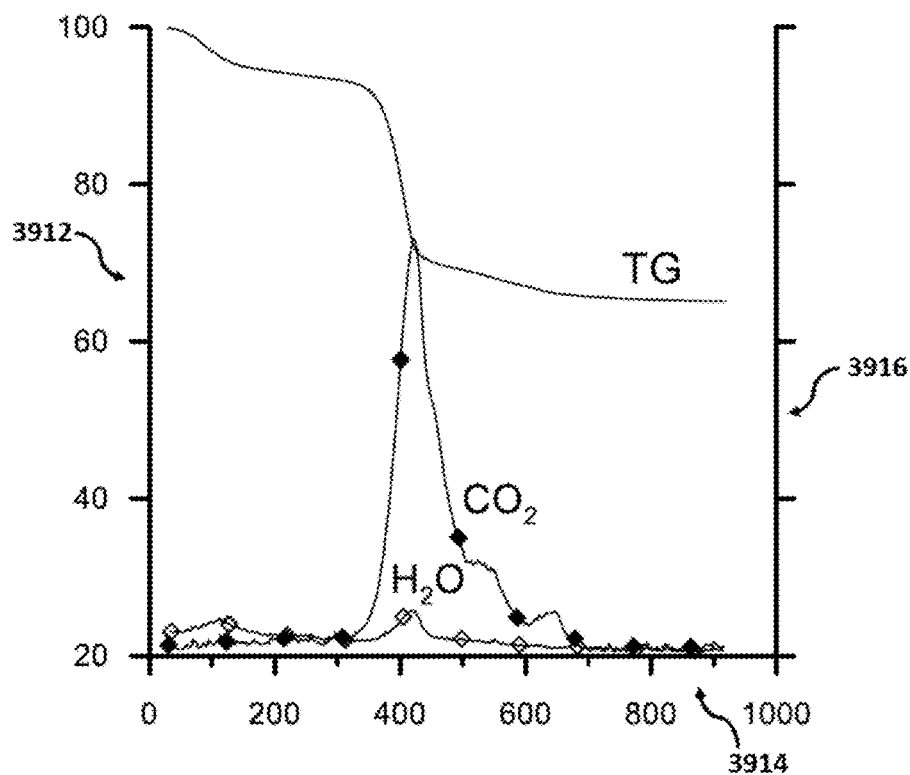
FIG. 39C shows TG-IR results of the outer sample MCP2 after 2 days of curing under ambient condition, followed by 12 days under accelerated carbonation conditions. 3912, 3914, 3916 denote for heat loss (wt %), temperature (° C.), absorbance (a.u.), respectively.
Figure 39D:
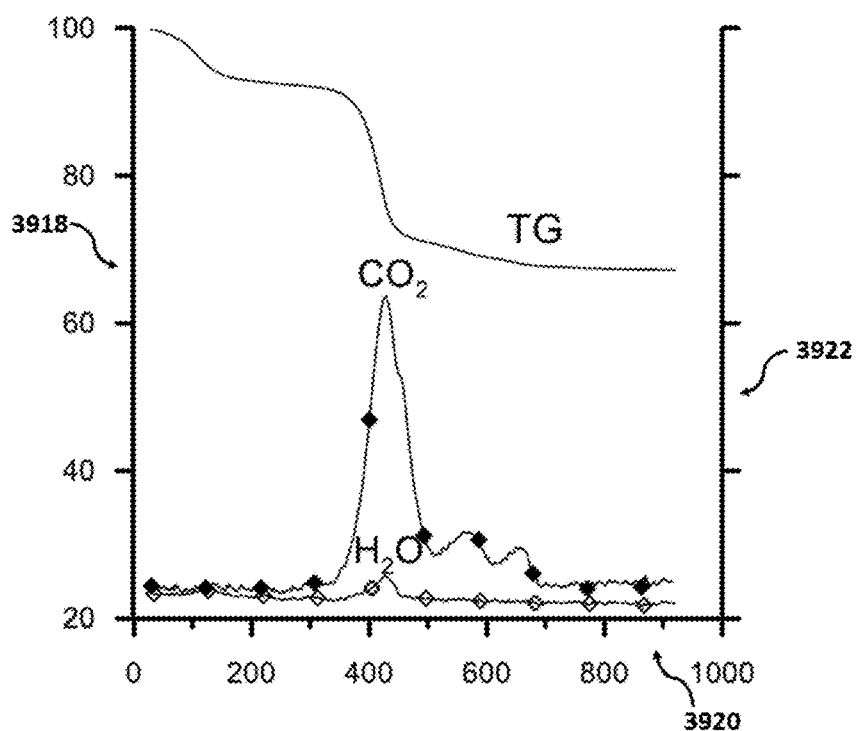
FIG. 39D shows TG-IR results of the outer sample S after 2 days of curing under ambient condition, followed by 12 days under accelerated carbonation conditions. 3918, 3920, 3922 denote for heat loss (wt %), temperature (° C.), absorbance (a.u.), respectively.
Figure 39E:
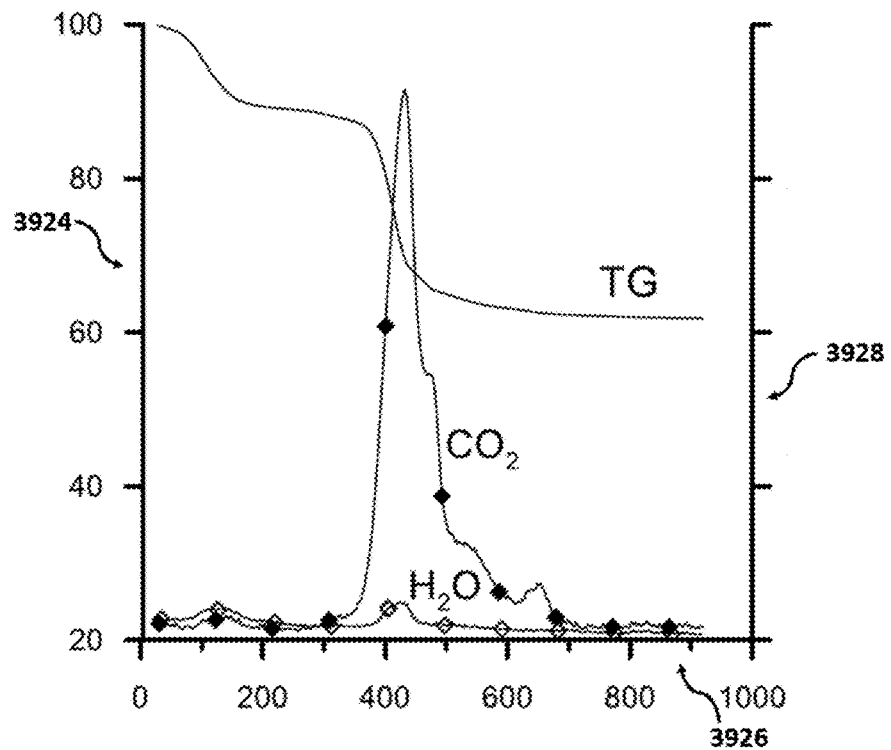
FIG. 39E shows TG-IR results of the outer sample S.MCP1 after 2 days of curing under ambient condition, followed by 12 days under accelerated carbonation conditions. 3924, 3926, 3928 denote for heat loss (wt %), temperature (° C.), absorbance (a.u.), respectively.
Figure 39F:
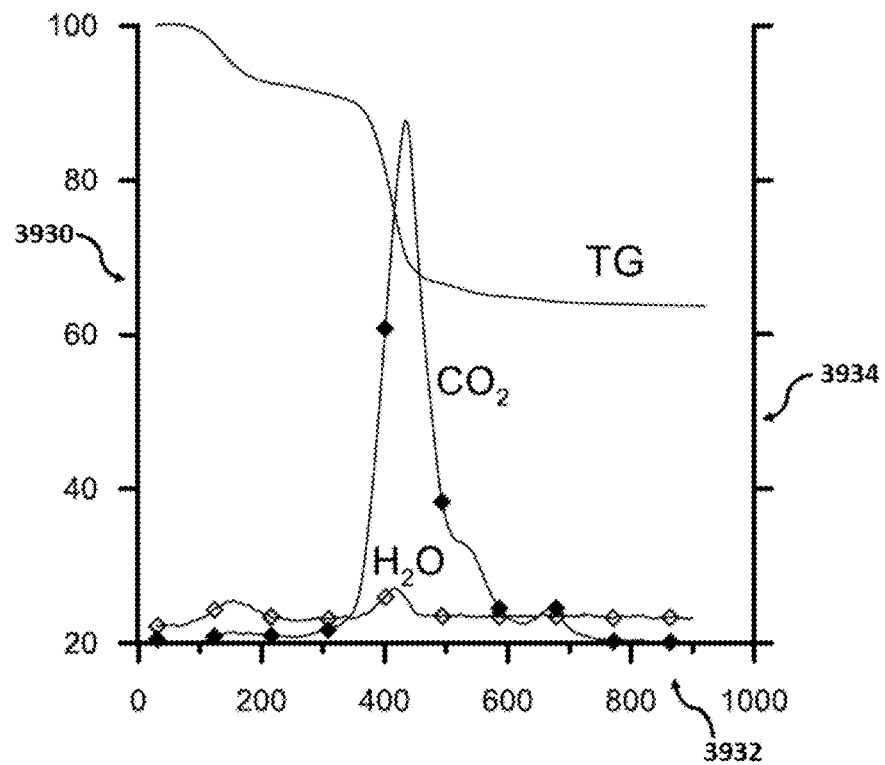
FIG. 39F shows TG-IR results of the outer sample S.MCP2 after 2 days of curing under ambient condition, followed by 12 days under accelerated carbonation conditions. 3930, 3932, 3934 denote for heat loss (wt %), temperature (° C.), absorbance (a.u.), respectively.
Figure 40A:
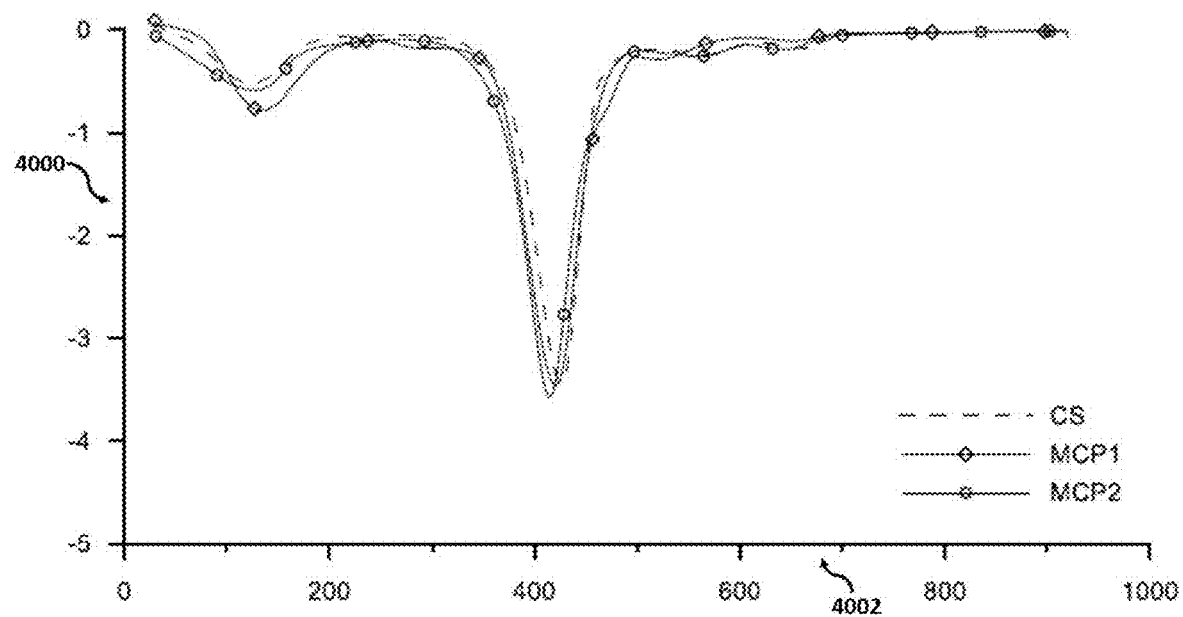
FIG. 40A shows DTG results of inner samples without S after 2 days of curing under ambient conditions, followed by 12 days under accelerated carbonation conditions. 4000 and 4002 denote for DTG (%/min) and temperature (° C.), respectively.
Figure 40B:
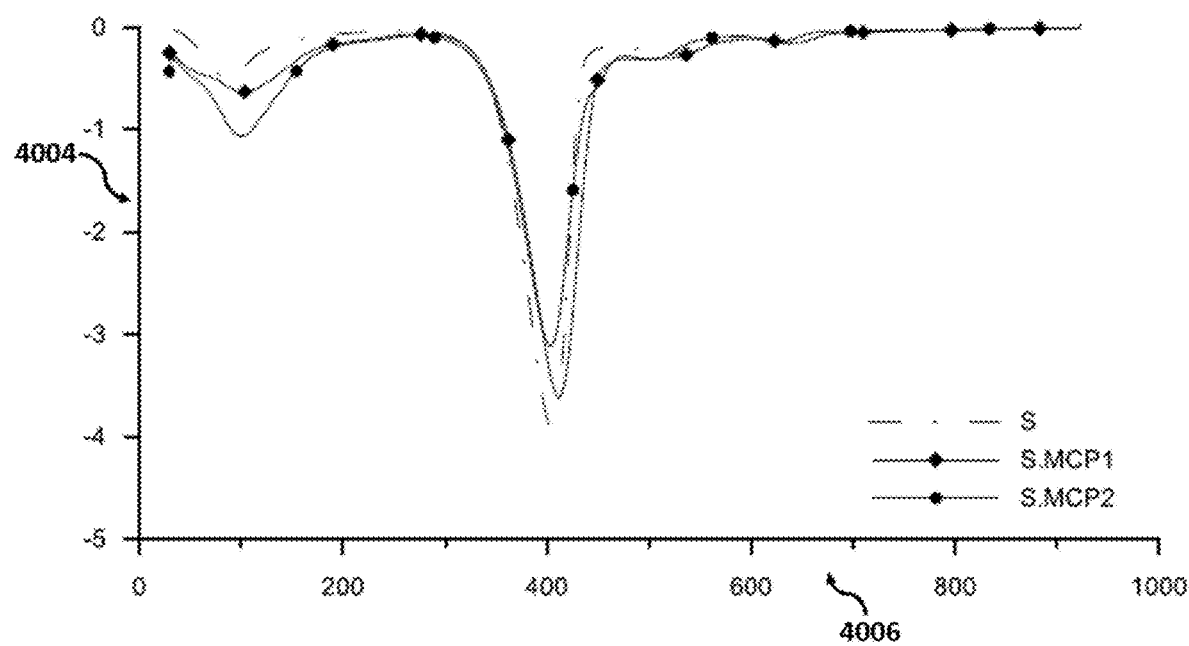
FIG. 40B shows DTG results of inner samples with S after 2 days of curing under ambient conditions, followed by 12 days under accelerated carbonation conditions. 4004 and 4006 denote for DTG (%/min) and temperature (° C.), respectively.
Figure 41A:
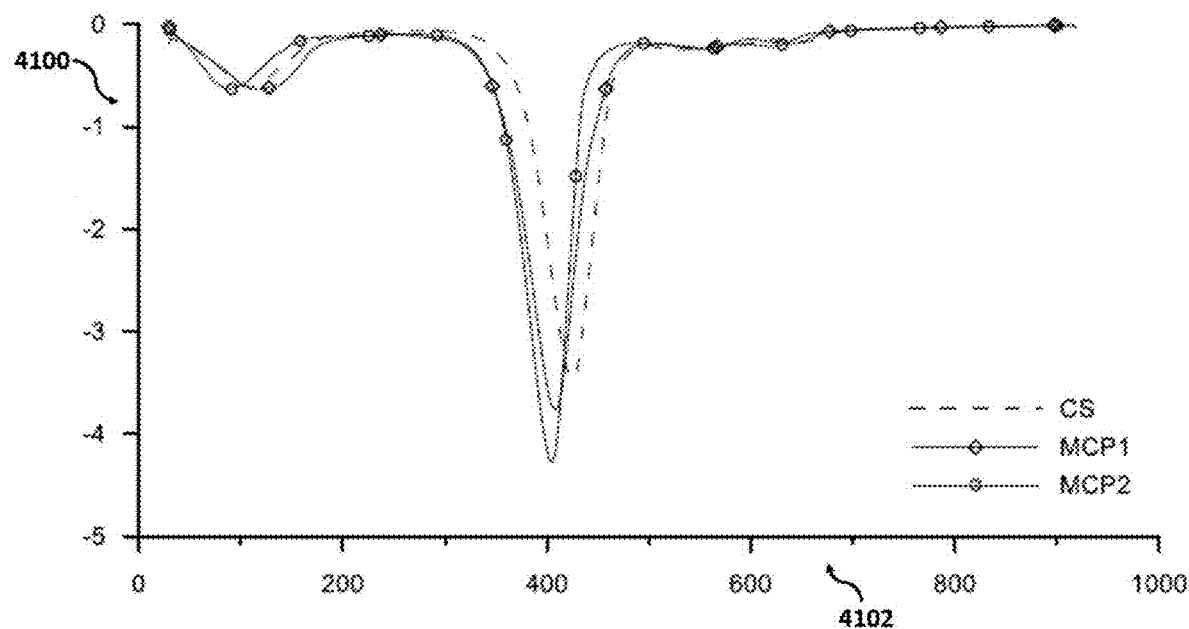
FIG. 41A shows DTG results of outer samples without S after 2 days of curing under ambient conditions, followed by 12 days under accelerated carbonation conditions. 4100 and 4102 denote for DTG (%/min) and temperature (° C.), respectively.
Figure 41B:
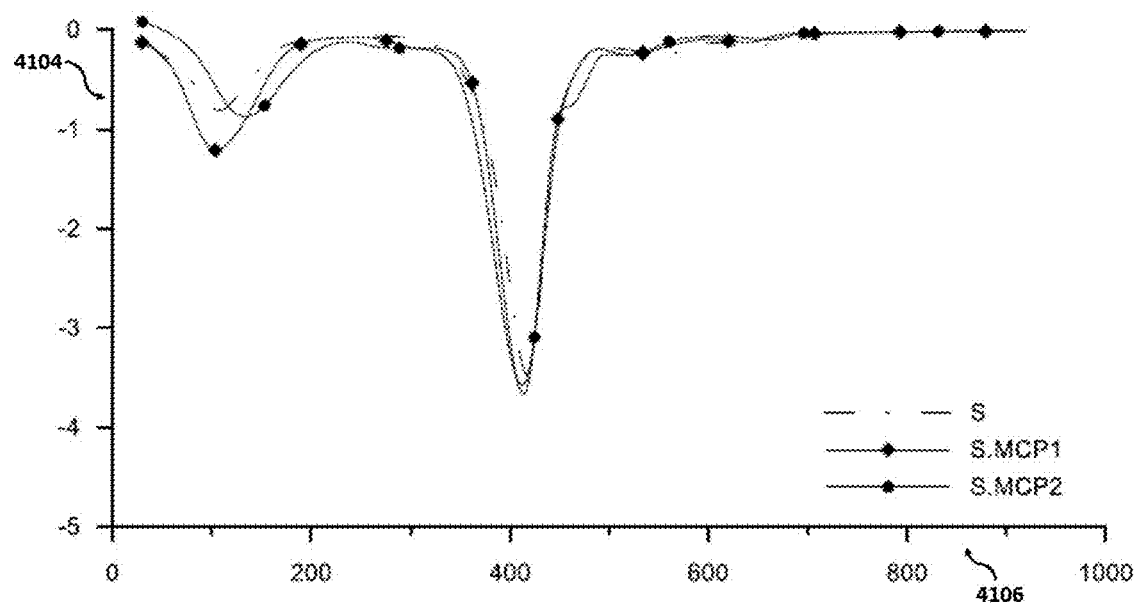
FIG. 41B shows DTG results of outer samples with S after 2 days of curing under ambient conditions, followed by 12 days under accelerated carbonation conditions. 4104 and 4106 denote for DTG (%/min) and temperature (° C.), respectively.

XRD—FIG. 35 presents the XRD patterns of all samples after 2 days of curing under ambient conditions. The internal standard (Fluorite ($CaF_2$), main peak at ~28.3° 2θ) was used for the semi-quantification of hydration and carbonation phases. Unhydrated periclase (MgO, main peak at ~42.9° 2θ) and brucite ($Mg(OH)_2$, main peak at ~38.1° 2θ) were seen in all samples. Despite their similar peak intensities of residual periclase, a comparison of brucite intensities based on the intensity of the internal standard within samples CS, MCP1 and MCP2 revealed lower intensities of brucite in both MCP samples than CS. The lower brucite contents of MCP1 and MCP2 than CS could be attributed to the use of brucite in the carbonation reaction to form HMHCs. Furthermore, the use of MCP led to obviously broader peaks of brucite in samples MCP1 and MCP2 than CS, indicating brucite with a smaller mean crystallite size (i.e. poor crystallinity) within MCP samples. Alternatively, the use of S enhanced the crystallinity of brucite within samples S, S.MCP1 and S.MCP2 when compared with the corresponding samples CS, MCP1 and MCP2, respectively. Similar to the trend observed in the samples that did not contain any seeds, samples S.MCP1 and S.MCP2 revealed lower contents and poorly crystalline brucite in comparison to sample S. The variation in the intensity of the peak at ~32.8° 2θ in all samples, which was assigned to the uncalcined magnesite present in RMC, was attributed to the formation of HMHCs (e.g. artinite, $MgCO_3 \cdot Mg(OH)_2 \cdot 3H_2O$), whose peak overlapped with the magnesite peak at ~32.8° 2θ. The high concentration of $CO_3^{2-}$ ions within samples MCP2 and S.MCP2 could have stimulated the formation of artinite within these samples, which also demonstrated brucite with a lower crystallinity than the corresponding samples MCP1 and S.MCP1, respectively. FIGS. 36 and 37 present the influence of MCP on the hydration and carbonation processes of RMC mixes subjected to accelerated carbonation. The formation of hydration and carbonation products at the inner sections of the samples, where the $CO_2$ diffusion was inhibited by the formation of impervious HMHC layers during the initial stages of carbonation, was shown in FIG. 36 The use of MCP resulted in the reduced presence of unhydrated MgO at the cores of samples MCP1, MCP2, S.MCP1 and S.MCP2 than the corresponding samples CS and S, respectively. Although the unhydrated MgO content of sample S was higher than CS, samples including the simultaneous use of S and MCP (i.e. S.MCP1 and S.MCP2) revealed relatively lower contents of unhydrated MgO at their cores when compared with samples solely using MCP (i.e. MCP1 and MCP2). A comparison of FIGS. 35 and 36 shows the higher contents of brucite at 14 days than at 2 days, indicating the continuation of hydration. An opposite trend was observed in the artinite content, which reduced over time, possibly due to its transformation into other HMHCs under the accelerated carbonation conditions. The formation of hydration and carbonation products at the outer sections of the samples, where they were directly exposed to 10% $CO_2$, are shown in FIG. 37. The formation of nesquehonite ($MgCO_3 \cdot 3H_2O$) was obvious in the exterior of CS. While the peaks of HMHCs in other samples were not clear in the XRD patterns (i.e. potentially lost in noise), their presence could be clearly observed in SEM images (FIG. 34A to 34F). The poor crystallinity of brucite in MCP samples (i.e. MCP1, MCP2, S.MCP1 and S.MCP2) could have increased the propensity of these samples for carbonation, thereby resulting in significantly lower brucite contents at their exterior sections than those observed in corresponding CS and S samples. The considerably low contents of uncarbonated brucite in samples MCP1, MCP2, S.MCP1 and S.MCP2, both in their inner and outer sections, revealed the significant improvement in their carbonation associated with the use of MCP. However, the use of MCP also led to much higher unhydrated periclase contents at the exterior than the core of samples. These results were consistent with findings where it was revealed that RMC samples cured under high $CO_2$ concentrations contained higher amounts of unreacted periclase. This could be attributed to the rapid formation of HMHCs under high $CO_2$ concentrations, which inhibited further contact between water and unhydrated MgO, thereby resulting in high residual MgO contents at the outer sections of these samples. The differences in the amount of unhydrated periclase at the exterior vs. core sections were not as pronounced in MCP samples as they were in CS and S samples, which was associated with the provision of $CO_3^{2-}$ ions via the UPB-urea solution that enabled the continuous hydration of periclase at the sample core.

TG-IR and DTG—The TG-IR results of pastes extracted from the inner and outer sections of all samples at the age of 14 days are shown in FIG. 38A to 38F and FIG. 39A to 39F. The mass loss responsible for the dehydration of water bonded to HMHCs was observed at ~140° C. This was followed by the main mass loss at ~420° C., corresponding to the dehydroxylation of brucite, and dehydroxylation and decarbonation of HMHCs. The further decarbonation of remaining carbonate phases continued after ~500° C. The exterior samples with higher carbonation degrees revealed higher mass loss contents than the corresponding interior samples. In line with the XRD results, the IR curves of $CO_2$ revealed that the use of MCP not only enabled the accelerated self-carbonation at the sample cores, but also enhanced carbonation at the exterior sections of the samples. Accordingly, MCP samples demonstrated much higher mass loss values than those without MCP both at their cores and exterior sections, indicating the increased conversion of RMC to HMHCs in the presence of MCP. Moreover, the simultaneous implementation of MCP and S led to higher mass loss values than the sole use of MCP, especially at the exterior sections. Tables 8 and 9 present the mass loss values corresponding to each decomposition step, as well as the total mass loss in all samples, which were calculated by using the areas obtained from the deconvolution of DTG curves (FIGS. 40A to 40B and 41A to 41B) and the IR results (FIGS. 38A to 38F and 39A to 39F).

TABLE 8

Mass loss values of pastes extracted from the inner sections of concrete samples cured for 2 days under ambient conditions followed by 12 days under accelerated carbonation conditions, obtained by TG-IR and DTG.

| | Mass loss (wt. %) | | | |
|---|---|---|---|---|
| Sample | Dehydration | Dehydroxylation | Decarbonation | Total |
| CS | 4.4 | 8.0 | 17.1 | 29.5 |
| MCP1 | 6.2 | 8.8 | 19.5 | 34.5 |
| MCP2 | 6.7 | 9.1 | 18.5 | 34.3 |
| S | 4.1 | 9.0 | 17.4 | 30.5 |
| S.MCP1 | 7.8 | 8.6 | 19.4 | 35.8 |
| S.MCP2 | 8.5 | 7.6 | 19.2 | 35.3 |

TABLE 9

Mass loss values of pastes extracted from the outer sections of concrete samples cured for 2 days under ambient conditions followed by 12 days under accelerated carbonation conditions, obtained by TG-IR and DTG.

| | Mass loss (wt. %) | | | |
|---|---|---|---|---|
| Sample | Dehydration | Dehydroxylation | Decarbonation | Total |
| CS | 6.2 | 7.7 | 18.4 | 32.3 |
| MCP1 | 7.3 | 7.4 | 21.6 | 36.3 |
| MCP2 | 7.0 | 8.1 | 19.5 | 34.6 |
| S | 6.5 | 8.2 | 18.1 | 33.1 |
| S.MCP1 | 10.2 | 5.9 | 22.1 | 38.2 |
| S.MCP2 | 8.9 | 6.7 | 20.7 | 36.3 |

The mass loss values corresponding to the decomposition of hydrate and carbonate phases at the cores of samples cured for 14 days are shown in Table 8. The inhibition of $CO_2$ diffusion from the outer surface towards the sample core led to a limited mass loss due to decarbonation at the core of CS (17.1%). While the decomposition of uncalcined magnesite in RMC contributed to the mass loss associated with decarbonation in all samples, the improved formation of HMHCs, which was enabled by the accelerated self-carbonation through the use of MCP, increased the mass loss due to decarbonation in samples MCP1 (19.5%) and MCP2 (18.5%). Alternatively, the influence of S on carbonation at sample cores was unclear as samples containing S revealed comparable decarbonation mass losses as those without S. However, the use of S led to an increase in water bounded to HMHCs in MCP samples, resulting in slightly higher total mass losses in samples containing S than those without S. The mass loss corresponding to the decomposition of hydrate and carbonate phases at the exteriors of samples cured for 14 days are shown in Table 9. The direct exposure to high $CO_2$ concentrations increased the mass loss due to dehydration and decarbonation in CS to 6.2% and 18.4%, respectively. The role of MCP in improving the carbonation within samples MCP1 and MCP2 was reflected by the increase in the mass loss associated with dehydration (7.3% and 7%) and decarbonation (21.6% and 19.5%) in these samples, compared with CS. Although the sole use of S did not improve the carbonation of sample S when compared with CS, the simultaneous implementation of S and MCP enhanced the carbonation of samples S.MCP1 and S.MCP2 when compared with samples MCP1 and MCP2. The carbonation improvement was seen via the relatively higher contents of dehydration (10.2% and 8.9%) and decarbonation (22.1% and 20.7%) of samples S.MCP1 and S.MCP2 than the corresponding samples MCP1 and MCP2 (7.3% and 7% for dehydration, and 21.6% and 19.5% for decarbonation, respectively). Furthermore, the carbonation enhancement within samples S.MCP1 and S.MCP2 was also revealed by their consistently higher conversion of brucite into HMHCs, demonstrated by the lowest mass losses corresponding to dehydroxylation within these samples (5.9% and 6.7%). Out of these, sample S.MCP1 achieved the highest improvement in the conversion of RMC/brucite into HMHCs, as highlighted by its highest mass loss (38.2%), also explaining its highest strengths amongst all the samples (FIG. 31).

Example 3F: Discussion on Characterization Results for Example 3A—Influence of MCP on the Hydration Mechanism of RMC Samples Under Ambient Conditions RMC-based mixes incorporating UPB provided a relatively weak alkaline environment (i.e. pH=~10), in which the *Sporosarcina pasteurii* bacteria were active, breaking down urea to release carbonate ions. Although this bacterial strain required an aerobic condition for growing, its initial urease activity was not significantly impacted by an anaerobic environment. Therefore, the use of MCP in RMC formulations led to the release of $CO_3^{2-}$ ions in the pore solution. The high pH levels present in the mixing solution in comparison to water (i.e. 9.2-9.4 vs. 7.8) contributed to the alteration of the hydration kinetics of RMC. Despite slowing the dissolution of RMC due to the initial high pH values of the pore solution, $CO_3^{2-}$ ions released via MCP enabled the accelerated self-carbonation to facilitate the conversion of RMC into HMHCs in MCP samples, without necessitating the use of additional sources of $CO_2$. The formation of HMHCs, along with the hydration of RMC, was observed in the isothermal calorimetry results (FIG. 29A to 29C) and the SEM images (FIG. 32A to 32F). As shown in FIG. 29A, the accelerated self-carbonation processes led to two extra reaction stages, which were the induction period (i.e. at ~7 to 15 hours after the initial hydration) and the acceleration/deceleration periods (i.e. at ~15 to 50 hours after the initial hydration). The use of MCP also resulted in a pre-induction period associated with the dissolution of MgO, and the nucleation and growth of brucite, occurring immediately after mixing.

The density results (FIG. 30) and SEM images (FIG. 32A to 32F) consistently demonstrated that the accelerated self-carbonation associated with the formation of HMHCs significantly improved the densities of MCP samples, whose microstructures were composed of crystal phases with improved morphologies, even under ambient conditions, when compared with corresponding non-MCP samples. This improvement in microstructure and density translated into improvements in the compressive strength of MCP samples from 4 to 13 MPa after 2 days curing under ambient conditions (FIG. 31), which was noticeably higher than the strengths of CS and S samples (i.e. 1 and 2 MPa). This significant improvement in strength development under ambient conditions, which was attributed to the increased conversion of RMC into HMHCs, enabled the earlier de-moulding of MCP samples. These samples could then be either directly used or subjected to further curing, during which they could continue to sequester $CO_2$ from external sources and thereby improve their performance. The sufficient strengths (i.e. 13 MPa) obtained by MCP samples under ambient conditions could satisfy the mechanical requirements for various practical non-structural applications in large scale construction projects, without the need for any source of additional/external $CO_2$. Further uses of this binder could include ground improvement applications involving rigid inclusions with cast-in-place plain concrete columns or deep soil mixing columns in major structural project such as buildings, highways and wind turbines.

Example 3G: Discussion on Characterization Results for Example 3A—Influence of MCP on the Hydration and Carbonation Mechanisms of RMC Samples Under Accelerated Carbonation Conditions The effect of MCP in enhancing the hydration and carbonation reactions was clearly observed at the inner (FIG. 36) and outer (FIG. 37) sections of samples cured under accelerated carbonation conditions of RMC samples. These improvements were revealed by the very low intensities of brucite with a poor crystallinity (i.e. a small mean crystallite size) in samples MCP1 and MCP2, highlighting the increased conversion of brucite into HMHCs under carbonation curing. The higher unhydrated MgO contents observed at the sample MCP1 and MCP2 exteriors than their interiors could be attributed to the rapid formation of HMHCs under direct exposure to high concentrations of external $CO_2$, prohibiting further contact between unhydrated MgO and water at the exterior section. This finding was consistent with RMC samples that were cured under higher $CO_2$ concentrations revealed lower degrees of hydration.

The inhibition of $CO_2$ diffusion limited the conversion of brucite into HMHCs, resulting in high brucite contents at the core of the samples (FIG. 36). However, the accelerated self-carbonation provided by MCP improved the carbonation degree throughout the sample cores, which was also revealed by the increased mass loss values corresponding to decarbonation at the cores of samples MCP1 and MCP2 (19.5% and 18.5%, Table 8), in comparison to the exterior of CS (18.4%, Table 9). A similar trend was observed in the unreacted MgO and brucite contents, which were considerably lower in the cores of samples MCP1 and MCP2 than the exterior of CS, thereby revealing the higher hydration and carbonation degrees at the cores of MCP samples than at the exterior of CS. This improvement in hydration and carbonation reactions, as well as the morphology of carbonation products (FIG. 33A to 33F) at the cores of samples MCP1 and MCP2 highlighted the role of MCP in overcoming the limitations in the diffusion of $CO_2$. The advancements in the reaction mechanisms were attributed to the increased provision of $CO_3^{2-}$ ions via the use of MCP, which improved the conversion of MgO into HMHCs both at the sample cores (i.e. where $CO_2$ diffusion was inhibited) and exterior sections. These findings highlighted the role of MCP in contributing to the carbonation reaction under elevated $CO_2$ concentrations in two aspects:

First, the high initial pH values of the UPB-urea solution accelerated the dissolution of $CO_2$ into $CO_3^{2-}$ ions, which played a key role in the formation of HMHCs within RMC samples. In the CS, where the UPB-urea solution was not used, the precipitation of brucite and HMHCs reduced the pH value of the pore solution, which lowered the dissolution of $CO_2$ into $CO_3^{2-}$ ions and limited the subsequent reaction between $Mg^{2+}$ and $CO_3^{2-}$ ions to form HMHCs. Samples incorporating MCP overcame these limitations in the presence of the UPB-urea solution, which provided a high pH that accelerated the dissolution of $CO_2$ in the pore solution and thereby enhanced the carbonation of RMC in samples MCP1 and MCP2. Second, the provision of $HCO_3^-/CO_3^{2-}$ ions via MCP (Eqs. 18 and 19) could have a catalyzing effect on the dissolution of brucite into $Mg^{2+}$ ions, thereby stimulating the formation of HMHCs. This improvement in the dissolution of brucite involved the formation of multidentate mononuclear surface complexes that destabilized Mg—O bonds and the water coordination of Mg atoms at the surface. The catalyzing effect induced by MCP could lead to the precipitation of brucite with a poor crystallinity. These improvements in the carbonation reaction in the presence of MCP contributed to the increased conversion of brucite into HMHCs at the exteriors of samples MCP1 and MCP2 than that of CS (FIG. 37 and Table 9).

Furthermore, the increase in the hydration and carbonation degrees at both the inner and outer sections of samples MCP1 and MCP2 improved the morphology of HMHCs (FIGS. 33B and 33C, FIGS. 34B and 34C). This morphological improvement resulted in denser microstructures, reflected by higher density (FIG. 30) and lower water absorption (Table 7) results. The combination of these advances led to significantly higher compressive strengths (FIG. 31) in these samples than those revealed by CS. Accordingly, the use of MCP increased the 28-day compressive strength of sample MCP1 by a factor of 2.35 when compared with CS (47 MPa vs. 20 MPa). The use of higher urea concentrations (2 M vs. 1 M) led to a much higher compressive strength in sample MCP2 than MCP1 under ambient conditions (13 MPa vs. 6 MPa at 2 days), while a different scenario was observed under accelerated carbonation conditions (i.e. 40 MPa vs. 47 MPa at 28 days). This could be associated with the rapid formation of HMHCs on the surface of MgO and brucite grains the initial stages, which inhibited their further contact with $CO_2$ and $H_2O$ for the continuation of carbonation. The improved performance of samples involving 1 M urea was also reflected by the XRD and TGA results, which indicated a higher conversion of RMC into HMHCs within these samples.

Example 3H: Discussion on Characterization Results for Example 3A—the Role of Seeds (S) in RMC Samples Involving MCP The influence of MCP observed on the hydration and carbonation mechanisms at both the inner and outer sections of samples that did not include any seeds was also seen in seeded samples. The use of S, in which RMC-based samples were cured under accelerated carbonation conditions (10% $CO_2$, ~80±5% RH and ~30° C.) immediately after mixing, increased the 28-day compressive strength by 33%. However, the present example differs from such an in terms of the curing, which initially involved subjecting the samples to 2 days of ambient conditions, followed by accelerated carbonation condition for a further 26 days to complete the 28-day curing cycle. While this approach led to similar compressive strength in samples S and CS (FIG. 31), the accelerated self-carbonation provided by the use of MCP improved the compressive strengths of samples S.MCP1 when compared with MCP1, revealing an increase of ~32% at 28 days (62 MPa vs. 47 MPa). This significant improvement in strength was attributed to the higher formation of HMHCs at the outer sections of S.MCP1 than MCP1 (Table 9). The positive role of S under accelerated carbonation conditions could suggest that the nucleation and growth of HMHCs controlled the carbonation of RMC mixes. Thereby, the introduction of S, which provided further nucleation sites, improved the formation of HMHCs. The simultaneous use of S and MCP increased the 28-day compressive strength of sample S.MCP1 by a factor of 3.1 when compared with samples S or CS (62 vs. 20 MPa). The role of S in enhancing carbonation was also seen in sample S.MCP2 when compared with MCP2 (FIG. 37 and Table 9), which was reflected by the higher compressive strengths of the former. However, the higher concentration of urea (2 M vs. 1 M) limited the contribution of S in RMC samples, which was evident from the lack of available brucite for carbonation in sample S.MCP2 (FIG. 37) and the lower conversion of MgO into brucite under the higher initial pH value of UPB-2 M urea solution. One potential enhancement of performance could involve the use of lower $CO_2$ concentrations (e.g. 5%), which could improve the conversion of MgO into brucite and HMHCs in RMC samples using MCP. The combination of high initial pH values (e.g. ~8.8) in the pore solution and use of S may lead to significant strength gain at later ages in RMC concrete samples, which was reflected as a 24% increase from 28 days (58 MPa) to 56 days (72 MPa) of accelerated carbonation curing. Therefore, samples S.MCP1 and S.MCP2, which involved the simultaneous inclusion of high initial pH values (i.e. provided by the UPB-urea solutions) and S could gain significantly higher compressive strengths at longer curing durations. Therefore, curing regimes involving lower $CO_2$ concentrations and longer durations could be implemented to further improve the conversion of MgO into HMHCs, as well as the performance of RMC mixes.

Example 3I: Summary of Characterization Results for Example 3A

The present examples provide an accelerated self-carbonation method to enhance the carbonation of RMC mixes under ambient conditions and improve the conversion of unhydrated MgO and uncarbonated brucite into HMHCs under accelerated carbonation conditions. This accelerated self-carbonation method was achieved by the use of MCP, in which the hydrolysis of urea by UPB generated $CO_3^{2-}$ and $OH^-$ ions. Accordingly, the high initial pH values of UPB-urea solutions associated with the release of $OH^-$ ions accelerated the dissolution of $CO_2$ into $CO_3^{2-}$ ions in the pore solution, which further facilitated the carbonation process and associated formation of HMHCs. The internal provision of $CO_3^{2-}$ ions facilitated accelerated carbonation within RMC concrete samples, without any need for external $CO_2$ sources. As a result, the use of MCP improved carbonation throughout the sample cross-sections, resulting in denser microstructures composed of carbonate phases with improved morphologies, which translated into an increase in the 28-day compressive strength by a factor of 2.35 (i.e. 47 MPa vs. 20 MPa).

Despite the lower hydration degree of RMC due to the high initial pH of UPB-urea solutions, the formation of HMHCs enabled by the accelerated self-carbonation process significantly improved the strength gain of RMC samples (i.e. 13 MPa vs. 1 MPa at 2 days) under ambient conditions, without any additional sources of $CO_2$. This significant improvement in early strength development could allow the earlier de-molding of RMC samples, thereby improving the productivity and efficiency in terms of direct use; or carbonation effectiveness and associated mechanical performance if subjected to further curing. Another improvement introduced by MCP was the enhancement of carbonation in the sample cores, where the diffusion of $CO_2$ from an external source is limited due to the formation of an impervious HMHC layer. Accordingly, the $CO_3^{2-}$ ions released via MCP stimulated carbonation within the sample cores, improving the reaction degrees in these regions, which are usually dominated by unreacted phases due to the limitations in external carbonation techniques. Furthermore, the use of MCP led to the formation of brucite with a low crystallinity, thereby stimulating its conversion into HMHCs.

RMC samples involving UPB-1 M urea presented higher conversion of RMC into HMHCs and notably improved mechanical performance than those using 2 M urea. The use of S, which provided further nucleation sites, further improved carbonation at the exterior of RMC samples involving the use of MCP. The combined use of MCP and S led to 28-day strengths that were higher than those of CS by a factor of 3.1 (62 MPa vs. 20 MPa). The synergistic use of MCP with S demonstrated the feasibility of the present accelerated carbonation technique in improving the conversion of RMC into HMHCs through the enhancement of reaction mechanisms. The implementation of this method can not only improve the utility of RMC as a binder, but also increase the productivity and efficiency of any project these binders are utilised in by facilitating rapid strength development under both ambient and accelerated carbonation conditions and reducing maintenance needs by eliminating any potential excessive expansion in the long-term.

When compared to existing PC-based systems, these present binder systems could not only provide a better $CO_2$ storage, which enabled significant strength development, but also presented the option of complete recyclability at the end of their lifetime. When combined with their potential to be obtained from waste resources (e.g. reject brine obtained from desalination plants), RMC mixes could present a feasible alternative to existing binder systems for applications where environmental implications play a key role.

Example 4: Commercial and Potential Applications

The present disclosure provides a bacteria-based method to provide $CO_2$ for the carbonation of RMC-based systems. The method can be applicable to any RMC-based formulations which rely on the carbonation to gain strength. The present method provides RMC-based formulations as a potential alternative of PC. RMC formulations produced by method of the present disclosure can be used in, as one example, masonry blocks production.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The various embodiments described above can be combined to provide further embodiments. All of the U.S.

patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The invention claimed is:

1. A method of carbonating reactive magnesia cement, the method comprising:
   (i) providing an aqueous suspension comprising a carbon dioxide-producing bacteria;
   (ii) mixing the aqueous suspension with a precursor which the carbon dioxide-producing bacteria generates carbon dioxide from for a duration to form an aqueous mixture sufficient for substantially carbonating the reactive magnesia cement;
   (iii) mixing the aqueous mixture with the reactive magnesia cement to form a blend;
   wherein a nutrient is provided in the aqueous suspension of step (i) or in the reactive magnesia cement of step (iii) to sustain the carbon dioxide-producing bacteria in the reactive magnesia cement; and
   (iv) curing the blend to carbonate the reactive magnesia cement.

2. The method of claim 1, wherein providing the aqueous suspension comprises dissolving the nutrient in water prior to dispersing the carbon dioxide-producing bacteria in the water.

3. The method of claim 1, wherein the carbon dioxide-producing bacteria comprises an alkaliphilic bacteria or ureolytic bacteria.

4. The method of claim 1, wherein the carbon dioxide-producing bacteria comprises *Sporosarcina pasteurii, Bacillus sphaericus, Bacillus subtilis*, and/or *Bacillus cohnii*.

5. The method of claim 1, wherein the nutrient comprises yeast extract, soy broth, lysogeny broth, meat extract, and/or peptone.

6. The method of claim 1, wherein mixing the aqueous suspension with the precursor comprises dissolving the precursor in water prior to mixing the aqueous suspension with the precursor.

7. The method of claim 1, wherein the duration is 30 seconds or less.

8. The method of claim 1, wherein the precursor comprises urea or magnesium lactate.

9. The method of claim 1, wherein the aqueous mixture comprises water, and mixing the aqueous mixture with the reactive magnesia cement is carried out with the water of the aqueous mixture and the reactive magnesia cement present in a weight ratio of 0.43 to 0.7.

10. The method of claim 1, further comprising mixing the reactive magnesia cement with a hydration agent prior to mixing the reactive magnesia cement with the aqueous mixture.

11. The method of claim 10, wherein the hydration agent comprises hydrochloric acid, magnesium acetate, or magnesium chloride.

12. The method of claim 1, further comprising mixing the aqueous suspension with seed particles, wherein the seed particles comprise hydromagnesite, carbon nanotubes, nano-sized silicon dioxide, nano-sized titanium dioxide, or carbon nanofibers.

13. The method of claim 12, wherein mixing the aqueous suspension with the seed particles comprises dispersing the seed particles in water.

14. The method of claim 1, further comprising mixing coarse aggregates with the blend prior to curing the blend.

15. The method of claim 14, wherein the coarse aggregates have a size ranging from 4 mm to 10 mm.

16. The method of claim 1, further comprising curing the blend at:
   atmospheric pressure;
   a temperature ranging from −10° C. to 50° C.; and
   a humidity ranging from 75% to 100%.

17. A reactive magnesia cement composite formed by the method of claim 1, the reactive magnesia cement composite comprising:
   a carbon dioxide-producing bacteria; and
   a X-ray diffraction pattern comprising:
      one peak having a two theta value between 30° and 35° which corresponds to magnesite;
      one peak having a two theta value between 35° and 40° which corresponds to brucite;
      one peak having a two theta value between 40° and 45° which corresponds to periclase; and
      wherein the intensity of the one peak which corresponds to brucite is lower in the presence of the carbon dioxide-producing bacteria as compared to another reactive magnesia cement composite absent of the carbon dioxide-producing bacteria.

18. The reactive magnesia cement composite of claim 17, wherein the X-ray diffraction pattern further comprises:
   one peak having a two theta value between 5° and 10° which corresponds to dypingite; and/or
   one peak having a two theta value between 15° and 20° which corresponds to hydromagnesite.

19. The reactive magnesia cement composite of claim 17, wherein the X-ray diffraction pattern further comprises one peak having a two theta value between 30° and 35° which corresponds to artinite.

20. The reactive magnesia cement composite of claim 17, wherein the carbon dioxide-producing bacteria comprises *Sporosarcina pasteurii, Bacillus sphaericus, Bacillus subtilis*, and/or *Bacillus cohnii*.

* * * * *